(12) United States Patent
Cha et al.

(10) Patent No.: US 9,054,991 B2
(45) Date of Patent: Jun. 9, 2015

(54) MANAGING METHOD AND APPARATUS FOR SERVICING CONTENTS PROVIDED BY CONTENT PROVIDER

(71) Applicant: SK Telecom Co., Ltd., Seoul (KR)

(72) Inventors: Young-In Cha, Seoul (KR); Oh-Seung Lim, Seoul (KR); Tae-Ho Oh, Seoul (KR); O-Hyon Kwon, Seoul (KR); Gi-Seon Nam, Seongnam-si (KR); Yon-Hee Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 135 days.

(21) Appl. No.: 13/846,091

(22) Filed: Mar. 18, 2013

(65) Prior Publication Data

US 2013/0297760 A1 Nov. 7, 2013

Related U.S. Application Data

(62) Division of application No. 12/982,193, filed on Dec. 30, 2010, now Pat. No. 8,676,936, which is a division of application No. 11/573,886, filed as application No. PCT/KR2005/002725 on Aug. 18, 2005, now Pat. No. 8,712,377.

(30) Foreign Application Priority Data

| Aug. 19, 2004 | (KR) | 10-2004-0065462 |
| Aug. 19, 2004 | (KR) | 10-2004-0065467 |
| Aug. 19, 2004 | (KR) | 10-2004-0065471 |
| Aug. 19, 2004 | (KR) | 10-2004-0065475 |
| Aug. 19, 2004 | (KR) | 10-2004-0065480 |
| Aug. 19, 2004 | (KR) | 10-2004-0065482 |
| Aug. 19, 2004 | (KR) | 10-2004-0065490 |
| Aug. 19, 2004 | (KR) | 10-2004-0065491 |
| Aug. 19, 2004 | (KR) | 10-2004-0065492 |
| Aug. 19, 2004 | (KR) | 10-2004-0069880 |

(51) Int. Cl.
*G06F 15/173* (2006.01)
*H04L 12/24* (2006.01)
*H04N 21/40* (2011.01)

(52) U.S. Cl.
CPC ............... *H04L 41/50* (2013.01); *H04N 21/40* (2013.01)

(58) Field of Classification Search
CPC ....................................................... H04L 41/50
USPC ........................................ 709/217–219, 223
See application file for complete search history.

(56) References Cited

U.S. PATENT DOCUMENTS 6,971,005 B1 * 11/2005 Henry et al. .................. 713/155
2002/0058519 A1 * 5/2002 Nagahara ...................... 455/456

(Continued)

FOREIGN PATENT DOCUMENTS

| KR | 1020000058428 | 10/2000 |
| KR | 1020010014639 | 2/2001 |

(Continued)

OTHER PUBLICATIONS

Korean office action for 10-2004-0065462, citing the above reference(s).

(Continued)

*Primary Examiner* — Mohamed Wasel
(74) *Attorney, Agent, or Firm* — Lowe Hauptman & Ham, LLP

(57) ABSTRACT

A managing method for contents providing services includes providing a website server account of a Contents Provider (CP) based on information of the CP provided via a contents providing apparatus. A contents connection point which is contents position information for connecting to contents to be provided to a mobile communication terminal via a wireless Internet is registered. CP connection menus and a directory menu which is a menu provided via the mobile communication terminal are generated, and the contents connection point is connected to the CP connection menus. A segment for providing the contents to the mobile communication terminal according to a prescribed regulation is formed and the directory menu and the CP connection menus are selectively connected to the segment.

6 Claims, 54 Drawing Sheets

(56) References Cited

U.S. PATENT DOCUMENTS

2004/0002947 A1   1/2004   De La Fuente et al.
2004/0203630 A1*  10/2004  Wang .................. 455/414.1

FOREIGN PATENT DOCUMENTS

| | | |
|---|---|---|
| KR | 1020010078273 | 8/2001 |
| KR | 1020010095113 | 11/2001 |
| KR | 1020010097706 | 11/2001 |
| KR | 1020010105122 | 11/2001 |
| KR | 1020020016382 | 3/2002 |
| KR | 1020020016438 | 3/2002 |
| KR | 1020020018551 | 3/2002 |
| KR | 1020020042061 | 6/2002 |
| KR | 1020020059212 | 7/2002 |
| KR | 1020020064588 | 8/2002 |
| KR | 1020020076891 | 10/2002 |
| KR | 1020030005596 | 1/2003 |
| KR | 1020030032563 | 4/2003 |
| KR | 1020030043310 | 6/2003 |
| KR | 1020030045569 | 6/2003 |
| KR | 1020030073199 | 9/2003 |
| KR | 1020030092958 | 12/2003 |
| KR | 1020030095001 | 12/2003 |
| KR | 1020040014744 | 2/2004 |
| KR | 1020040024354 | 3/2004 |
| KR | 1020040040547 | 5/2004 |
| KR | 1020040041721 | 5/2004 |
| KR | 1020040067142 | 7/2004 |
| WO | WO 01/35236 | 5/2001 |
| WO | 02/067166 | 8/2002 |
| WO | WO 02/063850 | 8/2002 |

OTHER PUBLICATIONS

Korean office action for 10-2004-0065475, citing the above reference(s).
Korean office action for 10-2004-0065492, citing the above reference(s).
Korean office action for 10-2004-0065471, citing the above reference(s).
Korean office action for 10-2004-0065480, citing the above reference(s).
Korean office action for 10-2004-0065481, citing the above reference(s).
Korean office action for 10-2004-0065491, citing the above reference(s).
Korean office action for 10-2004-0065490, citing the above reference(s).
Korean office action for 10-2004-0069880, citing the above reference(s).

* cited by examiner

Figure 21

NATE

| Content Mgmt | Menu Mgmt | Subscriber Mgmt | Handset Mgmt | Statistics | Potal Application Mgmt | Administrator Mgmt | QA & |

Sitemap

Menu Management

- Search Segment Group
  - Create Segment Group
  - Segment Management
  - Menu Presentation Template Management
- Image Management
- Style Management
- Pictogram Management
- Menu Info Management ○ Search Segment Groups ▸ Add Segment To the CFAF ▸ Segment Information To be Associated

| Add | Segment Name | Segment ID | Language | Target Browser | Template Name | Default segment | Status |
|---|---|---|---|---|---|---|---|
| ☐ | 국어 | 27 | English,Korean | NGB | TemplateType3 | ○ | |
| ☐ | 오락국어 | 28 | Korean | 1.x | TemplateType1 | ○ | |
| ☐ | 한 | 25 | English,Korean | Both | TemplateType3 | ○ | |
| ☐ | CFAF_Kr | 10 | English,Korean | Both | TemplateType1 | ○ | |
| ☐ | Comedy_En | 4 | English,Korean | NGB | TemplateType2 | ○ | |
| ☐ | ITseg2_en | 13 | English,Korean | NGB | TemplateType3 | ○ | |
| ☐ | ITseg_en | 12 | English,Korean | NGB | TemplateType3 | ○ | |
| ☐ | Movies_En | 5 | English,Korean | NGB | TemplateType1 | ○ | |
| ☐ | NATE1_En | 6 | English,Korean | Both | TemplateType2 | ○ | |
| ☐ | NATE2_En | 7 | English,Korean | NGB | TemplateType2 | ○ | |
| ☐ | NATE3_En | 8 | English,Korean | NGB | TemplateType3 | ○ | |
| ☐ | NATE4_En | 9 | English | 1.x | TemplateType1 | ○ | |

| | | by | Admin ID ▽ | | Search | |
|---|---|---|---|---|---|---|
| ← Total Numbers of Search Result : 8 | | | | | Page Number(s) : 1 of 1 | |
| Admin Name | Admin ID | Pass Word | Home Address | Mobile Phone | Detailed Information | Management |
| adminFive | admin5 | wits | aaaa | 01198679015 | See Detail | Modify Delete |
| adminSix | admin6 | wits | aaaa | 01198679015 | See Detail | Modify Delete |
| • | • | • | • | • | • | • |
| • | • | • | • | • | • | • |
| • | • | • | • | • | • | • |
| • | • | • | • | • | • | • |
| • | • | • | • | • | • | • |
| • | • | • | • | • | • | • |

Figure 48

| Menu mgmt | Authorities |
|---|---|
| ⊞ Administrator Management | · · · · · · · · · · · · ▽ |
| ⊞ Content mgmt | · · · · · · · · · · · · ▽ |
| ⊞ Handset Management | · · · · · · · · · · · · ▽ |
| ⊞ Menu mgmt | · · · · · · · · · · · · ▽ |
| ⊞ OA & M | · · · · · · · · · · · · ▽ |
| ⊞ Portal Application Management | · · · · · · · · · · · · ▽ |
| ⊞ Statistics | · · · · · · · · · · · · ▽ |
| ⊞ Subscriber Management | · · · · · · · · · · · · ▽ |

---- There is no use authority ----  ▽ | Change of All Authorities at a time

---- There is no use authority ----
Inquiry
·
·
·
·
·
·

Figure 50

▷ Authority Tree

⊞ Administrator Management
⊞ Content mgmt
⊞ Handset Management
⊞ Menu mgmt
⊞ OA & M
⊞ Portal Application Management
⊞ Statistics
⊞ Subscriber Management admin5

| Content mgmt : detailed Status | | |
|---|---|---|
| Member ID | Name | Authorities |
| admin5 | adminFive | – Inquiry<br>– Registration<br>– Change |
| • | • | • |
| • | • | • |
| • | • | • |
| • | • | • |
| • | • | • |
| • | • | • |
| • | • | • |

Figure 55

| Add | Member ID | Member Name |
|---|---|---|
| ☐ | admin1 | adminOne |
| ☐ | admin2 | adminTwo |
| ☐ | admin3 | adminThree |
| ☐ | admin4 | adminFour |
| ☐ | admin5 | adminFive |
| ☐ | admin6 | adminSix |

Group Name:

Delete

MANAGING METHOD AND APPARATUS FOR SERVICING CONTENTS PROVIDED BY CONTENT PROVIDER

CROSS-REFERENCE TO RELATED APPLICATIONS

The present application is a Divisional Application of U.S. Ser. No. 12/982,193 filed Dec. 30, 2010, which is a Divisional Application of U.S. Ser. No. 11/573,886, filed on Oct. 3, 2007, which is a National Phase application of International application number PCT/KR2005/002725 filed on Aug. 18, 2005, which is incorporated by reference in its entirety as set forth in full.

TECHNICAL FIELD

The present invention relates to management of servicing contents, and more particularly to a managing method for servicing contents provided by contents provider and apparatus thereof adapted to use an integrated managing apparatus for collectively managing content providers for providing contents to mobile communication terminals of subscribers and services thereof.

BACKGROUND ART

Concomitant with the development of technologies on the mobile communication terminals (hereinafter referred to as "terminal"), the terminals have become convenient means in our daily life, but they are no longer just means for transmitting and receiving voices only. WAP (Wireless Application Protocol) based mobile communication terminals are actively connecting to gateways for get accessed to information wanted by users. The users, if ever wanted, can immediately obtain via WAP based mobile communication terminals important information such as plane schedule, bell sound, game information and even stock market prices.

In order to provide all the information users of the terminals wish to have, lots of contents providers are implementing contents providing services in conjunction with the terminals.

Furthermore, if connected to currently-provided wireless Internet, for example, if connected to NATE which SK Telecommunication manages, all subscriber terminals are provided with the same main menus and contents such that, there arise problems in that, in users view points, the terminals abound with too many unnecessary menus to discourage the users to get accessed to and search wanted contents, and with too much time spent thereon.

For that reason, tools are needed for contents providers to conveniently provide contents services to the users, and collective management of the contents providers hitherto individually managed is required in earnest.

When a terminal is accessed to a wireless Internet, a uniform initial menu is provided to all the users by managers of wireless Internet. In other words, the initial menu is generated regardless of sex, age, occupation, hobby of user of the terminal, such that there arises a problem in that, in order to obtain information the users wants, the users have to search on display screens reeking of too many unnecessary package menu trees.

As contents and the number of contents providers are on the increase, services managed by the wireless Internet also have become enormously extensive to result in the contents providers teaming up according to the kinds of services and managing the wireless Internet. Therefore, there arises a necessity of managing the operations of the wireless Internet for each managing team.

Generally, in order to get information via Internet service, a user should get accessed to Internet search website to input a search word relative to contents to be provided with and search the contents, or input an URL relative to the contents to receive the same. However, if a user erroneously inputs a search word, he or she cannot get the contents correctly and it takes a lot of time to search the correct contents again.

Particularly, because menu information in the terminal relative to the contents cannot be embodied in various languages, there also arises a problem in that the terminal cannot cope with an age where space and time pose no limit.

A user sequentially moves around the contents menus composed of tree structure from a higher level contents menu to a lower level contents menu to search contents he or she wants. Meanwhile, by requesting a movement to a higher WAP page via a higher button provided to the WAP page containing the contents menu, the user can search the wanted contents moving to the higher and lower contents menus.

However, if a user directly moves to the wanted contents menu using various contents search means, and when request is made for the movement to the higher WAP page via pressing the higher button, there arises a problem in that movement is not made to the WAP page containing the contents search means corresponding to a page just before the WAP page including the contents menu.

Meanwhile, if access is made to the wireless Internet for receiving the contents a terminal is currently providing, for example, accessing to NATE which SK Telecommunication is operating, contents which a user is pleasantly provided with according to the user's disposition are partially limited, so that contents menu the user is pleasantly provided with may be partially constrained.

However, even though the contents the user is gladly provided with by the conventional terminal are limited, in order to get provided with the contents, the higher level of menu route for selecting the contents menu which can provide the contents cannot be omitted. This causes a problem in that it is ineffective to get provided with contents because the contents menu route has to be passed every time the same contents are provided. Accordingly, a necessity arises that wanted contents should be provided even by omitting the menu route, by which a user can be effectively provided with enjoyable sought-after contents.

There is a problem in the wireless portal platform currently used in that it is difficult to get a cooperative management with the legacy system (a basic system the conventional mobile communication company used to have prior to introduction of wireless Internet). This is because the legacy system is driven by non-standard protocol, and the system itself is very complicated. Furthermore, Internet services are individualized to cater to customer terminal characteristics and preference menus, and instances are on the increase where contents providers approach the wireless portal platform to inquire into information about the customers. However, when the contents providers approach the wireless portal platform in order to inquire into information on the customers, there has been no strict control on the authority and effectiveness of the contents providers to make it easy for the information on the customers to be leaked out, thereby posing a possible security problem.

Furthermore, there has been no multi-angled management on mobile network operators for collectively managing the wireless portal platform (for example, NATE of SK Telecommunication and MAGICIAN of KTF Telecommunication).

The currently-used wireless portal platform requires a plurality of mobile network operators for management but each network operator is not provided with detailed and diverse authority to conform to responsibilities and levels thereof.

DISCLOSURE

Technical Problem

Accordingly, it is an object of the present invention to provide a managing method for servicing contents provided by contents providers and an apparatus thereof adapted to provide a collective management on a plurality of contents providers for providing contents to subscribers, and to provide services of integrated contents so that the contents providers can provide convenient services.

It is another object of the present invention to provide a managing method for servicing contents provided by contents providers and an apparatus thereof adapted to use segments by which menu can be provided according to limited subscription intentions of subscribers.

It is still another object of the present invention to provide a managing method of Internet management teams and an apparatus thereof for managing the operational situations and operational performances for each operating team of operators.

It is further object of the present invention to provide a contents providing method and a system thereof by which an integrated management apparatus manages contents code numbers received from a contents providing apparatus to enable to input the contents code numbers without passing through a plurality of menu searching process, so that a user can be effectively and swiftly provided with wanted contents.

It is still further object of the present invention to provide contents service providing method and a system thereof by which an integrated management apparatus receives language information for each predetermined country from contents providers to generate respective menu information comprised of the language information and to provide the menu information comprised of language information requested by a service user to a terminal of a user, thereby enabling to support a multi-language assistance for receiving contents conforming to contents request of a mobile communication terminal via menu information.

It is still further object of the present invention to provide a high-order WAP page moving method of mobile terminal and a system thereof by which, when a user uses contents search means to search the contents wanted to be provided with, an integrated management apparatus receives movement request information to a high-order WAP page from a mobile communication terminal of the user and current WAT page information provided to the mobile communication terminal to transmit the high-order WAP page information including the contents search means to the mobile communication terminal, such that, if there is no menu relative to the contents the current WAP page wants, the user can instantly use the contents search means to enable to effectively conduct a contents search.

It is still further object of the present invention to provide a bookmark menu generating method and an apparatus thereof by which, in the process of being provided with contents via a mobile communication terminal, an integrated management apparatus collects and analyzes information of the mobile communication terminal recorded in a WAP gateway, an URL information provided by the contents, contents idea and contents access information including contents menu information to enable to generate a bookmark menu relative to the contents enjoyably sought after by the mobile communication terminal.

It is still further object of the present invention to provide a bookmark service providing method and an apparatus thereof by which, in an integrated management apparatus on-line accessible to the mobile communication terminal via communication network, the mobile communication terminal draws up lists of contents names relative to the contents requested to be registered on a bookmark and to generates a bookmark thereof, and the mobile communication terminal can be provided with wanted contents without passing through several contents menu searching processes via the bookmark.

It is still further object of the present invention to provide an access system for contents providers by which the contents providers are connected to legacy system via contents providing access apparatus relative to various information requests from the contents providers, thereby enabling to smoothly effect a communicative management between the contents providers and the legacy system.

It is still further object of the present invention to provide an authority providing method to mobile network operators of wireless portal platform by which a predetermined number of mobile network operators are provided with menu operation use right for each different level, thereby enabling the mobile network operators to effectively manage the wireless portal platform.

Technical Solution

A managing apparatus according to the present invention comprises: a contents provider management module for generating an account of a contents provider based on information of the contents provider transmitted from the contents providing apparatus; a contents management module for managing a contents connection point for connecting to the contents provided from the contents providing apparatus and for managing information relative to the contents; and a menu management module for registering menus including a menu connected to the contents connection point and for managing a connection authority to a name of the menu and the menu.

A managing method for providing services to the contents according to the present invention comprises the steps of: providing a website server account of the contents provider based on the information of the contents provider provided via the contents providing apparatus; registering a contents connection point which is the contents position information for connecting to the contents to be provided to the mobile communication terminal via the wireless Internet; an operator generating Contents Provider (Contents Provider) connection menus and a directory menu which is a menu provided via the mobile communication terminal and connecting the contents connection point to the CP connection menus; and the operator forming a segment for providing the contents to the mobile communication terminal according to a prescribed regulation and selectively connecting the directory menu and the CP connection menus to the segment.

A managing method for providing services to the contents according to the present invention comprises the steps of: providing a website server account of the contents provider based on the information of the contents provider provided via the contents providing apparatus; providing a directory per nature of the contents so that the contents providers can register contents connection point according to the nature of the contents; registering along with the contents-embodiable mobile communication terminal information of the mobile communication terminal when the contents connection point is registered with the directory per nature of the contents; an operator generating the CP menus and the directory menu which is the menu to be provided to the mobile communication terminal and connecting the contents connection point to the CP connection menus; and transmitting to the mobile communication terminal the contents corresponding to the contents connection point when one of the CP connection menus is selected by the mobile communication terminal.

A service managing method using segments according to the present invention comprises the steps of: an operator creating segments for providing contents to subscriber terminal according to a prescribed regulation; the contents connection point being connected to the menu for connecting to the contents; and forming a segment menu by a menu connected to the contents to be provided to the subscriber terminal subscribed to the segment out of the menus.

A service managing method using segment according to the present invention comprises the steps of: generating a segment group by setting up an assisting language by way of a subscriber terminal and inputting a name for an operator to provide services to the subscriber terminal according to a prescribed regulation; connecting at least one segment following search of segment connectable to the segment group: creating a menu of the segment group to be transmitted to the subscriber terminal so set up as to receive the contents via the segment group; managing by setting up the service state of the segment group as completed if there is no subscriber in the segment group and if the subscriber is not present even in a segment connected to the segment group.

A service managing apparatus using a segment according to the present invention comprises: a menu management module for creating a menu to be provided to a subscriber terminal connected to the wireless Internet and for connecting to the menu the contents connection point for connecting to the contents; and an operator of the wireless Internet creating a segment for providing contents to the subscriber terminal according to a prescribed regulation and forming a segment menu by a menu connected to the contents to be provided to the subscriber terminal subscribed to the segment out of the menus.

A managing method of wireless Internet operating team according to the present invention comprises the steps of: mapping a discriminating code of a menu operator to each level of menu for providing contents to a subscriber terminal via the Internet; filtering information relative to a menu selected by the subscriber from a log file created by the subscriber terminal connecting to the Internet; counting a connection frequency of the subscriber terminal connected to the menu from the filtered menu information; and storing the discriminating code of the menu operator, the menu mapped to the discriminating code and the connection frequency of the menu.

A managing apparatus of wireless Internet operating team comprises: a menu creating unit for mapping a discriminating code of a menu operator to a menu for providing contents to a subscriber terminal via the wireless Internet; a log file filtering unit for filtering the information relative to a menu selected by the subscriber from a log file created by the subscriber terminal connecting to the wireless Internet; and a connection frequency managing unit for storing the discriminating code, the menu mapped to the discriminating code and the connecting frequency of the menu by counting a menu connection frequency of the subscriber terminal from the filtered menu information.

A contents providing system using contents code number according to the present invention comprises: a terminal for transmitting the contents code number to an integrated management apparatus connected via a communication network and receiving contents corresponding to the contents code number from a contents providing apparatus; an integrated management apparatus for receiving the contents code number from the terminal, searching the contents connection information to extract contents address information corresponding to the contents code number and to transmit the contents address information to the contents providing apparatus; and a contents providing apparatus for providing to the terminal the contents corresponding to the contents address information, wherein the contents connection information includes erstwhile-established contents address information and contents code number, which are registered by the integrated management apparatus receiving from the contents providing apparatus.

A contents providing method using contents code number according to the present invention comprises the steps of: a terminal transmitting contents code number to an integrated management apparatus; the integrated management apparatus searching the contents connection information to extract contents address information corresponding to the contents code number; the integrated management apparatus transmitting the contents address information to a contents providing apparatus; and the contents providing apparatus providing to the terminal contents corresponding to the contents address information.

A multi-language supportable contents service providing system according to the present invention comprises: a terminal for transmitting to an integrated management apparatus language information for embodying menu information relative to contents to receive menu information formed in the language information and providing contents by requesting the contents via the menu information; an integrated management apparatus for receiving language information to be supported from contents providing apparatus to the terminal to generate menu information including contents connection information relative to contents, contents connection information per menu and the language information and extracting contents address information relative to the contents requested by the menu information and transmitting the contents address information to a contents providing apparatus; and the contents providing apparatus for receiving the contents address information from the integrated management apparatus and providing to the terminal contents corresponding to the address information.

A multi-language supportable contents service providing method according to the present invention comprises the steps of: a terminal transmitting to an integrated management apparatus menu providing request information relative to contents; the integrated management apparatus searching user information of the terminal to extract language information corresponding to the user information; and the integrated management apparatus providing to the terminal menu information composed of the language information out of menu information corresponding to the menu providing request information.

A multi-language supportable contents service providing method according to the present invention comprises the steps of: an integrated management apparatus collecting standard language information per country and storing the information at a first database; the integrated management apparatus storing in a second database a predetermined language information selected by the integrated management apparatus for supporting out of language information in the first database; the integrated management collecting a predetermined language information selected for support by the terminal out of language information stored in the second database from the contents providing apparatus and creating contents connection information; the integrated management apparatus collecting as language information the information relative to menu creation relative to contents and creating contents connection information per menu relative to the contents; and the integrated management apparatus creating menu information formed by language information selected for support via a terminal by the contents providing apparatus through the contents connection information per menu.

A higher WAP page moving method of a mobile communication terminal according to the present invention comprises the steps of: a mobile communication terminal transmitting to an integrated management apparatus a moving request information to a higher WAP page and a current WAP page information provided to the mobile communication terminal; the integrated management apparatus receiving information of a moving request to the higher WAP page and current WAP page information and analyzing the same; extracting the higher WAP page information including contents search means if the current WAP page is a WAP page provided via the contents search means as a result of the analysis of the information on the moving request to the higher WAP page; and providing to the mobile communication terminal the higher WAP page information including the contents search means thus extracted.

A higher WAP page moving system of a mobile communication terminal according to the present invention comprises: a mobile communication terminal for transmitting to an integrated management apparatus information on moving request to higher WAP page and current WAP page information provided by the integrated management apparatus; and an integrated management apparatus for receiving the information on the moving request to the higher WAP page transmitted by the terminal and the current WAP page information to analyze the information on the moving request to the higher WAP page and providing to the mobile communication terminal the higher WAP page information including the contents search means if the current WAP page is a WAP page provided by the contents search means as a result of the analysis.

A bookmark menu creating apparatus according to the present invention comprises: an operation information compiling unit for receiving operation information including information on the terminal recorded whenever the terminal transmits contents providing request information to the integrated management apparatus and operation information including contents connection information composed of URL information provided by the contents, contents ID information and contents menu information and converting to information for bookmark menu generation; a bookmark menu creation information analyzing unit for periodically analyzing the menu creation information which is an operation information compiled by the operation information compiling unit and for establishing a providing frequency priority of the contents provided to the terminal per contents; and a bookmark menu information managing unit for creating and managing a bookmark menu information of the terminal via the contents providing frequency priority information.

A bookmark menu creating method according to the present invention comprises the steps of: recording the operation information including the contents connection information including information relative to the terminal, URL information provided by the contents, contents ID information and contents menu information whenever the terminal transmits contents providing request information to the integrated management apparatus and receives contents corresponding to the contents providing request; the integrated management apparatus receiving the operation information to compile in bookmark menu generating information; the integrated management apparatus periodically analyzing the bookmark menu creation information and establishing contents providing frequency priority provided to the terminal per contents and storing the contents providing frequency priority information; and the integrated management apparatus generating the bookmark menu information of the terminal through the contents providing frequency priority information thus stored.

A bookmark menu generating method according to the present invention comprises the steps of: a WAP gateway or a contents providing apparatus being recorded with operation information including contents connection information including information on the terminal, URL information provided by the contents, contents ID information and contents menu information whenever the terminal transmits the contents providing request information to the integrated management apparatus and receives the contents corresponding to the contents providing request; an interface apparatus receiving the operation information to compile in bookmark menu creation information; a transmission apparatus transmitting contents providing frequency priority information to a core framework after the transmission apparatus receives the bookmark menu creation information and periodically analyzes the information and establishes contents providing frequency priority provided to the terminal; and the core framework receiving the contents providing frequency priority information to create and store the bookmark menu information of the terminal.

A bookmark service providing system according to the present invention comprises an integrated management apparatus for receiving bookmark generation request information relative to contents registerable in a bookmark from a terminal via a communication network, for searching and storing contents address information corresponding to bookmark creation request information, contents name and subscriber information, and for creating a bookmark registerable with the contents name based on the stored information.

A bookmark service method according to the present invention comprising the steps of: an integrated management apparatus receiving bookmark creation request information relative to contents registerable with the bookmark from the terminal; the integrated management apparatus searching contents address information corresponding to the bookmark creation request information, contents name and subscriber information; the integrated management apparatus storing the contents address information, contents name and subscriber information; and the integrated management apparatus creating a bookmark registered with the contents name based on the stored information.

A bookmark service providing method according to the present invention comprises the steps of: an integrated management apparatus receiving bookmark creation request information relative to registerable contents from a terminal; the integrated management apparatus searching contents corresponding to the bookmark creation request information, contents name and subscriber information; the integrated management apparatus storing the contents address information, contents name and subscriber information; the integrated management apparatus creating a bookmark registered with the contents name based on the information thus stored; the integrated management apparatus providing the bookmark to the terminal when the terminal transmits the bookmark to the integrated management apparatus; the terminal transmitting the contents name to the integrated management apparatus via the bookmark; the integrated management apparatus searching the contents corresponding to the contents name and transmitting the contents to a contents providing apparatus; and the contents providing apparatus providing the contents corresponding to the address information to the terminal.

A connecting system for contents providers according to the present invention comprises: a Contents Provider (CP) server for outputting request packet in response to request from a mobile communication terminal; and a CP access framework for discriminating a syntax error and a prescribed condition relative to the request packet from the CP server and receiving various information from legacy system and providing the information to the CP server.

An access system for Contents Providers (CP) according to the present invention comprises: a CP for outputting request packet in response to request from a mobile communication terminal; a CP gateway manager for receiving the request packet from the CP server to check and output a syntax error; a CP access control manager for discriminating a prescribed condition from the checked request packet and outputting the condition; a CP request manager for requesting various information corresponding to the outputted packet; and a core framework for receiving the various requested information from the legacy system and providing the information to the CP server.

An authority providing method for a mobile network operator of wireless portal platform according to the present invention comprises the steps of: providing a website account to a mobile network operator based on prescribed information of the mobile network operator; and providing a mobile network operating authority to the mobile network operator provided with the account.

An authority providing method for a mobile network operator of wireless portal platform according to the present invention comprises the steps of: providing a website account to a mobile network operator based on prescribed information of the mobile network operator; providing a mobile network operating authority to each mobile network operator provided with the account; grouping the mobile network operators into one group; providing an ID to the group club; and providing a mobile network operating authority to the group.

Advantageous Effects

As described above, the present invention can provide a collective management on a plurality of contents providers for providing contents to subscribers, and provide services of integrated contents so that the contents providers can provide convenient services.

Also the present invention can provide an menu according to limited subscription intentions of subscribers.

And also the present invention can manage the operational situations and operational performances for each operating team of operators.

Moreover, according to the present invention, an integrated management apparatus manages contents code numbers received from a contents providing apparatus to enable to input the contents code numbers without passing through a plurality of menu searching process, so that a user can be effectively and swiftly provided with wanted contents.

Furthermore, according to the present invention, an integrated management apparatus receives language information for each predetermined country from contents providers to generate respective menu information comprised of the language information and provides the menu information comprised of language information requested by a service user to a terminal of a user, thereby enabling to support a multi-language assistance for receiving contents conforming to contents request of a mobile communication terminal via menu information.

In addition, according to the present invention, when a user uses contents search means to search the contents wanted to be provided with, an integrated management apparatus receives movement request information to a high-order WAP page from a mobile communication terminal of the user and current WAT page information provided to the mobile communication terminal to transmit the high-order WAP page information including the contents search means to the mobile communication terminal, such that, if there is no menu relative to the contents the current WAP page wants, the user can instantly use the contents search means to enable to effectively conduct a contents search.

In addition, according to the present invention, in the process of being provided with contents via a mobile communication terminal, an integrated management apparatus collects and analyzes information of the mobile communication terminal recorded in a WAP gateway, an URL information provided by the contents, contents idea and contents access information including contents menu information to enable to generate a bookmark menu relative to the contents enjoyably sought after by the mobile communication terminal.

In addition, according to the present invention, in an integrated management apparatus on-line accessible to the mobile communication terminal via communication network, the mobile communication terminal draws up lists of contents names relative to the contents requested to be registered on a bookmark and to generates a bookmark thereof, and the mobile communication terminal can be provided with wanted contents without passing through several contents menu searching processes via the bookmark.

In addition, according to the present invention, the contents providers are connected to legacy system via contents providing access apparatus relative to various information requests from the contents providers, thereby enabling to smoothly effect a communicative management between the contents providers and the legacy system.

In addition, the present invention provides an authority providing method to mobile network operators of wireless portal platform by which a predetermined number of mobile network operators are provided with menu operation use right for each different level, thereby enabling the mobile network operators to effectively manage the wireless portal platform.

DESCRIPTION OF DRAWINGS

The accompanying drawings, which are included to aid in understanding the invention and are incorporated into and constitute a part of this application, illustrate embodiment(s) of the invention and together with the description serve to explain the principles of the invention. In the drawings:

FIG. 18 to FIG. 24 are schematic drawings of websites pages for creating a segment group according to still another embodiment of the present invention;

FIG. 46 is a schematic drawing of a website page illustrating detailed information relative to mobile network operators according to still further embodiment of the present invention;

FIG. 48 is a schematic drawing for explaining a process of authority providing to mobile network operator according to still further embodiment of the present invention;

FIG. 49 and FIG. 50 are schematic drawings of website pages illustrating an authority providing state of mobile network operators per menu according to still further embodiment of the present invention; and FIGS. 51 to 55 are schematic drawings for illustrating website pages showing a process of grouping prescribed mobile network operators into one group according to still further embodiment of the present invention.

Figure 1:
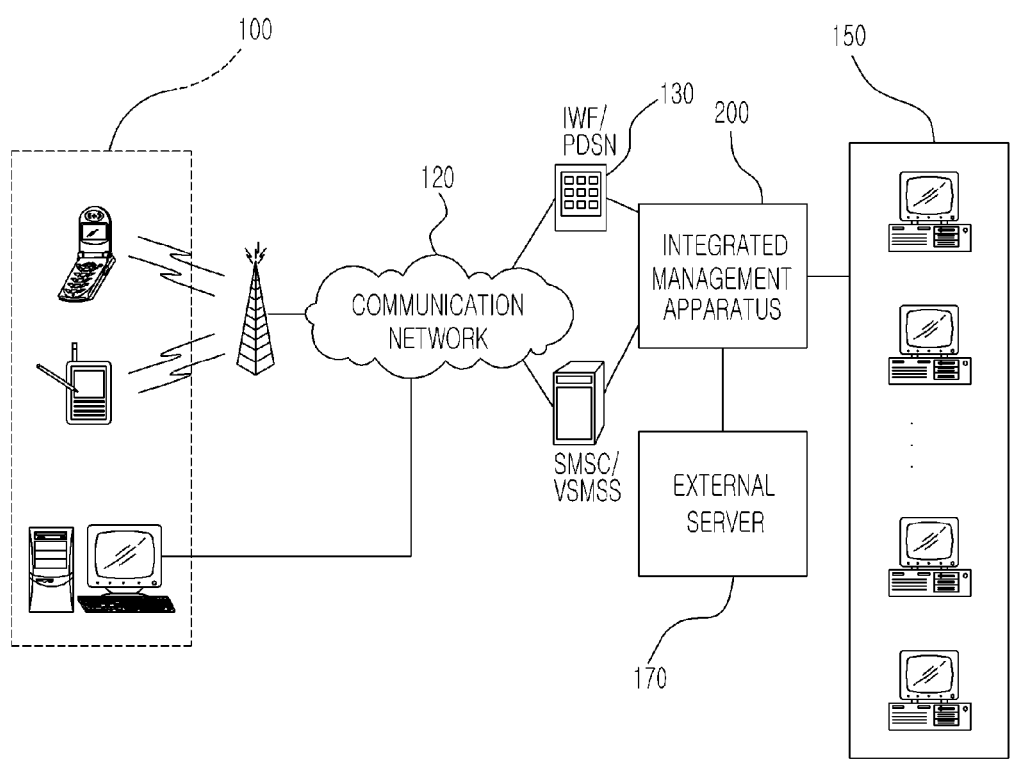
FIG. 1 is a schematic drawing illustrating a system for serving contents according to one embodiment of the present invention.

The following examples are given for the purpose of illustration only and are not intended to limit the scope of this invention.

BEST MODE

Hereinafter, preferable embodiments according to the present invention will be described with reference to the accompanying drawings. Here, when one element is connected to another element, one element may be not only directly connected to another element but also indirectly connected to another element via another element. Further, irrelative elements are omitted for clarity. Also, like reference numerals refer to like elements throughout.

FIG. 1 is a schematic drawing illustrating a mobile communication system for serving contents according to one embodiment of the present invention.

Referring to FIG. 1, the mobile communication system for serving contents includes a communication network (120) and an integrated management apparatus (200), and other application, the system includes a contents providing apparatus (150) and/or an external server (170).

The communication network (120) includes a wired network and a wireless network, and connects a subscriber terminal (100), a contents providing apparatus (150) and the external server (170).

The subscriber terminal (100) includes a mobile phone handset capable of wireless communication, a mobile communication terminal including PDA and a computer capable of wired communication.

In the present embodiment of the invention, the subscriber terminal (100) is a mobile communication terminal, hereinafter, and for the sake of convenience of explanation, the subscriber terminal (100) is limited of explanation to a mobile communication terminal. Although reference numeral of the mobile communication terminal will be given as same as that of the subscriber terminal (100), it should be noted that the subscriber terminal (100) is not limited to the mobile communication terminal.

A contents provider according to the present invention is a provider who provides to the mobile communication terminal (100) via a mobile communication system services including contents composed of various data and application programs.

The integrated management apparatus (200) has an opening structure including a contents provider access apparatus, a central management apparatus, a transmission apparatus and interface apparatus and is a portal platform equipped with flexibility and moduleabilty embodiable with other solutions. Examples of web server supported by the integrated management apparatus (200) include HP-UX, Sun Solaris, WebLogic, Oracle9IAS, SunOne Web Server and the like. Furthermore, the integrated management apparatus (200) supports worldwide regulations related to wireless businesses such as WAP (Wireless Application Protocol) and the like.

The integrated management apparatus (200) integrates the contents providers, services and contents of the contents providers, and menu of subscribers for management such that services can be effectively and rapidly controlled and provided. Moreover, the integrated management apparatus (200) provides service-based subscription and CP policy-based authentication models.

The integrated management apparatus (200) provides a search engine for mobile communication terminal, and also provides WAP pages for a subscriber to carry out searches using search and code in response to key words.

The contents providing apparatus (150) receives an account from the integrated management apparatus (200) via the communication network (120) and registers a service to be provided to the mobile communication terminal (100). The integrated management apparatus (200) carries out an overall management necessary for providing contents, i.e., providing service to the mobile communication terminal (100). For example, the integrated management apparatus (200) carries out subscriber management, menu providing, contents provider management necessary for providing contents. When contents provision is requested by a user, the contents providing apparatus (150) directly provides the contents to the mobile communication terminal (100) via the communication network (120). The integrated management apparatus (200) is connected to an external server (170), where an example of the external server can be a billing server or the like.

Figure 2:
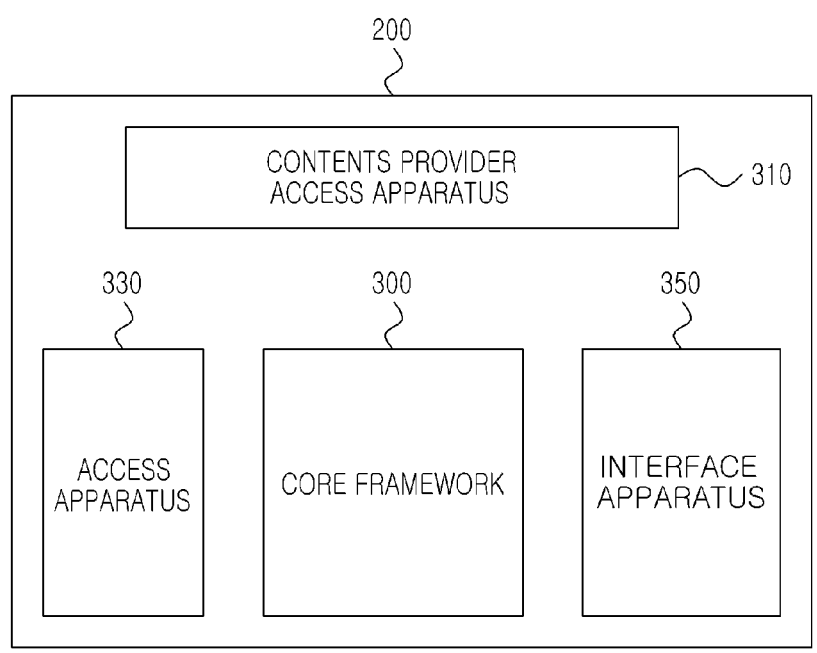
FIG. 2 is a schematic structural drawing of an integrated management apparatus.
Figure 3:
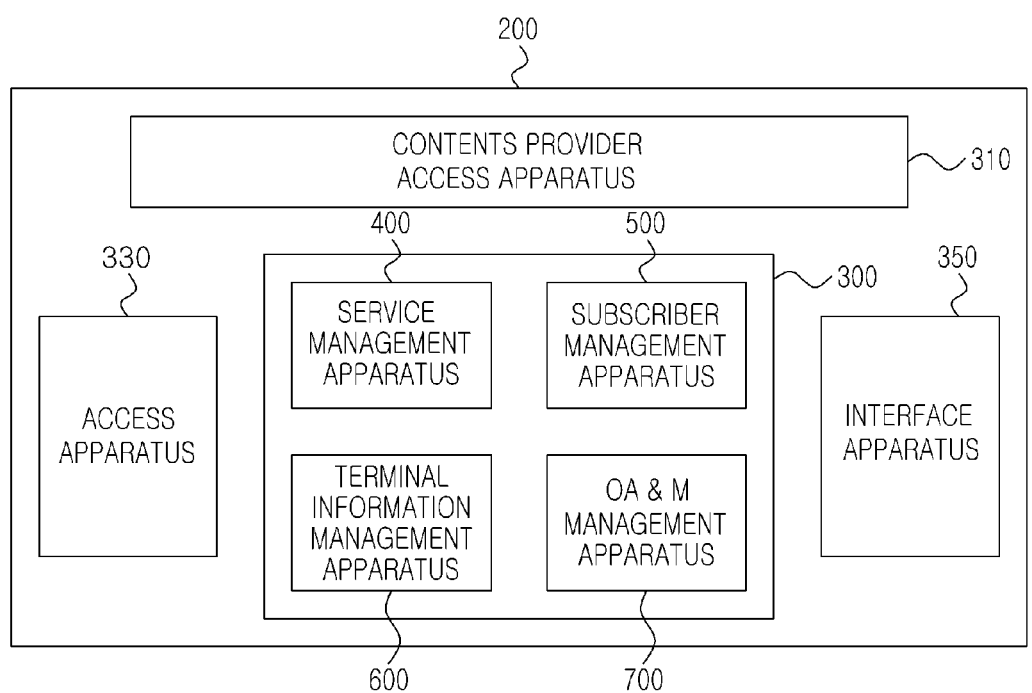
FIG. 3 is a detailed drawing of the integrated management apparatus according to the embodiment of the present invention.
Figure 4:
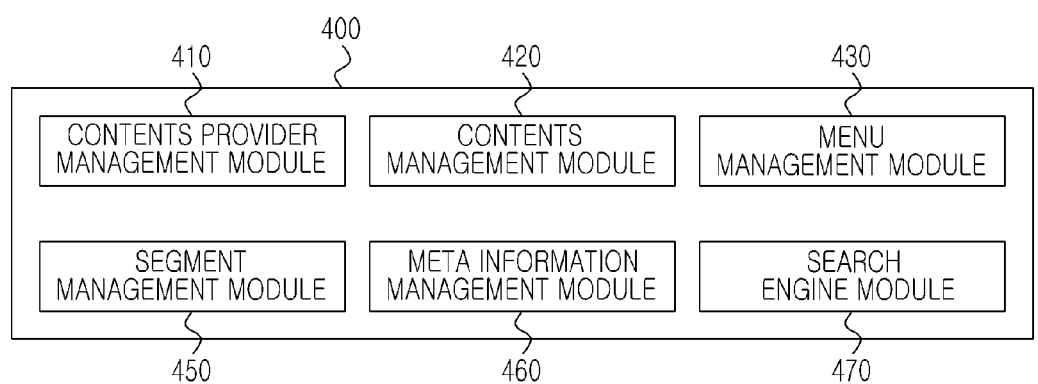
FIG. 4 is a detailed drawing illustrating a module of a service management apparatus according to another embodiment of the present invention.

FIG. 2 is a schematic structural drawing of an integrated management apparatus, FIG. 3 is a detailed drawing of the integrated management apparatus according to the embodiment of the present invention, and FIG. 4 is a detailed drawing illustrating a module of a service management apparatus according to another embodiment of the present invention.

Referring to FIGS. 2, 3 and 4, the integrated management apparatus (200) includes a contents provider access apparatus (310), a central management apparatus (300), a transmission apparatus (330) and an interface apparatus (350).

Furthermore, the central management apparatus (300) includes a service management apparatus (400), a subscriber management apparatus (500), a terminal information management apparatus (600), and OA&M management apparatus (700). The service management apparatus (400) of the central management apparatus (300) includes a contents provider management module 9410), a contents management module (420), a menu management module (43), a segment management module (450), a meta information management module (460) and a search engine module (470).

The contents provider management module (410) is a module for managing the Contents Provider (CP). The contents provider management module (410) carries out functions of creating and managing a server account of the contents provider based on information of the contents provider provided from the contents providing apparatus (150) accessed via the contents provider access apparatus (310). Furthermore, if the contents provider provides various kinds of services, the contents providing server and the contents providing group are registered as many as the kinds of services to be provided via the contents provider management module (410).

The contents provider management module (410) is equipped with access stop and stop release functions such that a website server account can be locked lest that the contents providing apparatus (150) should be accessed to the integrated management apparatus (200) server for a predetermined period of time such as a period of system work or the like.

The contents provider who has generated a website server account via the contents provider management module (410) registers contents-related information via the contents management module (420) for providing the contents to the mobile communication terminal (100). In other words, the contents management module (420) is a module for managing a contents access point and URL information of the contents so that the mobile communication terminal (100) can be accessed to the contents. A central management service operator monitors what types of contents are provided to the mobile communication terminal (100) of the subscriber via the contents management module (420)

Figure 13:
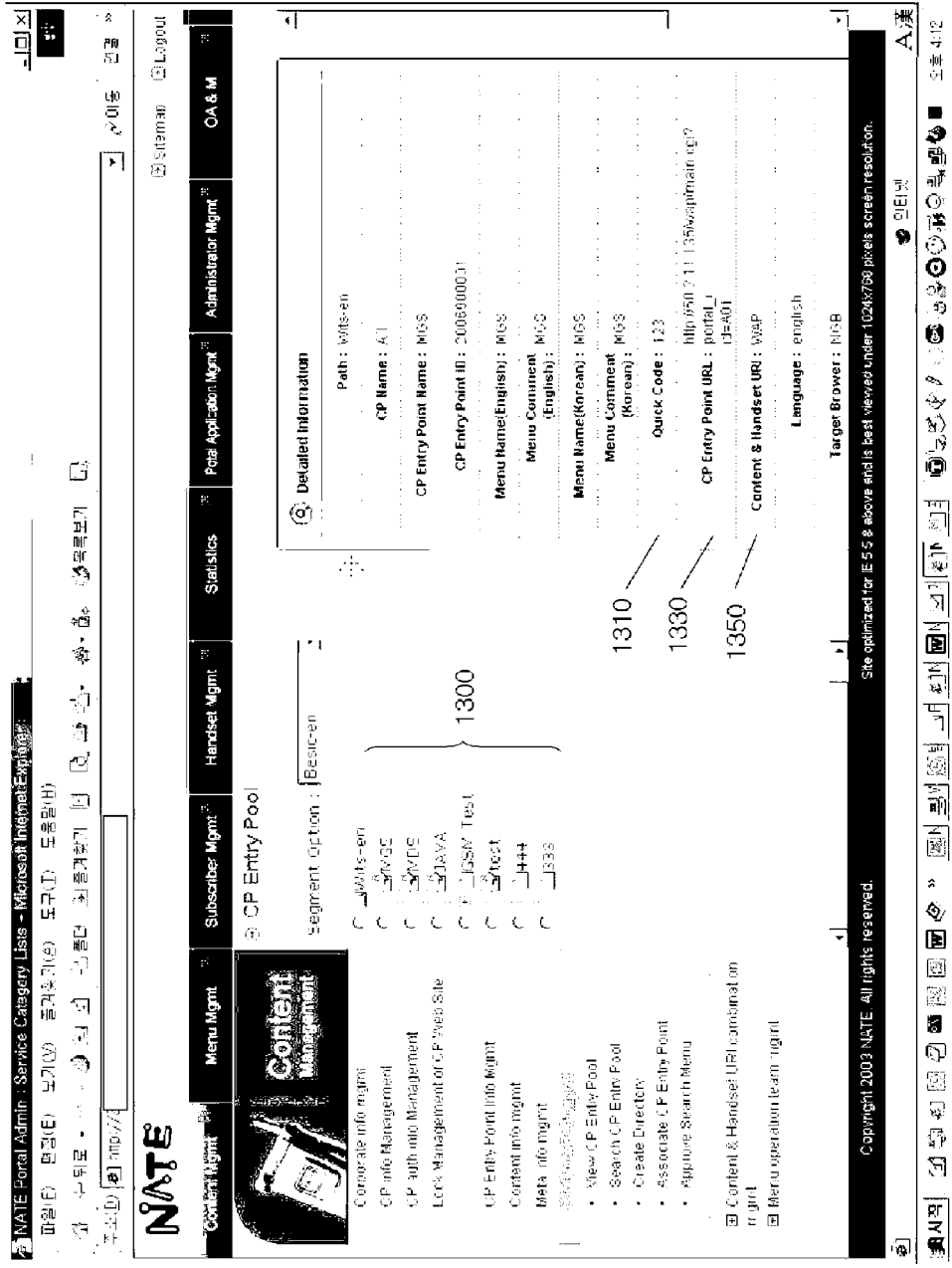

An operator of the integrated management apparatus (200) creates a directory (1300) per nature of the contents at a contents entry pool as shown in FIG. 13 so that the contents providers can register the contents access point according to the nature of the contents. When the directory per nature of the contents is registered with the contents access point, a contents-embodiable terminal information of the mobile communication terminal is also registered (see reference numeral 1350 of FIG. 13).

An operator generates a menu for providing information relative to the contents provided by the contents provider to the mobile communication terminal. At this time, the menu is embodied by a directory menu and a CP entry menu. The CP entry menu is connected to the contents access point registered with the contents entry pool.

The meta information management module (460) manages a lots of languages supported by the contents providing apparatus, a mobile communication terminal and an operator terminal. Therefore, when the contents provider registers information relative to his or her contents at the contents entry pool, the contents provider also registers what language base the contents have been embodied.

The contents management module (420) searches a contents access point corresponding to contents request code (Q-Code), in cooperation with the search engine module (470), when the contents request code transmitted from the mobile communication terminal is received. If the search is completed, the mobile communication terminal is connected to the contents access point to receive the contents. Furthermore, the contents management module (420) uses information relative to the contents access point and the contents to store use information of the contents and contents entry of the mobile communication terminal based on the billing creation. The contents management module (420) also periodically uploads the stored information to the billing server connected to the interface apparatus (370).

The segment management module (450) is such that segment for each contents service provided in response to sex, age, occupation and taste and the like of the subscriber is formed by an operator. The operator connects the menu conforming to the nature of the segment to the segment via the menu management module (430). When the mobile communication terminal (100) subscribed to the segment is connected to the integrated management apparatus (100) via the communication network (120), the menu connected to the segment is transmitted.

As an example of the segment per contents service, and in case a mobile communication terminal of a soldier is connected to a wireless Internet, a soldier exclusive main menu is displayed. The soldier exclusive main menu and a tree thereof are connected to military-related information only.

As another example of the segment per contents service, a mobile communication terminal used by clergyman is completely blocked from obscene servers, a main menu for clergymen linked to only contents related to religion of the clergymen is provided.

Now, operation of the present invention thus constructed will be described.

A contents provider is connected to the integrated management apparatus (200) via the contents providing apparatus (150). To be more specific, the contents providing apparatus (150) is connected to the central management apparatus (300) via the contents provider access apparatus (310). A screen of the contents providing apparatus (150) accessed to the central management apparatus (300) is displayed with a website page as shown in FIG. 5.

Figure 5:
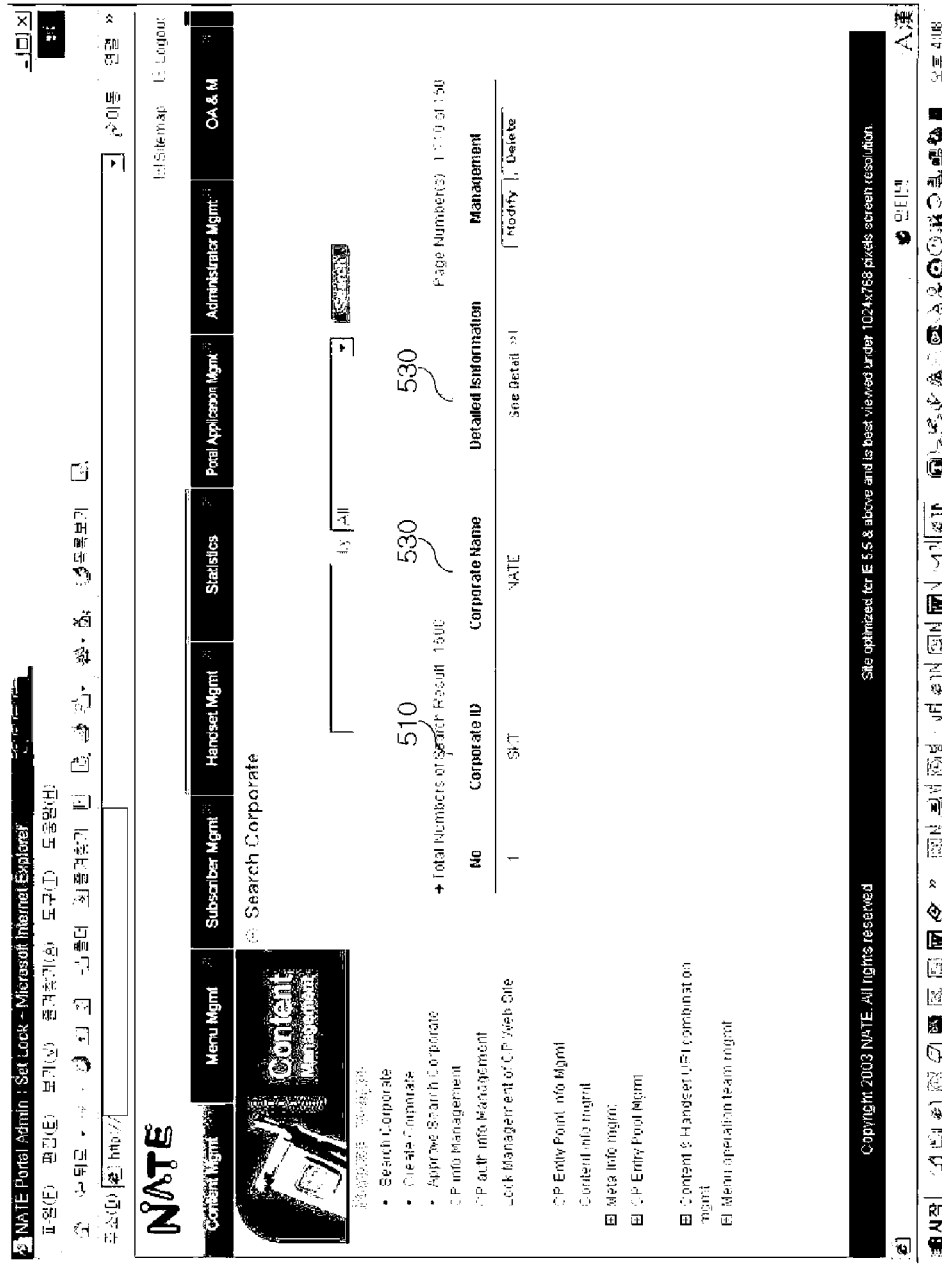
FIG. 5 to FIG. 13 are schematic drawings of website pages for explaining a management method for creating segments according to still another embodiment of the present invention.

The contents provider, via the website page of FIG. 5, inputs an ID (510) of the contents provider, a name (530) of the contents provider and other information (550) of the contents provider. As a result, the operator checks the information thus inputted, and provides a website server account to the contents provider. If the contents provider provided with the website server account is to register lots of service contents providing groups, as shown in FIG. 6, a website page is used.

Figure 6:
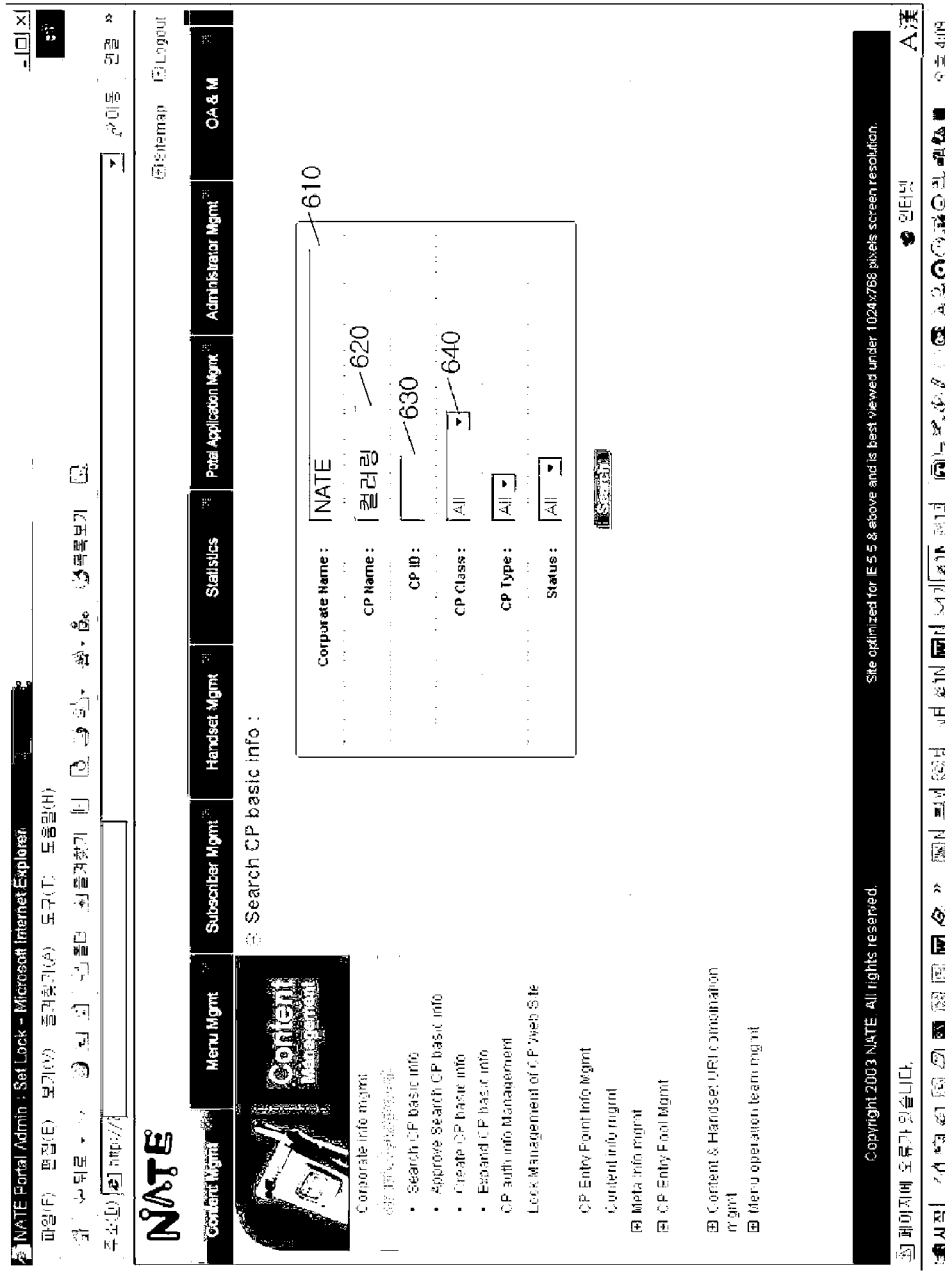

Referring to FIG. 6, when a contents provider named NATE (610) wants to be provided with coloring service, [coloring] is inputted to the contents providing group name (620). The contents providing groups are classified per nature of service, and examples thereof are a picture friend, a bell sound, a moving picture and the like.

Figure 7:
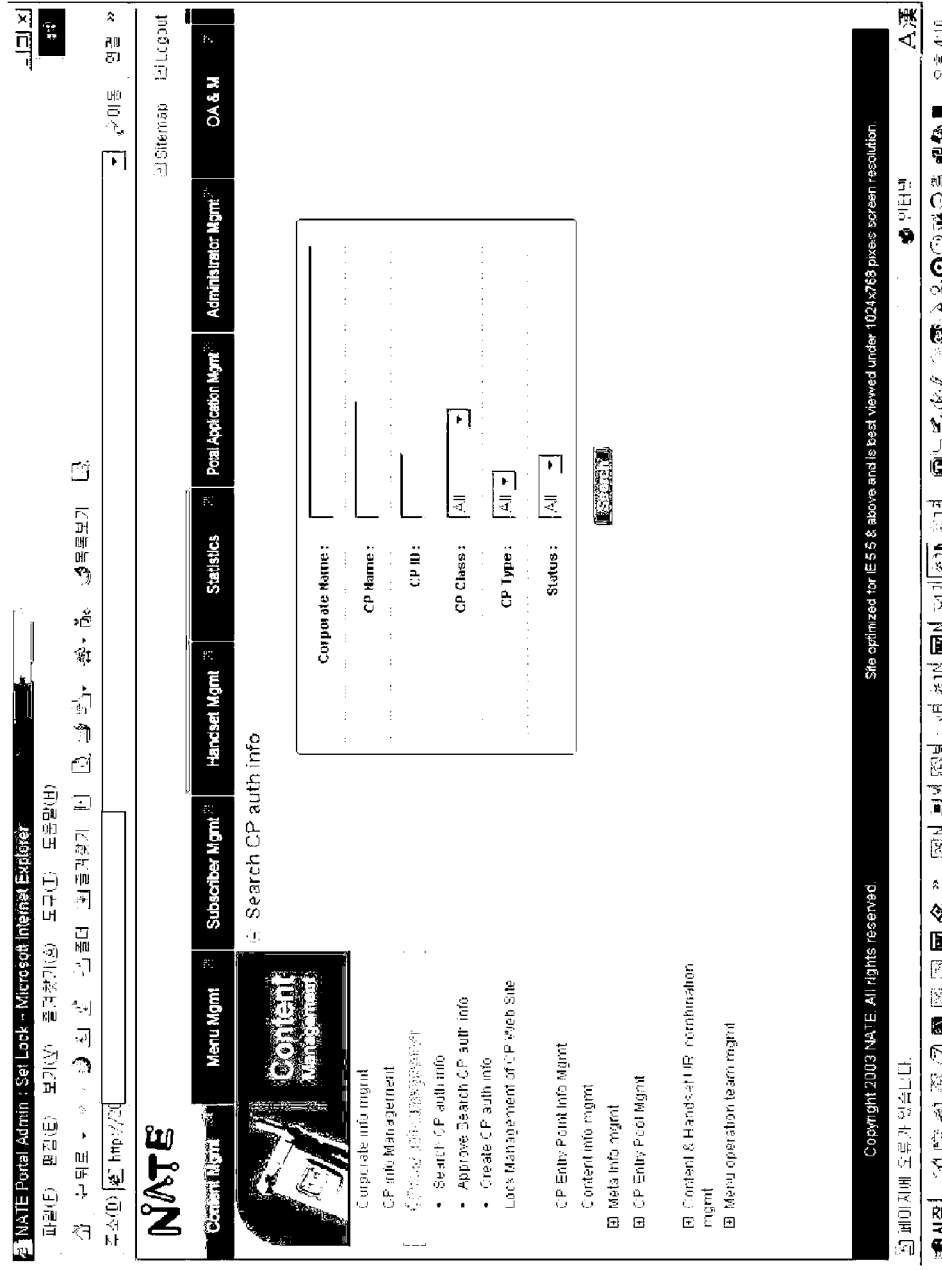

When the contents provider is completed in being inputted into an input column formed by the operator, the operator determines whether to authorize the registration of the contents providing groups according to a prescribed regulation. Following the registration of the contents providing group, the contents provider establishes an authority per contents providing group via the website page illustrated in FIG. 7. The authority of the contents providing groups may be determined by the network operator in response to the application of the contents provider, or may be unilaterally determined by the network operator.

The authority per contents providing group is comprised of items necessary for transmitting the contents to the mobile communication terminal (100). In other words, specification of a terminal displayable by the contents is registered, and request is made for information of a subscriber necessary for providing the contents. For example, a contents provider providing a movie is registered with specification of a terminal for providing a movie, and requests subscriber information including a telephone number and a resident registration number of the subscriber of the mobile communication terminal.

Figure 11:
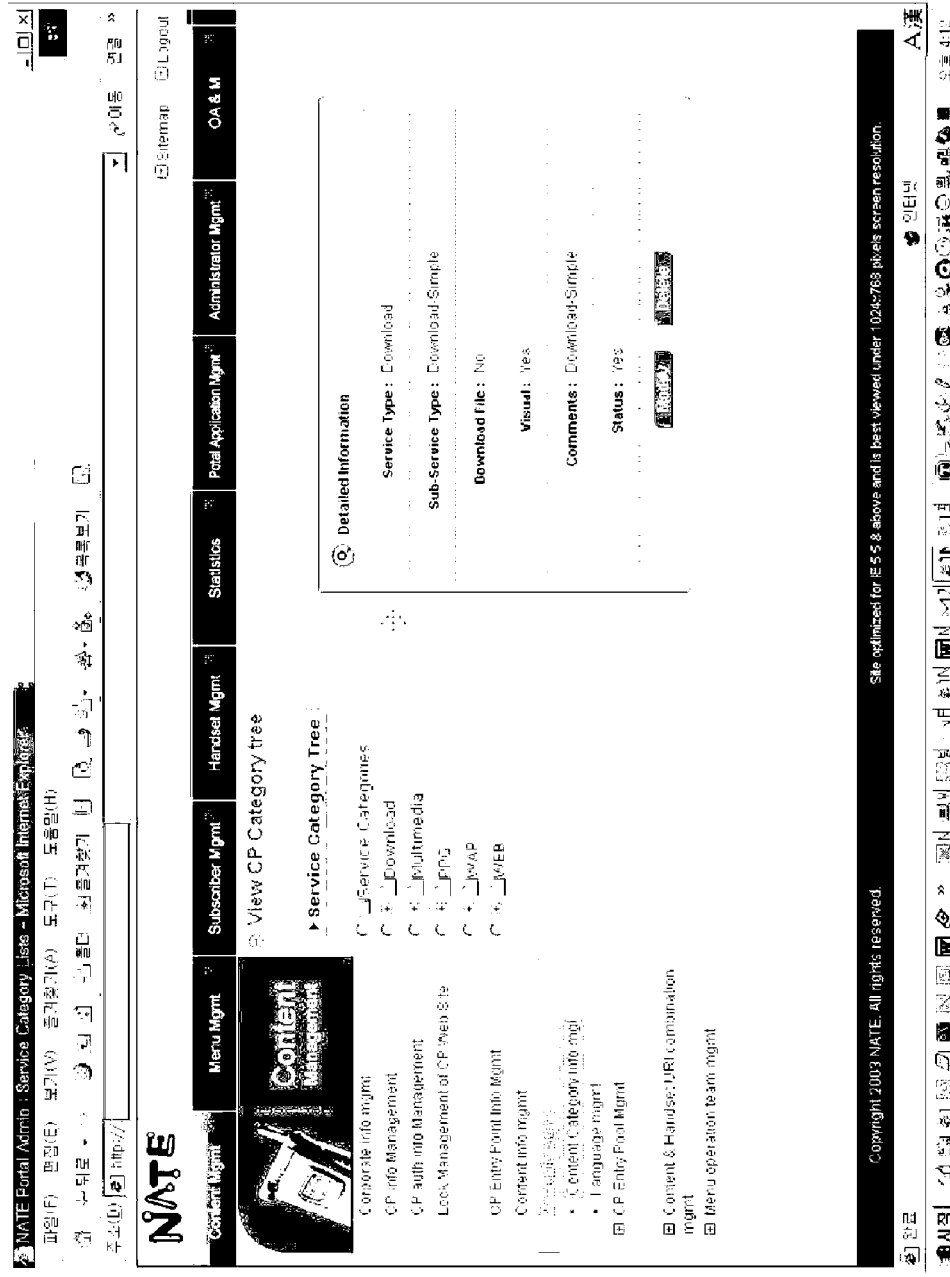

Furthermore, the contents subscriber registers a language which is the base of the contents via the website page illustrated in FIG. 11. When the operator sets up at least more than one language which is the base of the contents out of languages provided from the integrated management apparatus (200) of the present invention, one language out of the languages is selected by the user of the mobile communication terminal receiving the contents.

The operator provides subscriber information differentiated according to the contents provider. As a result, a subscriber information item selectable by the contents provider is created according to a prescribed standard which is transmitted to the contents providing apparatus (150).

In another application example, all the subscriber information items are displayed, whether to authorize relative to the item selected by the contents provider is determined and informed.

Figure 8:
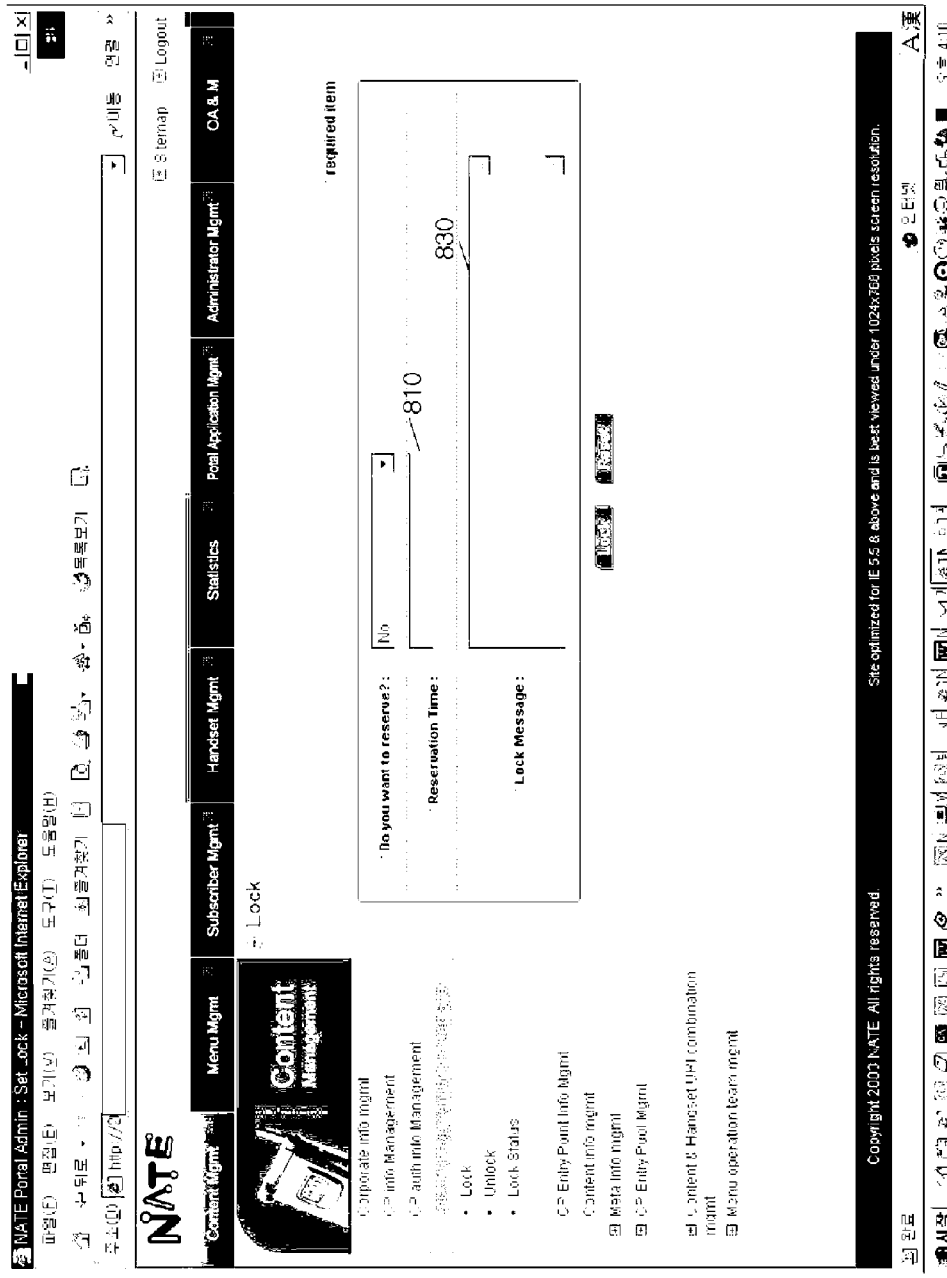

FIG. 8 is a schematic drawing for illustrating a website page in which approach of contents providers are prohibited or released of prohibition by an operator. If approach prohibition is necessary, when approach prohibition reason relative to the approach prohibition time (810) and approach prohibition message (830) is inputted, the reason is displayed on the contents providing apparatus (150).

Next, the contents provider should register a link menu turning over to a menu (CP access menu) created by the contents provider from a directory menu, i.e., a menu provided by the operator.

Figure 9:
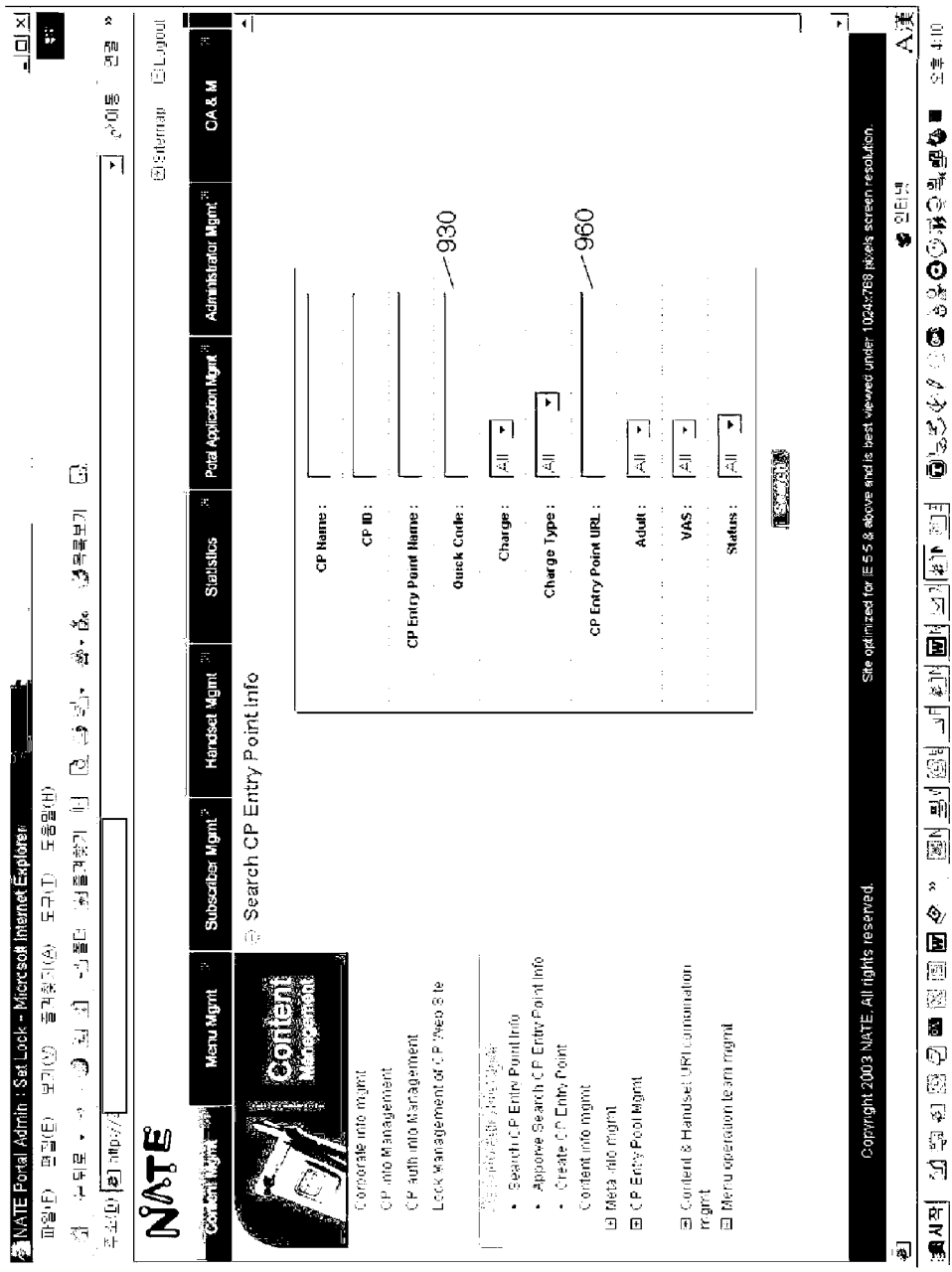

To elaborate by referring to FIG. 9, the mobile communication terminal (100) should access to a server stored with relevant contents in order for the contents provider to provide contents to the mobile communication terminal (100). At this time, the contents provider registers an URL information of a server where the contents are situated, i.e., the contents access point (960), with a directory (1300) per nature of the contents created in the contents entry pool by an operator. Furthermore, the operator embodies a directory menu and a CP access menu, and selectively connects the directory (1300) of the contents entry pool to the CP access menu, such that, when the mobile communication terminal (100) selects a name of particular contents, i.e., one item of menu, from the menu, a connection is made to the contents by the contents access point connected to the menu item.

When the contents access point is registered in the contents entry pool, the contents request code (Q-code. 930) is also registered. When the contents request code is inputted to the mobile communication terminal (100), the contents access point (960) registered along with the contents request code (930) is searched and contents linked to the contents access point (960) are transmitted to the mobile communication terminal (100).

Figure 10:
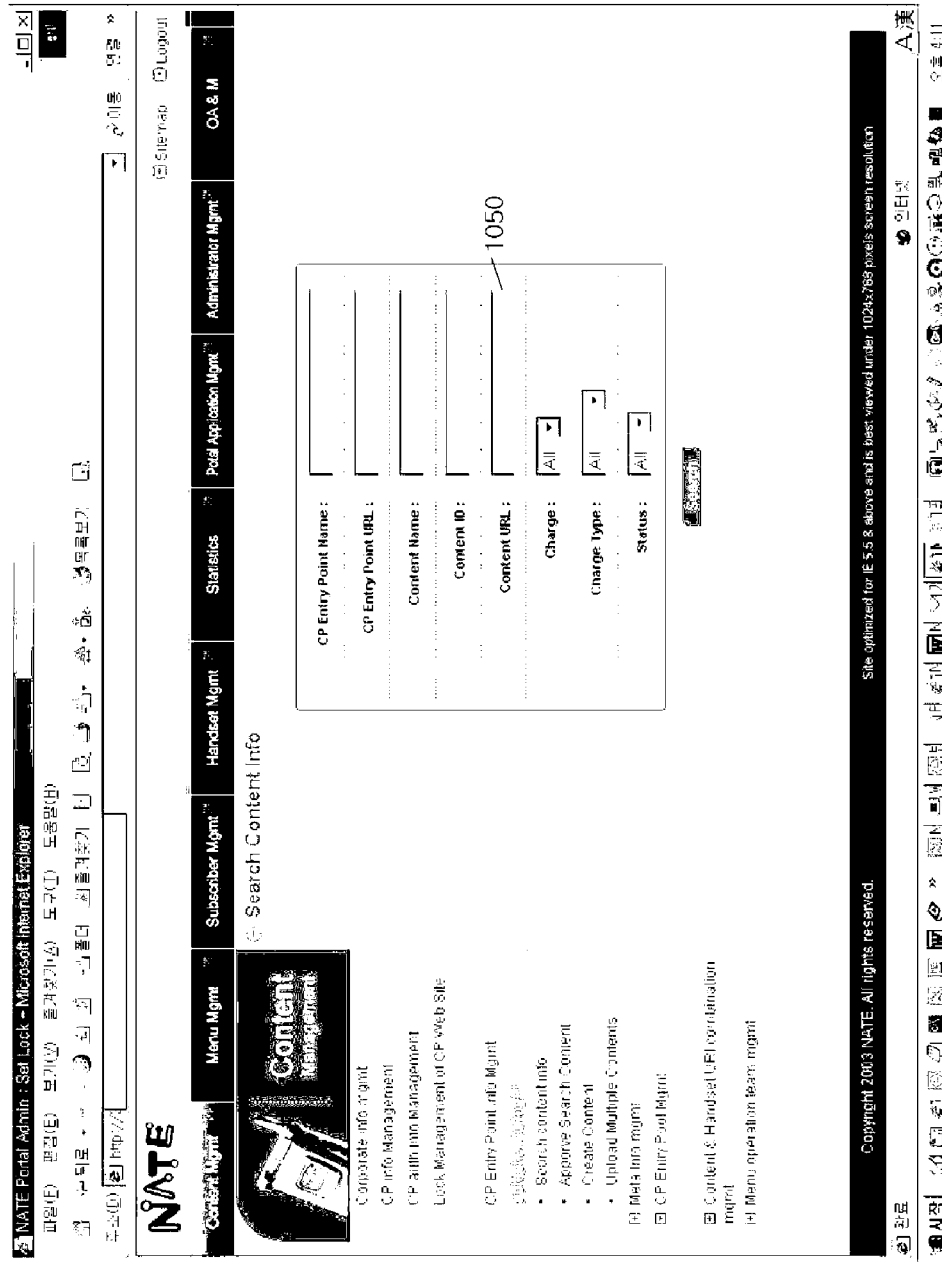

Furthermore, the contents provider registers the URL information of contents via a website page illustrated in FIG. 10. As a result, as the contents access point (960) and the contents URL are registered, the contents are monitored by the network operator.

Figure 12:
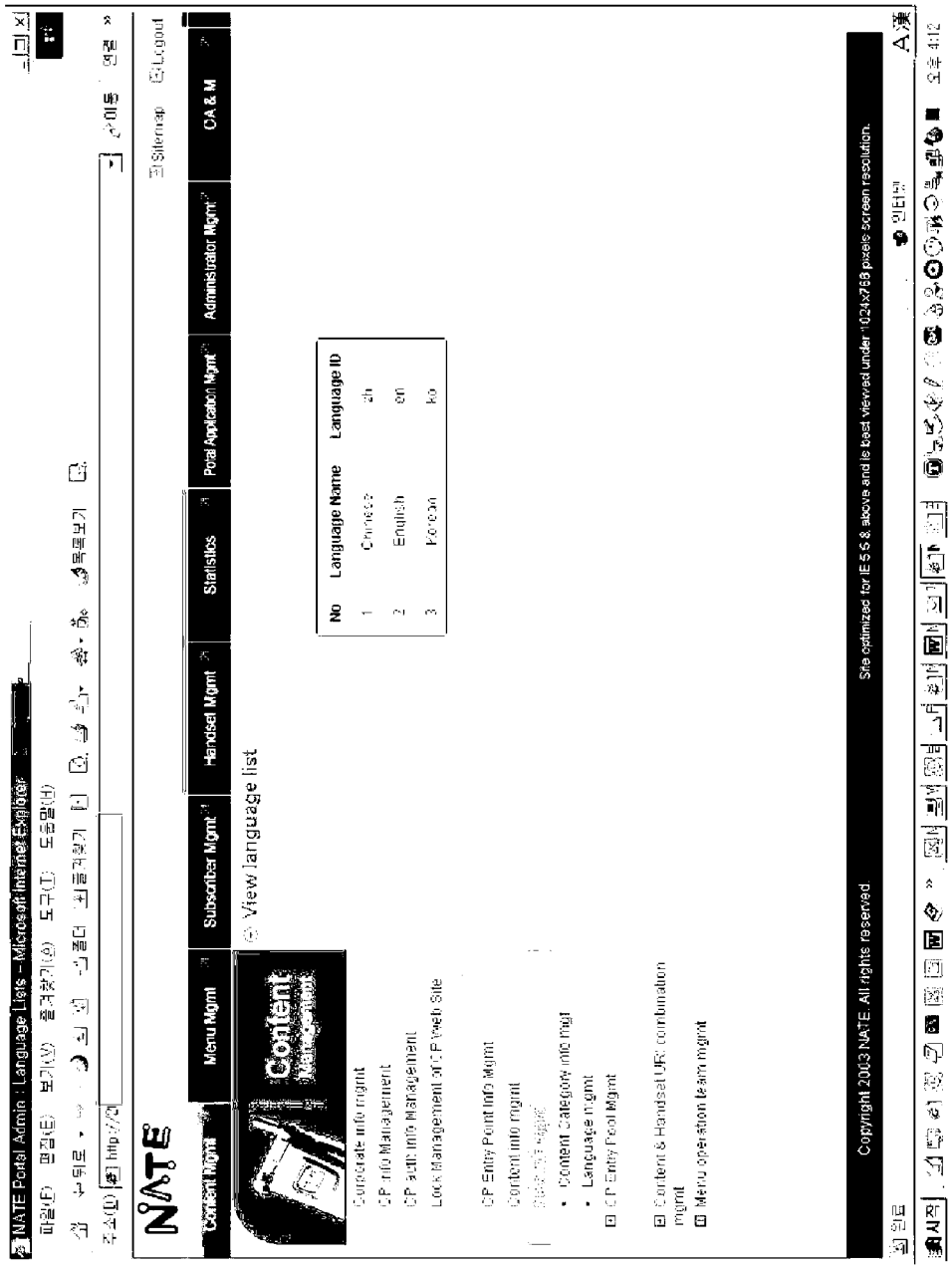

The contents provider uses the website page illustrated in FIG. 12 and registers the contents access point of the contents providing group in a menu displayed in the mobile communication terminal (100).

The segment according to the service generated by the operator is a service unit created for providing a menu specialized to a relevant group by grouping in accordance with an attribute of a wireless Internet user of the mobile communication terminal.

In case of connecting to the wireless Internet currently provided, for example, in case of connecting to NATE operated by SK Telecommunication, all the mobile communication terminals are provided with the same main menu. Unlike the NATE, in the present invention, different main menus are provided when subscribers are connected to the wireless Internet in accordance with what service a subscriber has subscribed to. Of course, accessible contents create different parts because of different menus.

Still further embodiment of the present invention is a service, i.e., contents providing method to a subscriber terminal via a segment realization.

The segment is a management tool for providing services with regard to a subscriber. In other words, a segment is constituted for providing a particular service. Therefore, menu system is different for specialized service catering to subscriber-by-subscriber. For example, a first segment can be embodied exclusively for games, a second segment can be materialized exclusively for sports, a third segment exclusively for movie, and a fourth segment exclusively for travel.

In case a subscriber subscribed to a first segment and is accessed to a wireless Internet via the subscriber terminal (100), a main menu related to game is transmitted to the subscriber terminal (100). In the same fashion, a main menu related to sports is transmitted to a subscriber terminal (100) subscribed to a second segment, and a main menu related to movies is transmitted to a subscriber terminal (100) subscribed to a third segment, and a main menu related to travel is transmitted to a subscriber terminal (100) subscribed to a fourth segment.

For this purpose, in the preferred embodiments of the present invention, a lot of segments are created, and a menu conforming to each segment attribute is registered with a segment. An operator establishes a default segment (hereinafter referred to as basic segment for a subscriber who has not subscribed, such that when the subscriber is accessed to a wireless Internet, a menu supported by the basic segment is transmitted to a subscriber terminal.

The basic segment, other than the aforementioned, can be used when it is not known whether a subscriber has subscribed to a segment or not due to errors of the wireless Internet network.

Figure 14:
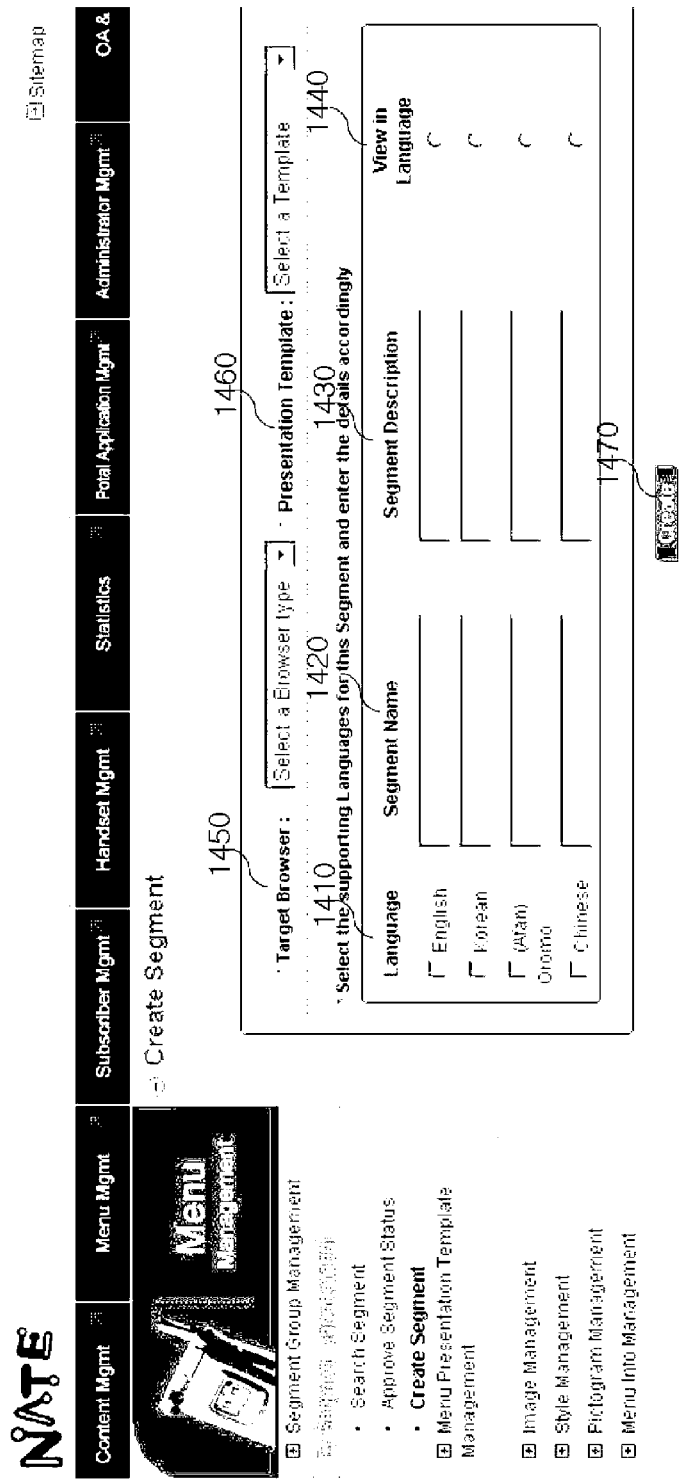
FIG. 14 to FIG. 17 are schematic drawings of website pages for creating segments according to still another embodiment of the present invention.
Figure 15:
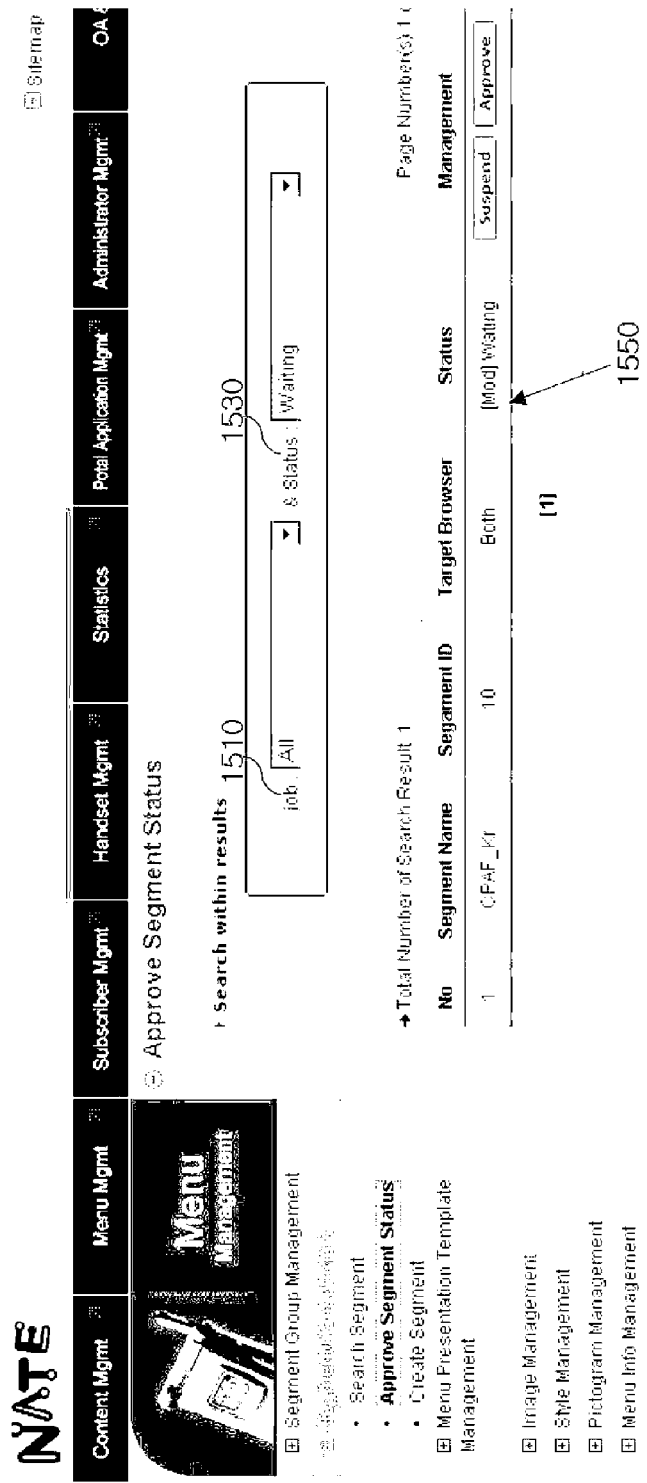

FIG. 14 to FIG. 17 are schematic drawings of website pages for creating segments according to still another embodiment of the present invention, where FIG. 15 is a flow chart for explaining still another embodiment of the present invention, and where S is step.

Referring to FIG. 14, languages (1410) to be provided to a subscriber terminal are established for an operator to create a segment (S2510). The languages (1410) are the ones supported by a meta information management module.

When English and Korean are selected out of languages by an operator, the operator inputs a brief explanation related to the segment and a name of the segment in English and Korean (S2520). Furthermore, a language (view in language. 1440) supported by an operator terminal can be selected from a website page illustrated in FIG. 14. Accordingly, if the operator selects the English, the website page provided to the operator terminal is provided all in English.

When a segment is created by an operator, the operator designates a browser type, i.e., a target browser (1450) of a subscriber terminal supported by the segment (S2530). For the target browser (1450), 1.x supporting a text and a Next Generation Browser which can provide multimedia contents such as moving pictures are present. The operator may select both of the two browsers or may select one of the two.

On top of that, the operator uses a presentation template (1460) to establish a type of menu to be provided to a subscriber terminal (S2540). The type of menu is determined when the operator creates the menu, and, as an example, a menu type such as a tree structure, an icon structure, large font for children or senior citizens can be embodied. When input or selection is completed by the operator to select a creation button (1470) activated in website of FIG. 14, a segment creation is finished.

Because the creation-finished segment is still to be approved by the operator, an approval is effected via a website page for segment approval as illustrated in FIG. 15 (S2550). The operator who can carry out the approval with regard to segment selects the kind (1510) of operation to be carried out in the website page and segment status (1530). The kind of operation to be effected includes creation, change and deletion items and the segment status (1530) includes stand-by, temporary approval, approval completion, and deferment items. The segment status (1530) is determined by whether approval completion items are displayed or not in response to a security grade of a log-in operator. In other words, if the security grade is high, a complete approval can be effected. If the kind (1510) of operation to be carried out by the operator and the segment status (1530) are selected, a segment list such as reference numeral 1550 is displayed.

Figure 16:
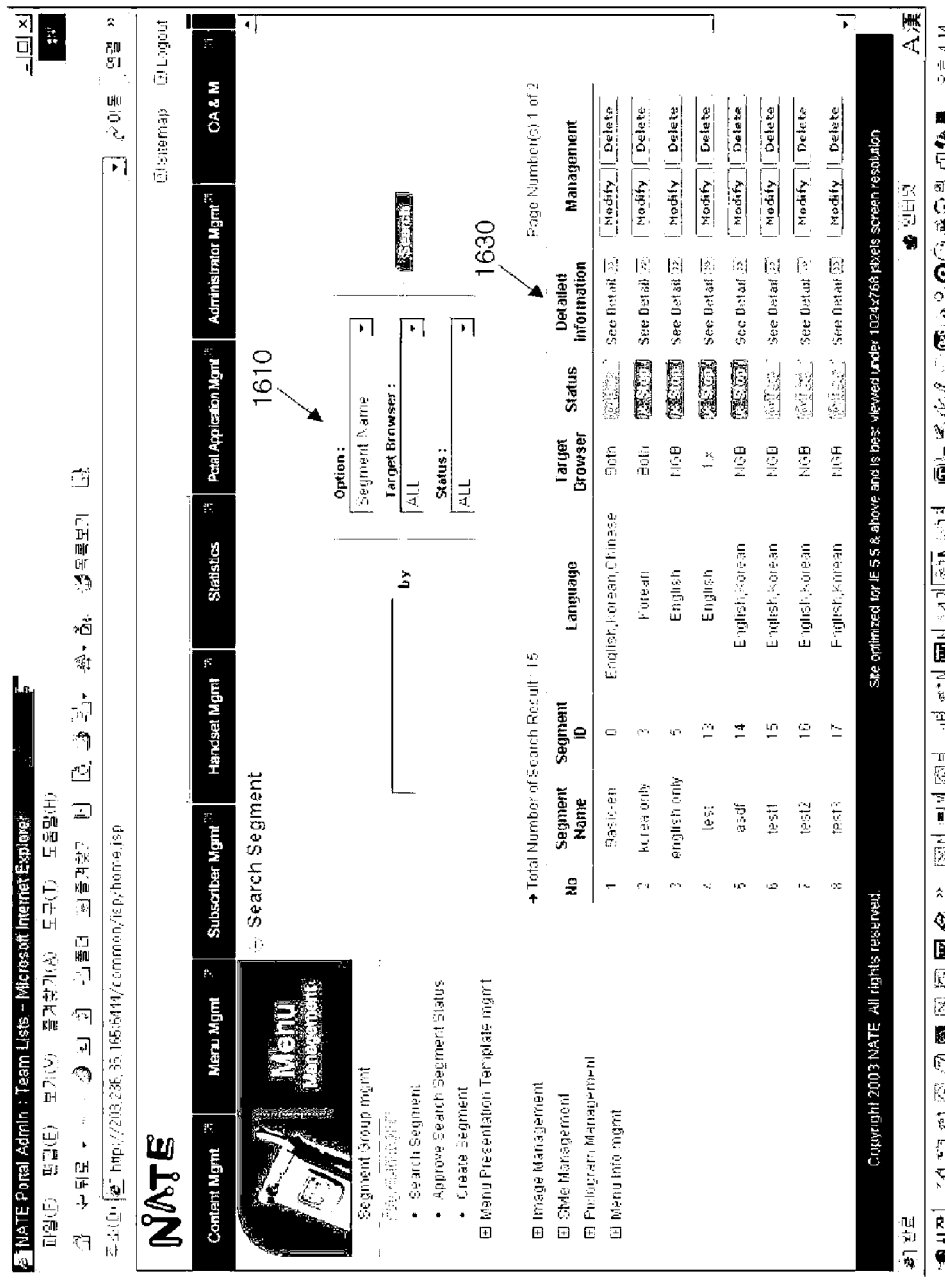

FIG. 16 is a schematic drawing illustrating a website page for searching a segment created by an operator.

A segment search is carried out in response to a prescribed condition via the website page. When the prescribed condition (1610) is inputted, all the segments satisfying the inputted condition are displayed as the reference numeral 1630. At this time, changes and deletions for the displayed segments can be effected.

Figure 17:
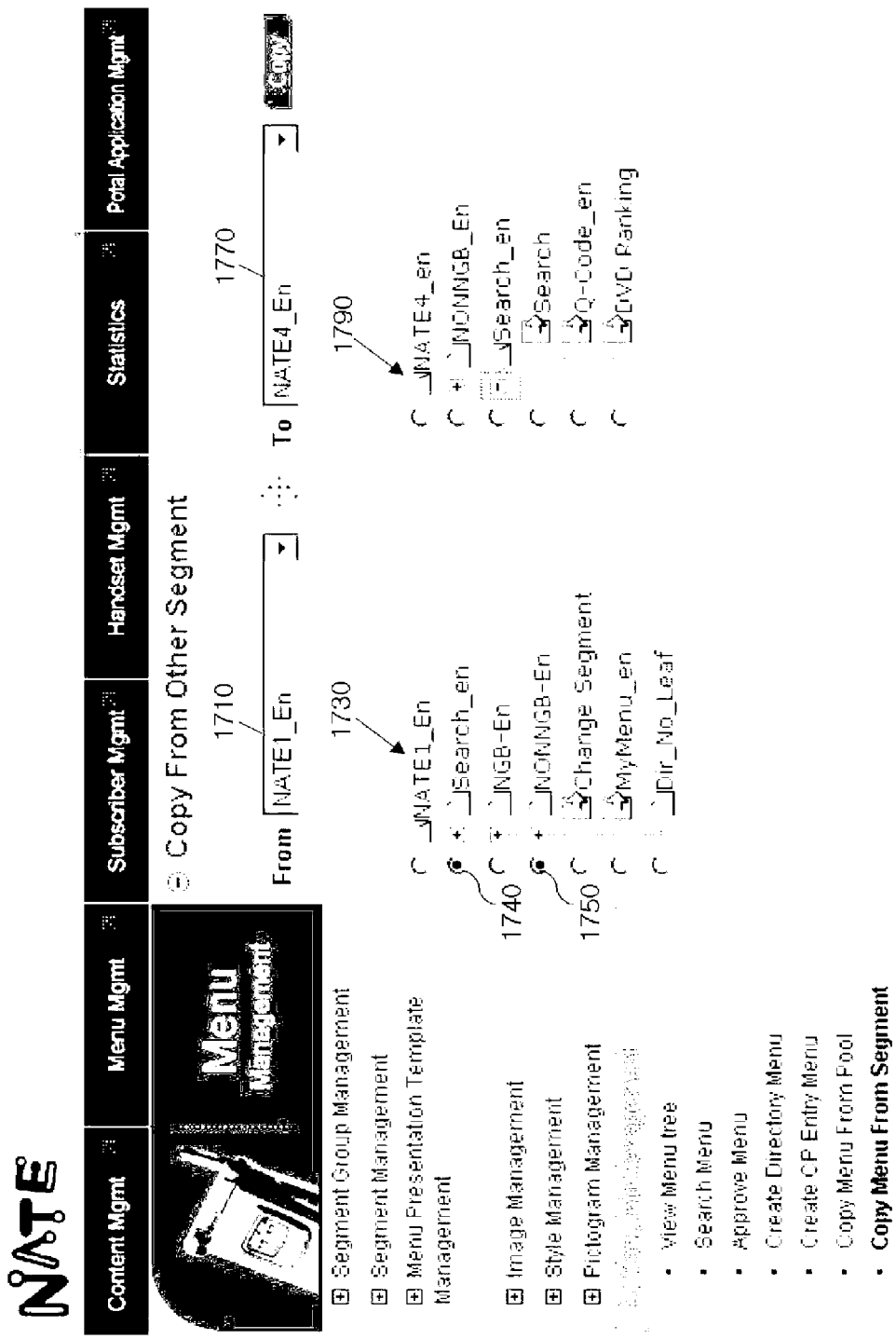

FIG. 17 is a schematic drawing illustrating an example of a website page in which a method connecting a menu to a segment by an operator is shown (S2560). The operator uses reference numeral 1710 to select a higher directory conforming to the nature of the segment. In the present embodiment, a segment, [NATE_En] is selected. If [NATE_En] is selected, a lower directory such as reference numeral 1730 is displayed in a tree structure. The higher directory includes a plurality of lower directories.

When [Search-en], [NINNGB-En] items are selected from the to-be-copied segment [NATE_En] (1710) by the operator, and when a to-be-copied segment [NATE4_En] (1770) is selected and a copy icon (780) is selected, the copy is carried out. Reference numeral 1790 denotes a directory included in the segment [NATE4_En] (1770) after the copy is carried out and the segment [NATE4_En] (1770) is completed in copying.

According to still further embodiment of the present invention, there is provided a contents providing method which is providing services to a subscriber terminal via embodiment of a segment group.

A segment group includes a plurality of segments. A menu created by the segment group is transmitted to a terminal of a subscriber joining the group. The subscriber who has joined the segment group is accessible to all segments belonging to the segment group. For example, a first segment group may be embodied exclusively for youth by an operator, a second segment group exclusively for men, a third segment group exclusively for ladies. As another example, it is possible for each segment group to include a basic segment, a multiple segment, a segment per billing system and a segment for each terminal.

When a subscriber joins the first segment group, and registers that he or she will receive service via the basic segment, and is accessed to the wireless Internet via the subscriber terminal, a main menu of basic segment related to youth is transmitted to the subscriber terminal. For example, games, movies, singing, reading, college entrance information are embodied in the main menu, which can be amended and/or deleted by an operator. A subscriber who has joined the first segment group can be freely accessed to all the segments belonging to the first segment group. However, the subscriber belonging to the first segment group is not allowed to get accessed to other segment groups, i.e., the second, third and fourth segment groups.

FIG. 18 to FIG. 23 are schematic drawings of websites pages for creating a segment group according to still another embodiment of the present invention.

Figure 18:
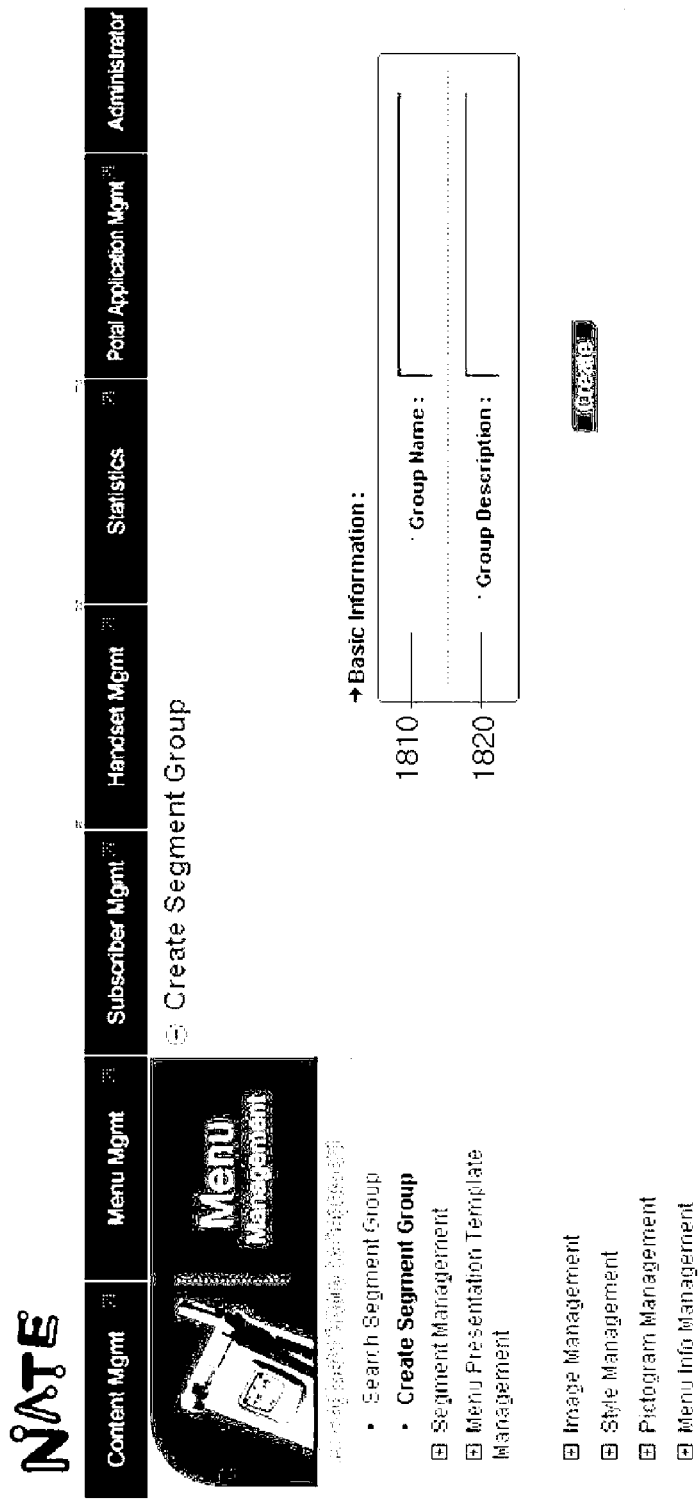
Figure 26:
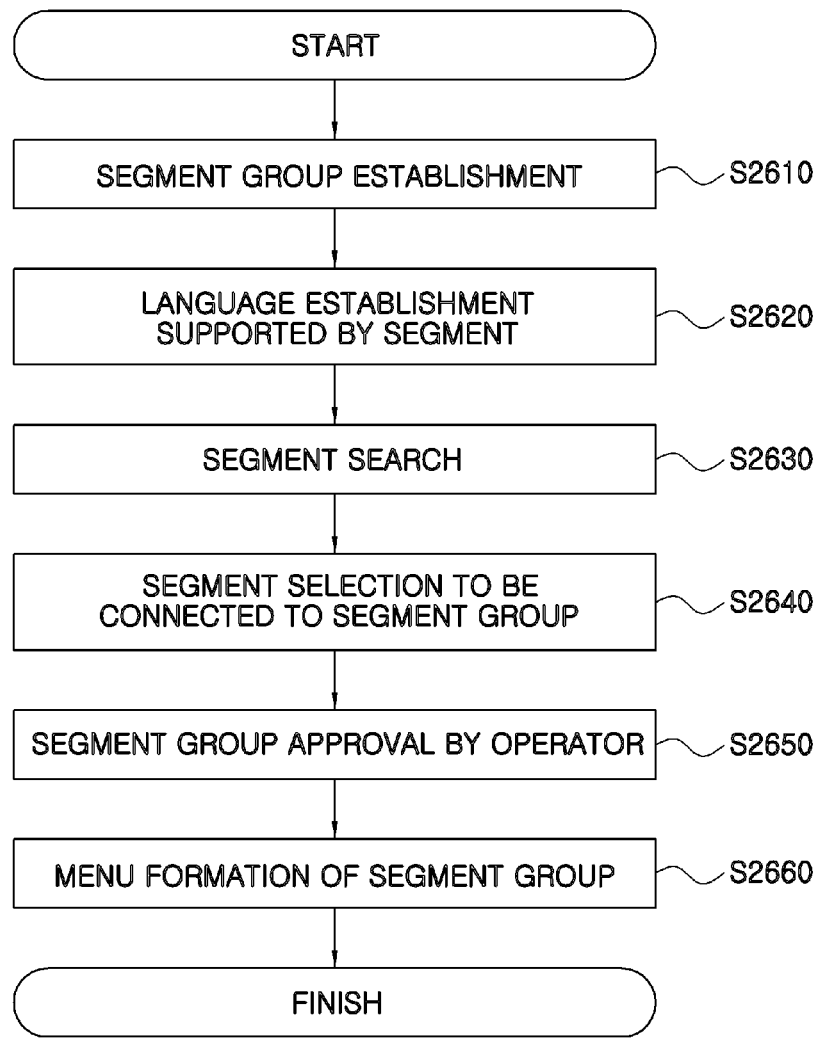
FIG. 26 is a flow chart for explaining a segment group creating process according to still further embodiment of the present invention.

FIG. 26 is a flow chart for explaining a segment creating process according to still another embodiment of the present invention. A website page of FIG. 18 is designed for forming a segment group, in which basic information, i.e., a name (1810) of the segment group and a brief description (1820) of the segment group, is inputted to select a created icon, and a language supported by the segment group is selected by an operator, creating a segment group (S2610. S2620).

Figure 19:
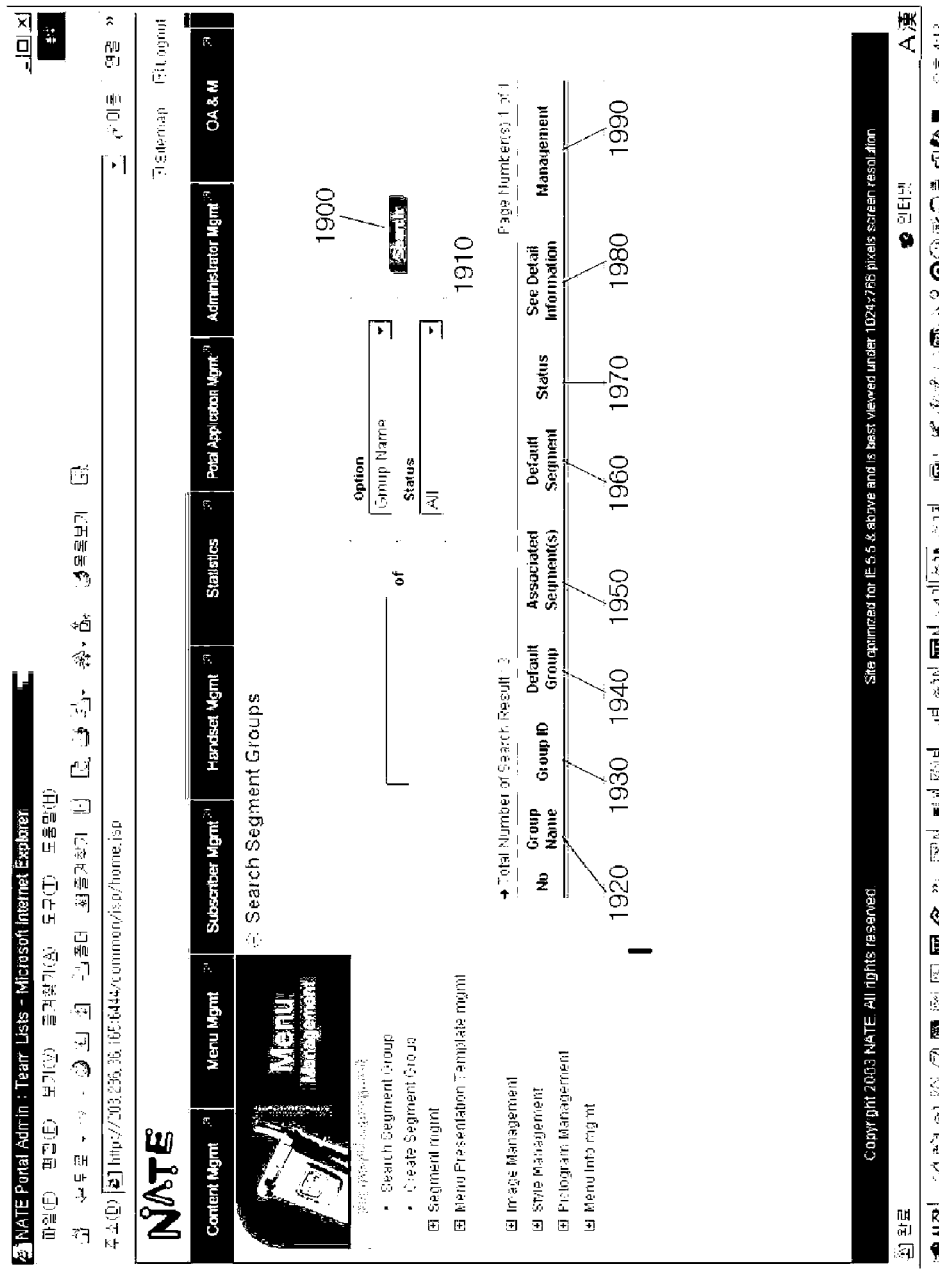

A segment group is searched (S1900) via a website page illustrated in FIG. 19 following the formation of the segment group formed by the operator (S2630). As noted from reference numeral 1910, the searched segment group is displayed with group name (1920), segment ID (1930), basic (default) segment (1940), associated segment (1950), basic segment of the segment (1960), segment status (1970), detail information (1980) and management information regarding modification and deletion (1990).

The default group (hereinafter referred to as basic group) of the segment group (1940) is such that if a subscriber having not joined the segment group is accessed to the wireless Internet, the operator transmits a prescribed menu supported by the basic group (1940) to a subscriber terminal. Other than the aforementioned description, the basic group may be also used when it is not known if a subscriber has joined the segment group due to erroneous operation of the wireless Internet.

The basic segment (1960) is such that, if a subscriber who has not joined the segment is accessed to the wireless Internet, the operator transmits a prescribed menu supported by the basic segment (1960) to the subscriber terminal. The segment status (1970) includes USE and STOP. At this time, The STOP status is displayed only if there is no subscriber subscribed to the segment group and there is no single subscriber either in the whole lower segment belonging to the segment group. To elaborate, the segment status (1970) displays USE if there is a single subscriber in one segment out of the lower segment.

Figure 20:

A modification icon is selected out of the management information (1990) relative to modification and deletion, a website page for modifying the segment group of FIG. 20 is displayed on an operator terminal.

Referring to FIG. 20, the website page is displayed with basic information (2010) relative to the segment group, and at the same time, a segment list (2030) connected to the segment group is displayed. If there is any modification on the basic information (2010), a website page of FIG. 11 is displayed upon selection of correction icon (1020), and the basic information relative to the segment group can be re-inputted.

Figure 22:
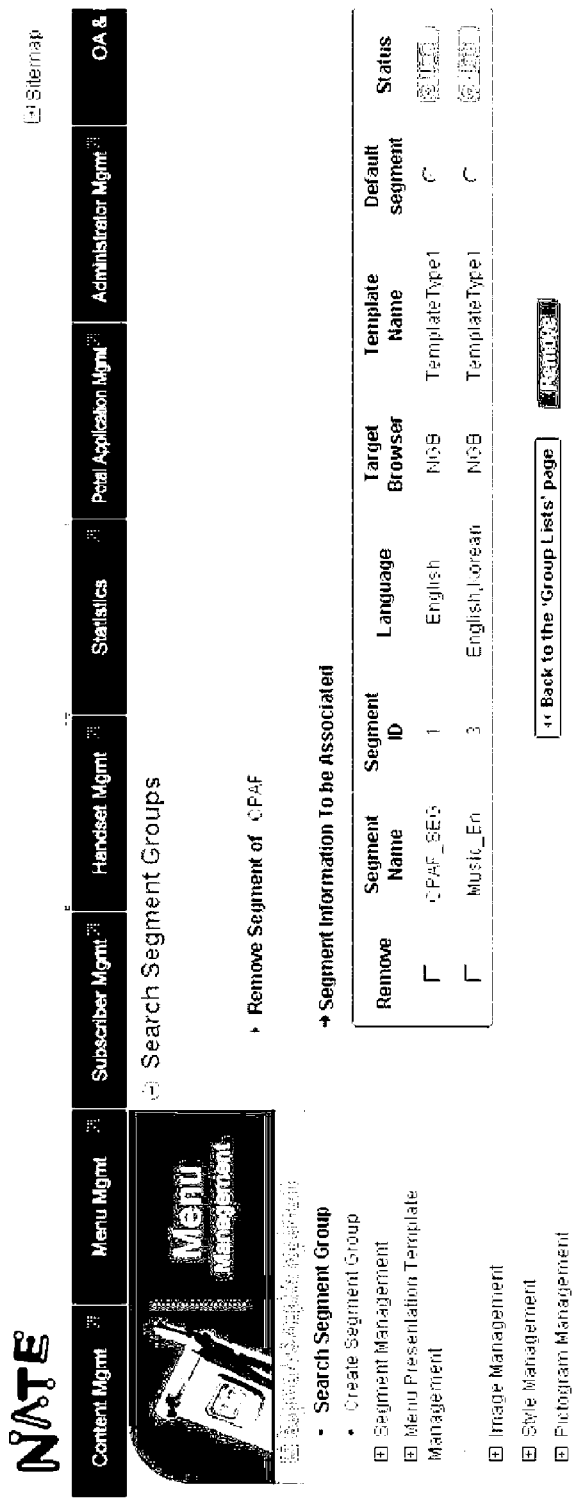

In the website page of FIG. 20 for segment group modification, the segment list (2030) is formed thereunder with a segment addition icon (2050) for adding segments, a segment deletion icon (2070) for selectively deleting segments belonging to the segment group and a basic segment establishment icon (2090) for establishing the basic segment are formed. Therefore, if the segment addition icon (2050) is selected by an operator, a segment list connectable to the segment group is displayed on a website page of FIG. 22. The segment is filtered based on the language provided to the subscriber terminal. In other words, as illustrated in FIG. 22, if the segment group is so established as to support the Korean and English languages, only the segments for supporting the Korean and/or English language out of segments created by the operator are filtered and listed up. The operator selects a segment to be included in the segment group out of the list (S2640).

Figure 23:
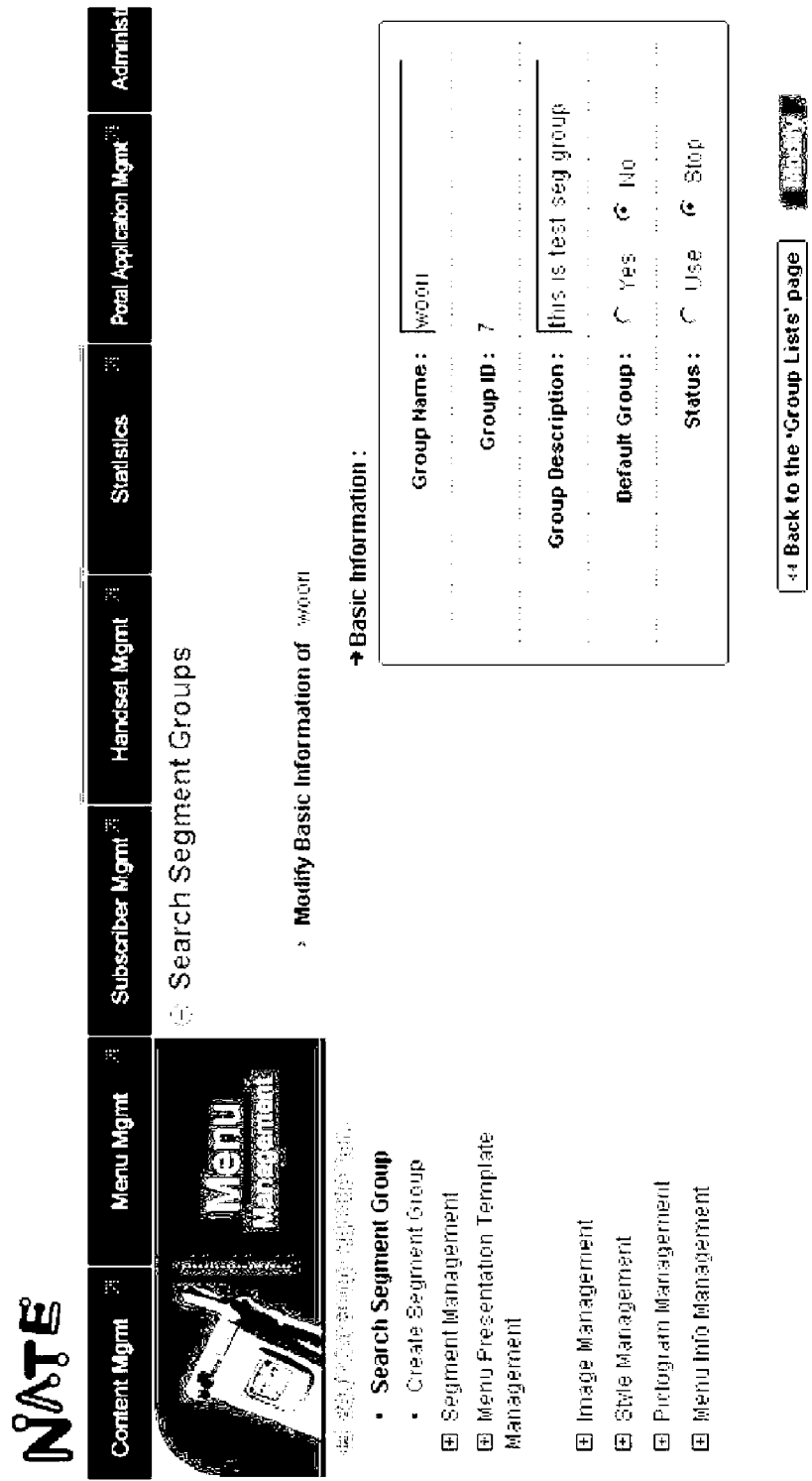
Figure 25:
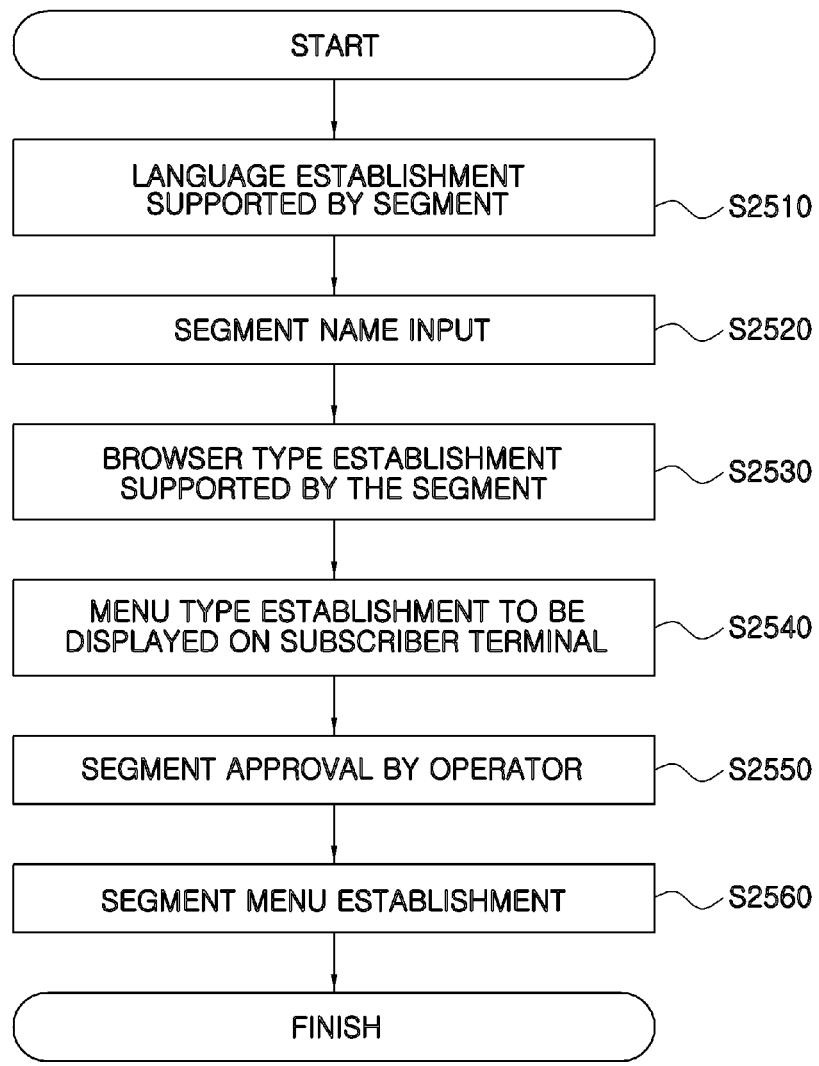
FIG. 25 is a flow chart for explaining a segment creating process according to still another embodiment of the present invention.

Referring back to FIG. 20, if the segment deletion icon (2070) for selectively deleting the segments belonging to the segment group is selected, a website page of FIG. 23 is displayed. The website page is displayed with all the segments belonging to the segment group. If a segment to be deleted by the operator is selected, the selected segment is deleted.

Figure 24:
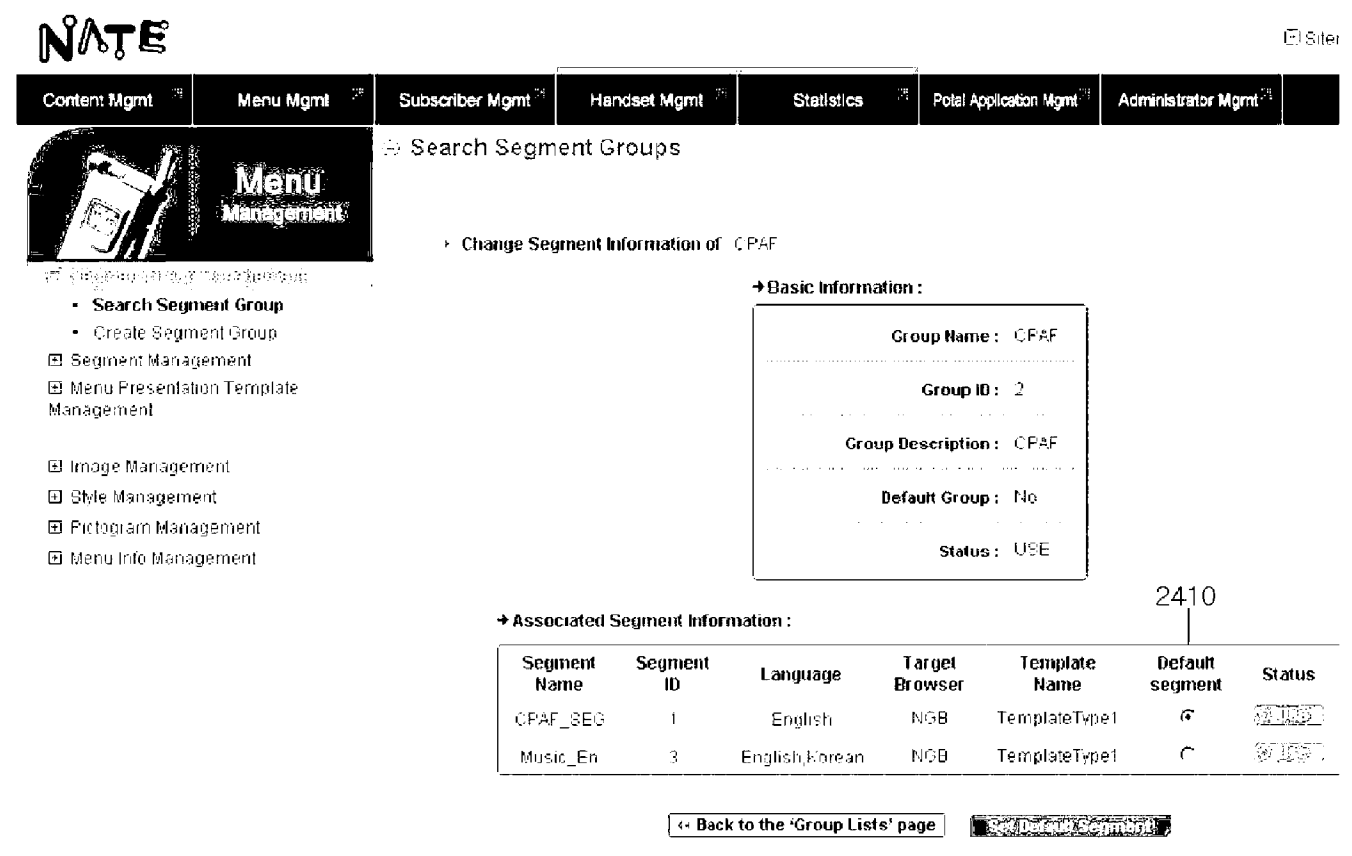

Furthermore, if the basic segment establishing icon (2090) for establishing the basic segment is selected, a website page of FIG. 24 is displayed. At this time, the operator establishes a basic segment (2410) for providing the wireless Internet service even if the subscriber terminal is not subscribed via the website page. The operator carries out approval relative to the segment group in the same fashion as that of the segment. (S2650). If a menu is created for providing to the subscriber terminal subscribed to the segment group, and the subscriber terminal is accessed to the wireless Internet network, the menu is provided (S2660).

Figure 27:
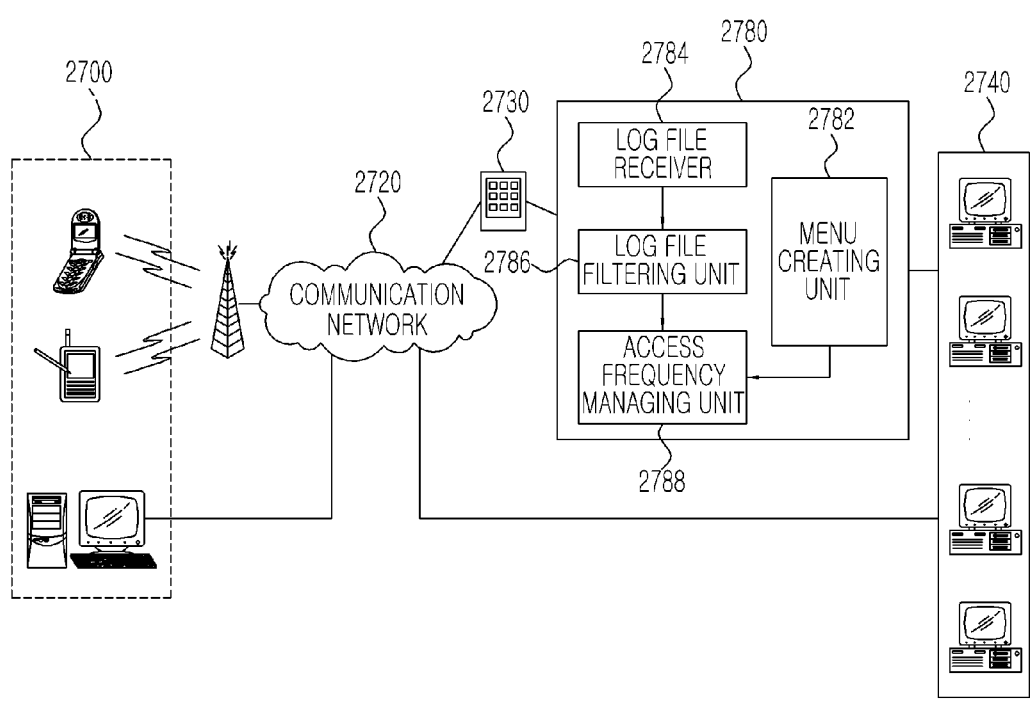
FIG. 27 is a schematic drawing of a system including an apparatus for managing a wireless Internet operating team according to still further embodiment of the present invention.

FIG. 27 is a schematic drawing of a system including an apparatus for managing a wireless Internet operating team according to still further embodiment of the present invention, where the system includes a subscriber terminal (2700), a communication network (2720), a gateway (2730), a contents providing apparatus (2750) and an operation team management apparatus (2780).

The operation team management apparatus (2780) includes a menu creating unit (2782), a log file receiving unit (2784), a log file filtering unit (2786) and an access frequency management unit (2788).

The menu creating unit (2782) serves to create a menu provided to the subscriber terminal (2700) via the communication network (2720). If the menu is classified to a menu created by an Internet operator and a menu created by the contents provider, the menu creating unit (2782) according to still further embodiment of the present invention is such that a menu is created by the Internet operator. For example, a menu is created for providing the wireless Internet menu to the subscriber terminal accessed to a portal platform by the wireless Internet operation platform, i.e., the portal platform operated by the mobile communication company. At this time, each level of the menu is provided with a distinguishing code of the operator, such that a display is made wherein a certain menu is created and/or managed by a certain operator or a certain operation team.

If contents are selected by a user via a menu provided to the subscriber terminal, the contents providing apparatus provides the contents to the subscriber terminal via the communication network. At this time, in the aforementioned example, the portal platform does not store or possesses the contents such that a contents providing apparatus provides the contents to the mobile communication terminal.

Figure 28:
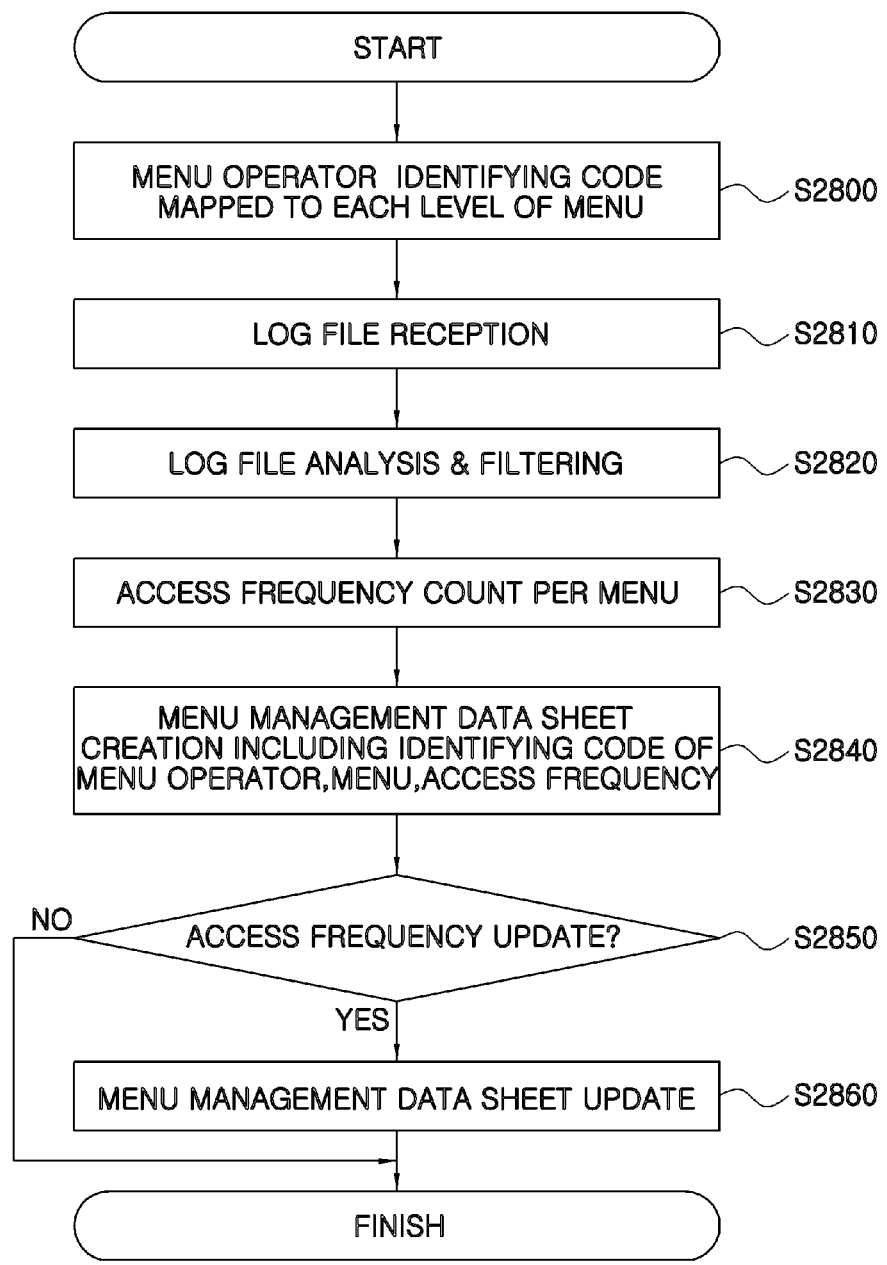
FIG. 28 is a flow chart for explaining a managing method of a wireless Internet operating team according to still further embodiment of the present invention.

FIG. 28 is a flow chart for explaining a managing method of a wireless Internet operating team according to still further embodiment of the present invention.

When a menu to be provided to the subscriber terminal is created by the Internet operator, an operator for managing the service associated with the menu or a discriminating code of the operating code is matched (2800). If the subscriber terminal is accessed to the Internet network via the communication network, the operation team management apparatus receives the created log file (S2810). For example, if the mobile communication terminal is accessed to the wireless Internet via the communication network, a log file created by the WAP gateway for connecting the mobile communication terminal to the wireless Internet is periodically, preferably in real time, transmitted to the operation team management apparatus (2780). The received log file is analyzed and information including menu information selected by the subscriber terminal, time information and subscriber information is filtered (S2820). It is possible to count the access frequency of the subscriber terminal in response to the menu from the information filtered at step S2820 (S2830). In other words, the information thus filtered is a base for various statistical data by the operator.

Furthermore, a menu management data sheet including a discriminating code of the operator mapped to the menu out of the filtered information, the access frequency of the menu is created (S2840). Accordingly, whenever a menu is selected by the subscriber terminal, the menu access frequency of the menu management data sheet is accumulatively counted, and if ever needed, it is possible to sort the order of menu access frequency per time, day, week, month and year (S2850, S2860).

Figure 29:
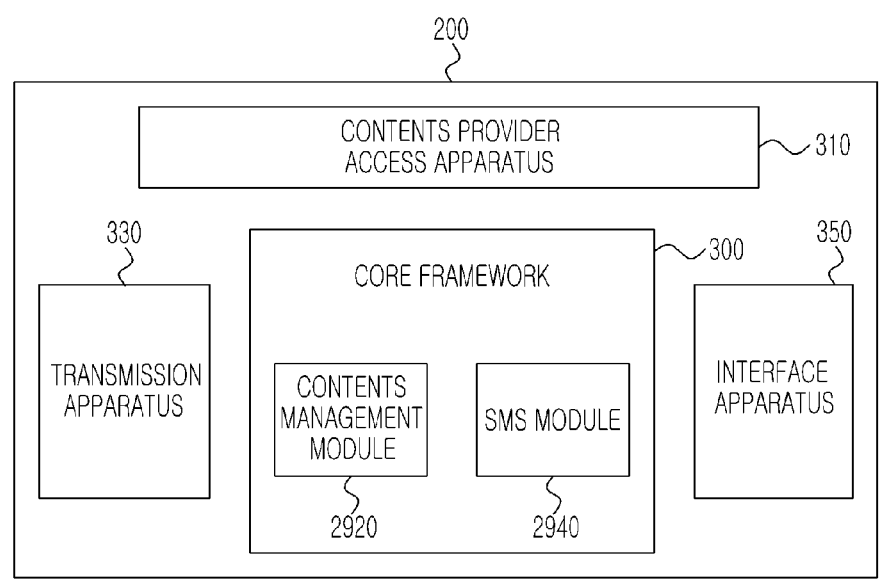
FIG. 29 is a detailed drawing of an integrated management apparatus according to still further embodiment of the present invention.

FIG. 29 is a detailed drawing of an integrated management apparatus according to still further embodiment of the present invention.

The terminal is connected to the integrated management apparatus or the contents providing apparatus via the communication network, and transmits to the integrated management apparatus contents code number to be provided and receives contents corresponding to the contents code number. Particularly, the terminal transmits the contents code number to the integrated management apparatus via WAP based communication network or Short Message Service (hereinafter referred to as SMS).

Referring to FIG. 29, the integrated management apparatus (200) has an open structure including contents provider access apparatus (310), a central management apparatus (300), a transmission apparatus (330) and an interface apparatus (350), such that the apparatus (200) has flexibility and moduleability to be embodied with other solutions. The central management apparatus (300) includes contents management module (2920) and SMS module (2940). Particularly, the integrated management apparatus (200) registers and manages the contents access information for accessing to the contents provided by the contents providing apparatus (150) and included with contents address information and contents code number from the contents providing apparatus (150), and if received of the contents code number from the terminal connected to the communication network, the contents address information of the contents access information is transmitted to the contents providing apparatus. Accordingly, the contents providing apparatus (150) can provide to the terminal the contents corresponding to the contents code number requested by the terminal via the contents address information. Meanwhile, management of contents access information including the contents address information such as contents URL information and the like is taken care of by the contents management module (2920) of the integrated management apparatus (200), particularly, by the central management apparatus (300). At this time, the central management service operator monitors what contents are provided from the terminal via the contents management module (2920). Furthermore, the contents management module (2920), if the contents code number transmitted from the terminal is received, searches the contents access information corresponding to the contents code number. As a result, if the search is completed, the terminal is accessed to the contents access information and receives the contents.

The contents denotes a generic concept of various information for manufacturing, processing and circulating in digital method various characters, codes, sounds, acoustics, images and the like and contents thereof. Furthermore, the contents code number is a kind of code number provided per contents for requesting the integrated management apparatus (200) to provide contents to the terminal, and it is preferable to establish and manage according to the convenience of the contents providing apparatus.

Furthermore, the contents access information, which is the information for the terminal to access to the contents provided by the contents providing apparatus (150), includes contents address information and contents code number, and it is preferable that the contents access information include a name relative to the contents and billing information. Furthermore, the SMS module receives the contents code number via the SMS and transmits the contents code number to the contents management module (2940) if the contents code number is transmitted by the terminal via the SMS.

The contents providing apparatus, in cooperation with the integrated management apparatus (200), provides various contents to the terminal via the integrated management apparatus (200). The integrated management apparatus (200) is connected to an external server (170), an example of which is a billing server. Preferably, the billing relative to the service use charge is settled via the billing server.

Figure 30:
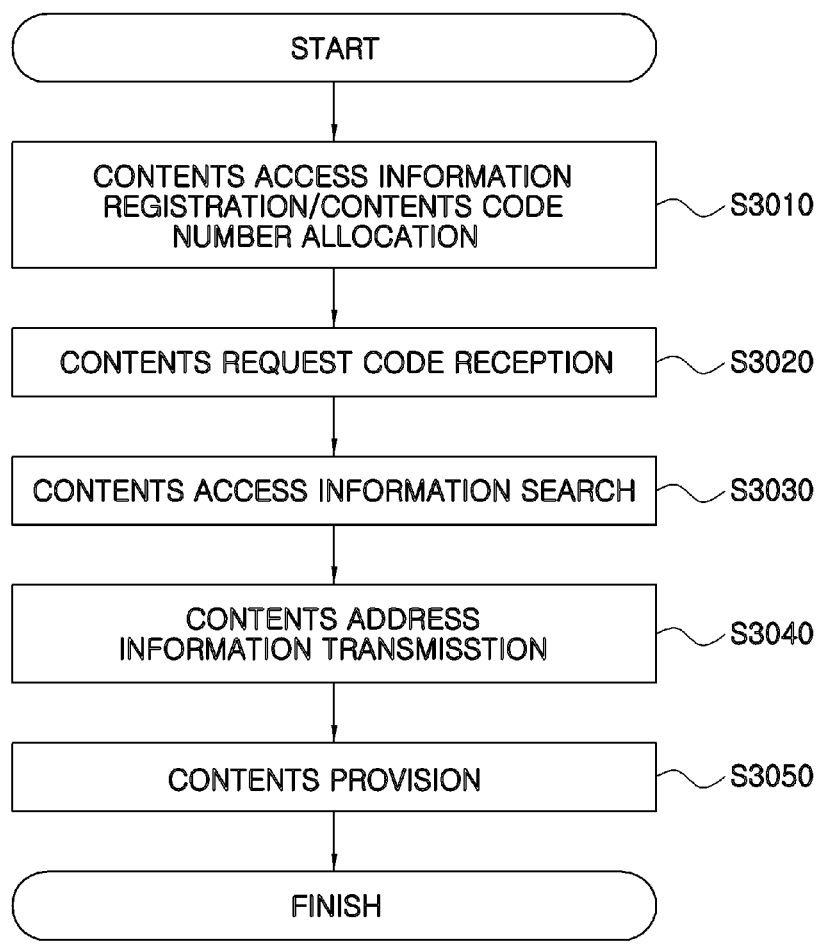
FIG. 30 is a flow chart for explaining a contents providing method using a contents code number according to still further embodiment of the present invention.

FIG. 30 is a flow chart for explaining a contents providing method using a contents code number according to still further embodiment of the present invention.

Referring to FIG. 30, the integrated management apparatus receives the contents access information including the contents address information from the contents providing apparatus, and registers the contents access information via the received contents access information, and allocates contents code number to the registered contents access information (S3010). The contents access information allocated with the contents code number is managed by the integrated management apparatus, particularly by the contents management module (2920) of the integrated management apparatus.

Meanwhile, the contents providing apparatus transmits modification request information relative to the contents access information to the integrated management apparatus (200) in case the contents access information to the contents is modified because the contents access information cannot be established per contents according to the convenience. Likewise, if the contents name or billing information is modified, the modification request information thereto is transmitted to the integrated management apparatus. In other words, the integrated management apparatus (200) receives modification request information of the contents access information for modifying the contents access information from the contents providing apparatus. Furthermore, the integrated management apparatus (200) receives the modified contents access information, and if necessary, re-registers the modified contents access information and corrects the contents code number. Successively, the integrated management apparatus (200) provides to the terminal contents search screen inserted with the contents code number column, and the terminal (100) transmits to the integrated management apparatus (200) the contents code number in the fashion of inputting into the contents code number column the contents code number relative to the contents to be provided.

Meanwhile, if search is made for the contents to be provided from the terminal (100), the contents search screen is generally the same as a search screen for inputting search words to the contents. In other words, the integrated management apparatus (200) receives a search word via the contents search screen to search contents access information corresponding to the contents search word. The integrated management apparatus (200) receives the contents code number from the terminal (S3020). Preferably, the search process is implemented by the integrated management apparatus (200) via contents managing module (S2920). Successively, the integrated management apparatus (200) transmits to the contents providing apparatus the contents address information relative to the contents corresponding to the contents code number via the searched contents access information (S3040). Then, the contents providing apparatus provides the contents corresponding to the contents address information relative to the terminal (S3050).

Figure 31:
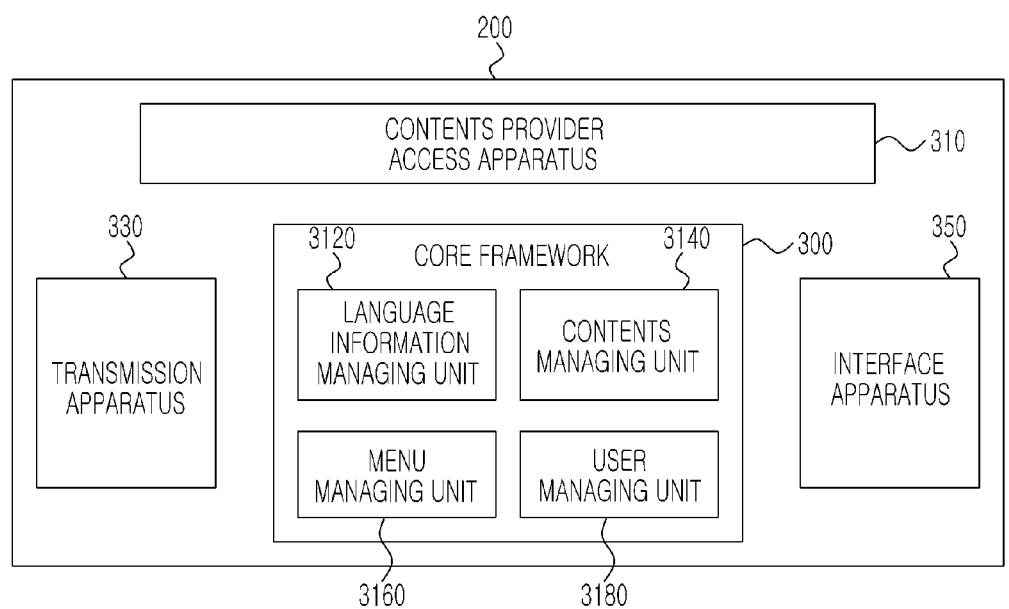
FIG. 31 is a detailed drawing of an integrated management apparatus according to still further embodiment of the present invention.

FIG. 31 is a detailed drawing of an integrated management apparatus according to still further embodiment of the present invention.

The integrated management apparatus (200) receives from the contents providing apparatus the language information to be supported to the terminal and creates a menu information comprised of contents access information, contents access information per menu and the language information, and extracts the contents address information relative to the contents requested via the menu information and transmits the contents address information to the contents providing apparatus. Furthermore, the integrated management apparatus (200) is connected to the external server, one example of which is the billing server. Preferably, the billing for service use charge is processed via the billing server.

The contents access information, which is the information for access to the contents provided by the contents providing apparatus, includes a prescribed language selected and registered by the contents providing apparatus, contents address information and the billing information. Meanwhile, the contents address information is composed of URL information, and preferably, the contents providing apparatus is capable of selecting at least one language information per country. Furthermore, the contents access information per menu can further include information of menu creation relative to the contents besides the contents access information, and creates menu information relative to the contents therethrough per respective language registered during creation of the contents access information. Particularly, the central management apparatus (300) includes a language information management unit (3120), a contents management unit (3140), and a menu management unit (3160), and preferably, further includes a user management unit (3180).

The language information management unit (3120) stores the standard language information per country in a first database, and selects a prescribed language to be supported by the integrated management apparatus (200) out of stored language information and stores it in a second database for management. Preferably, the integrated management apparatus (200) selects all or part of the standard language information stored in the first database and stores it in the second database. Furthermore, preferably, the language information stored in the first and second databases is modified by addition or deletion. The first and second databases are functionally separated means and can be combined for convenience's sake.

The contents management unit (3140) creates and manages contents access information via a prescribed language information selected for the integrated management apparatus (200) to support via the terminal out of language information stored in the second database. Preferably, the contents providing apparatus can select at least one or more language information out of the second database. Furthermore, the contents access information can be re-created by modifying the language information.

The menu management unit (3160) creates the menu information relative to the contents by way of language information managed by the contents management unit (3140), and preferably, whenever language information registered during creation of the contents access information is modified, menu information thereupon is re-created.

The user management unit (3180) receives language information for embodiment of menu information from the terminal to create and manage the user information of the terminal. Meanwhile, preferably, the user information further includes a terminal discrimination number and a user ID. Preferably, information recorded at the gateway is received for use as user information.

The contents providing apparatus, in cooperation with the integrated management apparatus (200), provides to the terminal various contents via the integrated management apparatus (200). Particularly, address information relative to the contents the terminal requested from the integrated management apparatus (200) is received, and the contents corresponding to the address information is provided to the terminal.

Figure 32:
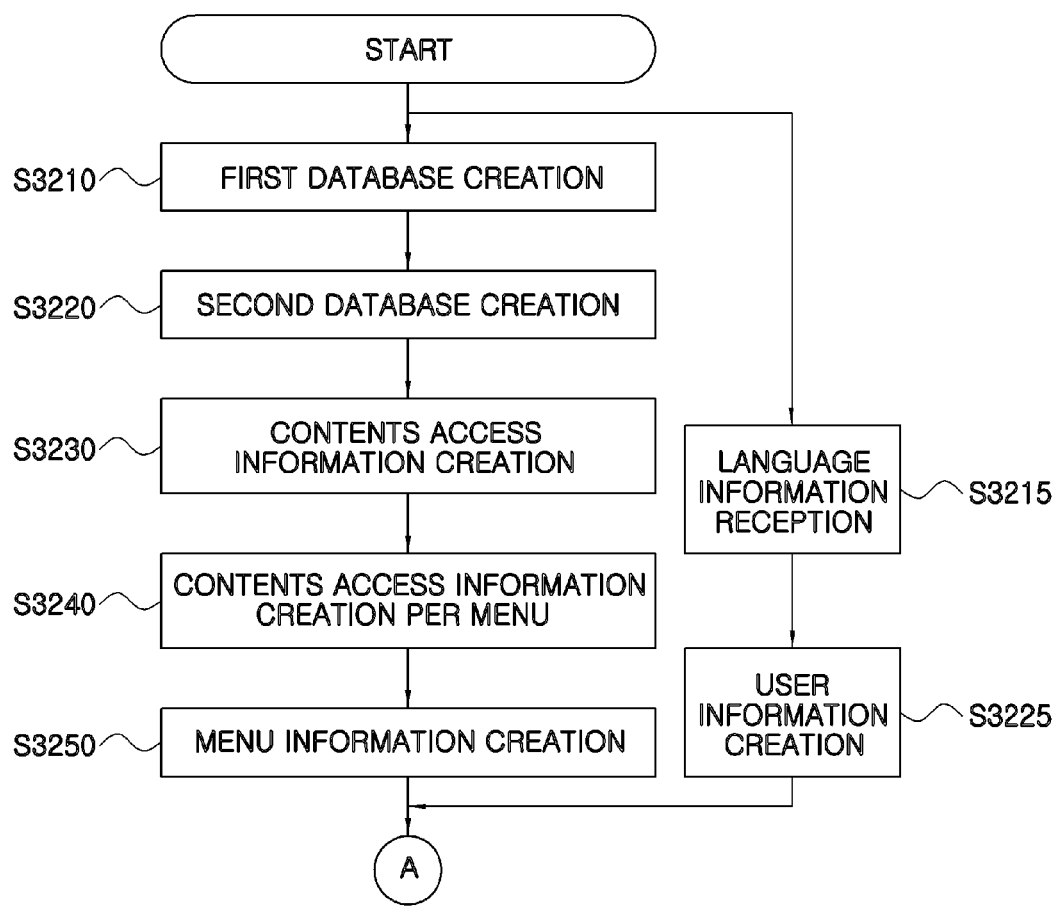
FIG. 32 is a flow chart of a menu information creating method out of multi-language supportable contents service providing methods according to still further embodiment of the present invention.
Figure 34:
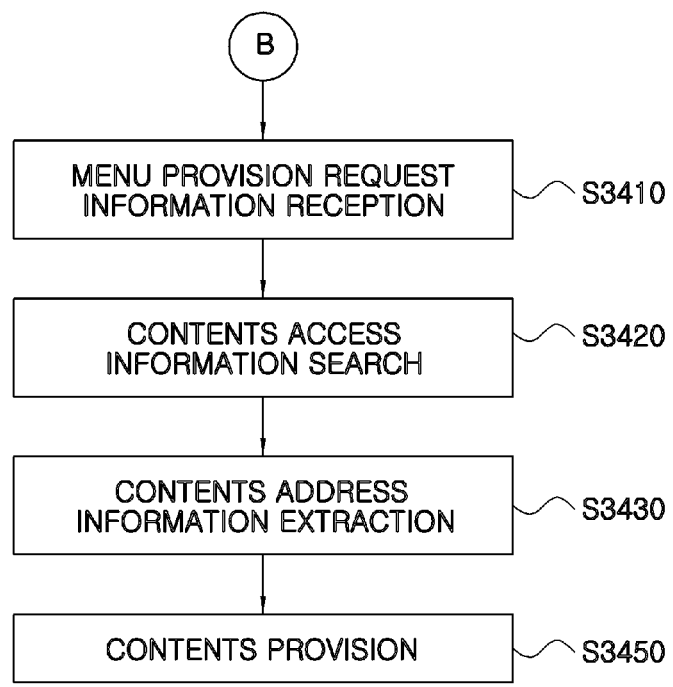
FIG. 34 is a flow chart of a contents providing method out of multi-language supportable contents service providing methods according to still further embodiment of the present invention.
Figure 35:
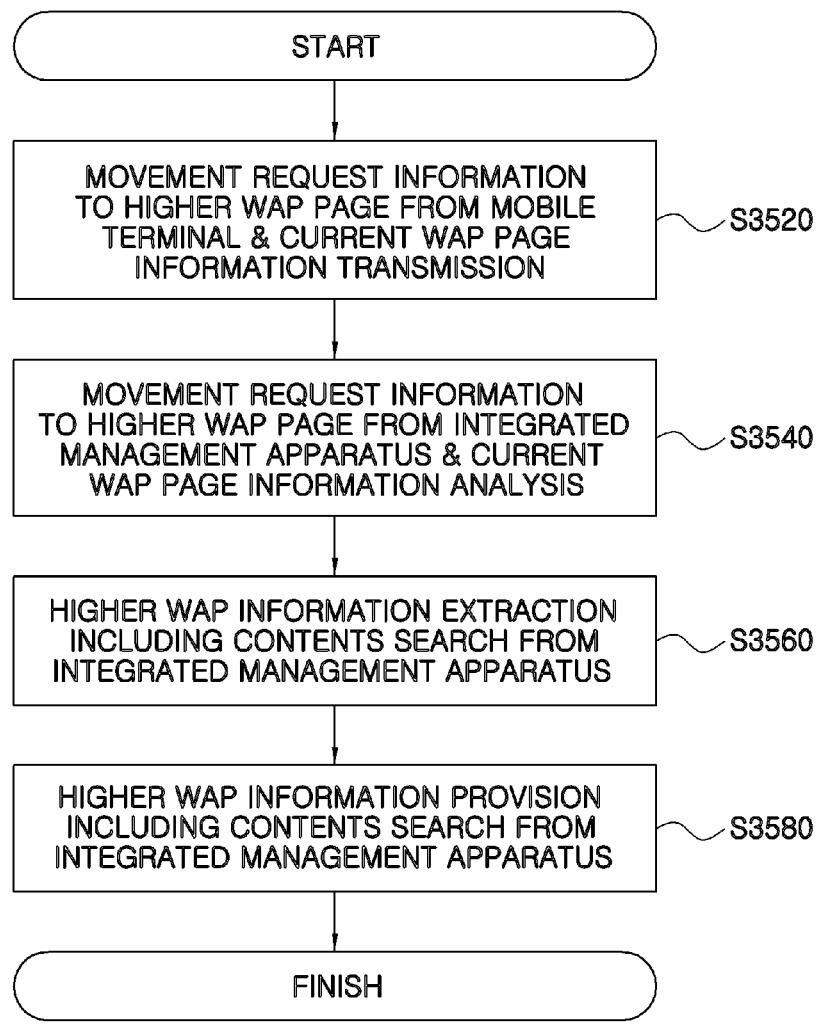
FIG. 35 is a flow chart of a higher WAP page moving method of a mobile communication terminal according to still further embodiment of the present invention.

FIG. 32 is a flow chart of a menu information creating method out of multi-language supportable contents service providing methods according to still further embodiment of the present invention, FIG. 34 is a flow chart of a contents providing method out of multi-language supportable contents service providing methods according to still further embodiment of the present invention and FIG. 35 is a flow chart of a higher WAP page moving method of a mobile communication terminal according to still further embodiment of the present invention.

Referring to FIG. 32, first of all, the integrated management apparatus (200) collects the standard language information per country and stores it at the first database (S3210).

A prescribed language to be supported by the integrated management apparatus (200) out of language information stored in the first database, i.e., the language information supportably by relevant country is stored in the second database (S3220). At this time, at least one or more language information can be selected from the first database, and preferably, the language information can be modified by addition or deletion for management by the second database. Successively, the contents providing apparatus selects language information supportable by the terminal out of the language information stored in the second database such that the integrated management apparatus (200) receives the language information to create contents access information (S3230).

The contents access information is the information connected to the contents requested by the terminal out of contents provided by the contents providing apparatus and arranged to provide contents to the terminal. Meanwhile, in case the contents providing apparatus intends to modify the selected language information such as addition or deletion, the language modification information is transmitted to the integrated management apparatus (200), where the integrated management apparatus (200) changes it to language information corresponding to the modified language information to re-create contents access information. Successively, the integrated management apparatus (200) receives from the contents providing apparatus in the language information the information about the menu creation relative to the contents to create contents access information per menu relative to the contents (S3240). The contents access information per menu is the information for creating menu for providing a kind of higher directory relative to the website/WAP pages provided to the terminal screen.

Meanwhile, in case the contents providing apparatus is intended to add language information, the contents providing apparatus transmits the language addition information to the integrated management apparatus (200), where it is preferred that the integrated management apparatus (200) add the language information corresponding to the language addition information to create contents access information per menu.

Successively, the integrated management apparatus (200) creates menu information via the contents access information per menu (S3250). Preferably, the menu information is composed of language information selected and registered during creation of the contents access information by the contents providing apparatus, and respective menu information are created per selected prescribed country language.

Meanwhile, the terminal transmits to the integrated management apparatus (200) the language information for embodying the menu information received by the terminal (S3215). Furthermore, the integrated management apparatus (200) stores the language information to create user information of the terminal (S3225). If the terminal is to change the language information establishment embodying the menu information, the language change request information is transmitted to the integrated management apparatus (200). The integrated management apparatus (200) changes it to language information corresponding to the language change request information to re-create the user information.

Figure 33:
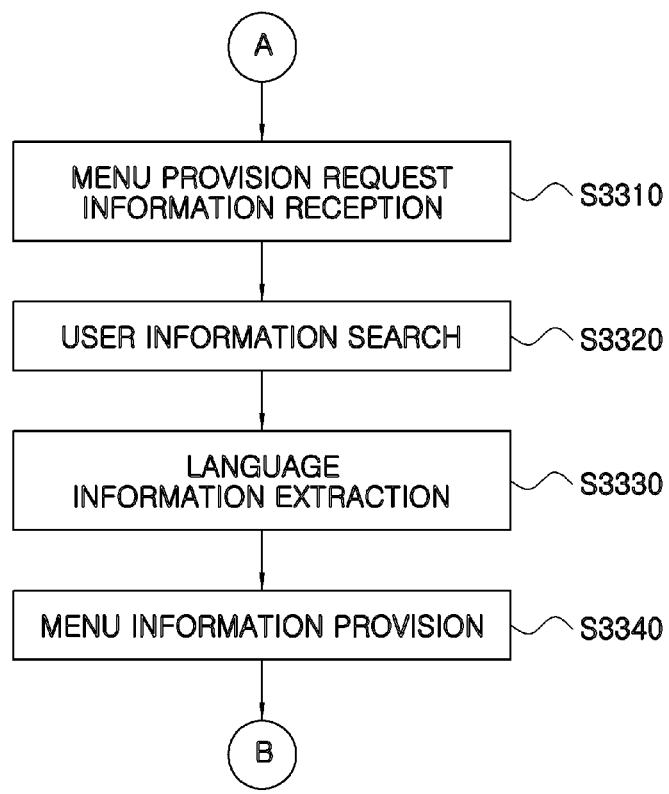
FIG. 33 is a flow chart of a menu information providing method out of multi-language supportable contents service providing methods according to still further embodiment of the present invention.

Meanwhile, the user information further manages the terminal discrimination number and user ID in addition to the management of the language information established by the terminal, such that when the terminal requests menu information, the user information is searched and the menu information composed of the language information is searched and provided to the terminal. In other words, referring to FIG. 33, the integrated management apparatus (200) searches the user information thus created (S3320) when the menu provision request information is received from the terminal (S3310). As a result of the search, the language information established at the terminal by the user, i.e., the language information registered with the user information is extracted (S3330). The integrated management apparatus (200) provides to the terminal the menu information composed of the language information out of the menu information corresponding to the menu provision request information (S3340).

Successively, referring to FIG. 34, the contents provision request information requesting contents to be provided via the menu information by the terminal is transmitted to the integrated management apparatus (200) (S3410). The integrated management apparatus (200) having received the contents provision request information searches the contents access information (S3420) to extract contents address information corresponding to the contents provision request information (S3430). Successively, the integrated management apparatus (200) transmits the contents address information to the contents providing apparatus (S3440), and the contents providing apparatus provides to the terminal contents corresponding to the contents address information (S3450).

Referring back to FIG. 1, a higher WAP page movement system of a terminal according to still further embodiment of the present invention will be described.

When the terminal uses contents search means to search the contents to be provided, the terminal transmits to the integrated management apparatus (200) the movement request information to the higher WAP page and current WAP page information provided by the integrated management apparatus (200). Meanwhile, the contents search means includes contents search engine bookmark menu and the like, and can be comparative to a case where contents menu composed of a tree structure is sequentially moved from a higher contents menu to a lower contents menu to search the wanted contents. In other words, although in case of a general contents search, several higher contents menus should be passed through until wanted contents menu is provided, the wanted contents menu can be directly reached if the contents search means is used. For example, a direct movement can be made to contents keyword or the contents code number via the contents search engine if the contents keyword corresponding to the contents menu wanted to be provided with is inputted, or contents code number provided by the integrated management apparatus according to the contents menu is inputted.

Furthermore, the bookmark menu is the information created by the registered contents menu by the integrated management apparatus registering the contents menu in response to the request of the mobile communication terminal Accordingly, the mobile communication terminal (100) receives the created bookmark menu from the integrated management apparatus (200) and selects the contents menu comprising the bookmark menu, whereby a direct movement can be made to the contents menu to be provided. Furthermore, the bookmark menu refers to a menu created via priority information of contents provision frequency by recording the information relative to the contents thus provided by the integrated management apparatus (200) whenever the mobile communication terminal (100) is provided with contents from the integrated management apparatus (200), and analyzing the frequency of contents provided to the mobile communication terminal (100) according to the established time interval. Accordingly, the mobile communication terminal (100) directly moves to the contents menu wanted to be provided by selecting the contents menu comprised of the bookmark menu.

Meanwhile, the movement request information to the higher WAP page and WAP page information are the information established by being allocated in advance by the integrated management apparatus (200), and where the WAP page information refers to the WAP page information including respective contents menus and WAP page information including the contents search means. Accordingly, the integrated management apparatus (200) analyzes the movement request information to the higher WAP page received from the mobile communication terminal (100) to discriminate whether the current WAP page provided to the mobile communication terminal (100) is the WAP page provided via the contents search means. In other words, the movement request information to the higher WAP page includes WAP page movement route information (hereinafter referred to as Upper Navigation Flag, "UNF"), and if the integrated management apparatus (200) receives the UNF, it discriminates that the current WAP page is the WAP page provided via the contents search means.

Furthermore, the UNF is comprised of a variable of two digits and shows in detail by what kind of contents search means the current WAP page has been provided out of the contents search means according to contents of the variable.

For example, if the mobile communication terminal (100) has received WAP page via the search engine, and the integrated management provides in advance WAP page via the search engine, and a value of the UNF variable is set at '09' the integrated management apparatus (200) receives information including the value of variable of '09' from the mobile communication terminal (100) and discriminates that the current WAP page is the WAP page provided through the search engine in response to the value of the variable. Accordingly, the integrated management apparatus (200), in conformity with the movement request information to the higher WAP page, provides to the mobile communication terminal (100) the WAP page including the search engine. The movement request information to the higher WAP page further includes segment information (hereinafter referred to as "SM"). The SM is largely composed of four digits of variable, and if segment ID is '12' the value of SM is allocated to '1030' which means that a subscriber is subscribed to a $12^{th}$ segment. In other words, the segment is a management tool for providing services to subscribers, such that the segment is constructed to provide a particular service in response to establishment of the subscriber. Accordingly, contents menu system varies for providing a specialized exclusive service to each subscriber. For example, a first segment can be embodied exclusively for games in response to the establishment of the integrated management apparatus (200), a second segment exclusively for sports, a third segment exclusively for movies, and a fourth segment exclusively for others. After all, the integrated management apparatus (200) provides to the mobile communication terminal (100) a specialized exclusive contents menu depending on which segment out of the first, second, third and fourth segments, the subscriber subscribes to. If the SM is '1003' it means that the subscriber has subscribed to the third segment. Accordingly, the integrated management apparatus (200) receives the SM along with the UNF to discriminate to what segment the contents menu including the current WAP page has subscribed to and through what contents search means the current WAP page has been provided.

Meanwhile, the mobile communication terminal (100) additionally transmits the subscriber information along with the movement request information to the WAP page. The subscriber information includes subscriber discrimination information such as specification information of the mobile communication terminal (100) and the subscriber ID. Therefore, the integrated management apparatus (200) optimizes an provides the contents menus according to the respective mobile communication terminals (100) via the subscriber information.

Meanwhile, the WAP page information, which is information allocated in advance from the integrated management apparatus (200) just like the movement request information to the WAP page, includes access information (hereinafter referred to as "SU" relative to contents menu provided via the WAP page. Accordingly, if the integrated management apparatus (200) has not received the UNF, the integrated management apparatus (200) analyzes the current WAP page information and extracts an access information relative to a higher contents menu of the contents menu included with the current WAP page and provides to the mobile communication terminal (100) the higher contents menu corresponding to the access information relative to the contents menu thus extracted.

Meanwhile, there are cases where the integrated management apparatus (200) has not received the movement request information to the higher WAP page and the current WAP page information. This is generated because the integrated management apparatus (200) receives a value of a variable not allocated in advance. In this case, the integrated management apparatus (200) provides to the mobile communication terminal (100) a higher WAP page information provision impossibility notifying message that higher page information corresponding to the movement request information to the WAP page cannot be provided. Thereafter, the integrated management apparatus (200) provides to the mobile communication terminal (100) a WAP page including an initial contents menu relative to the contents menu included with the current WAP page. The initial contents menu denotes an uppermost menu if it is the same as the contents directory formed in tree structure. Particularly, if the integrated management apparatus (200) has received the segment information, the initial contents menu denotes an uppermost contents menu of contents menu specialized in response to the segment information thus received and in response to the kind of the segment.

Figure 36:
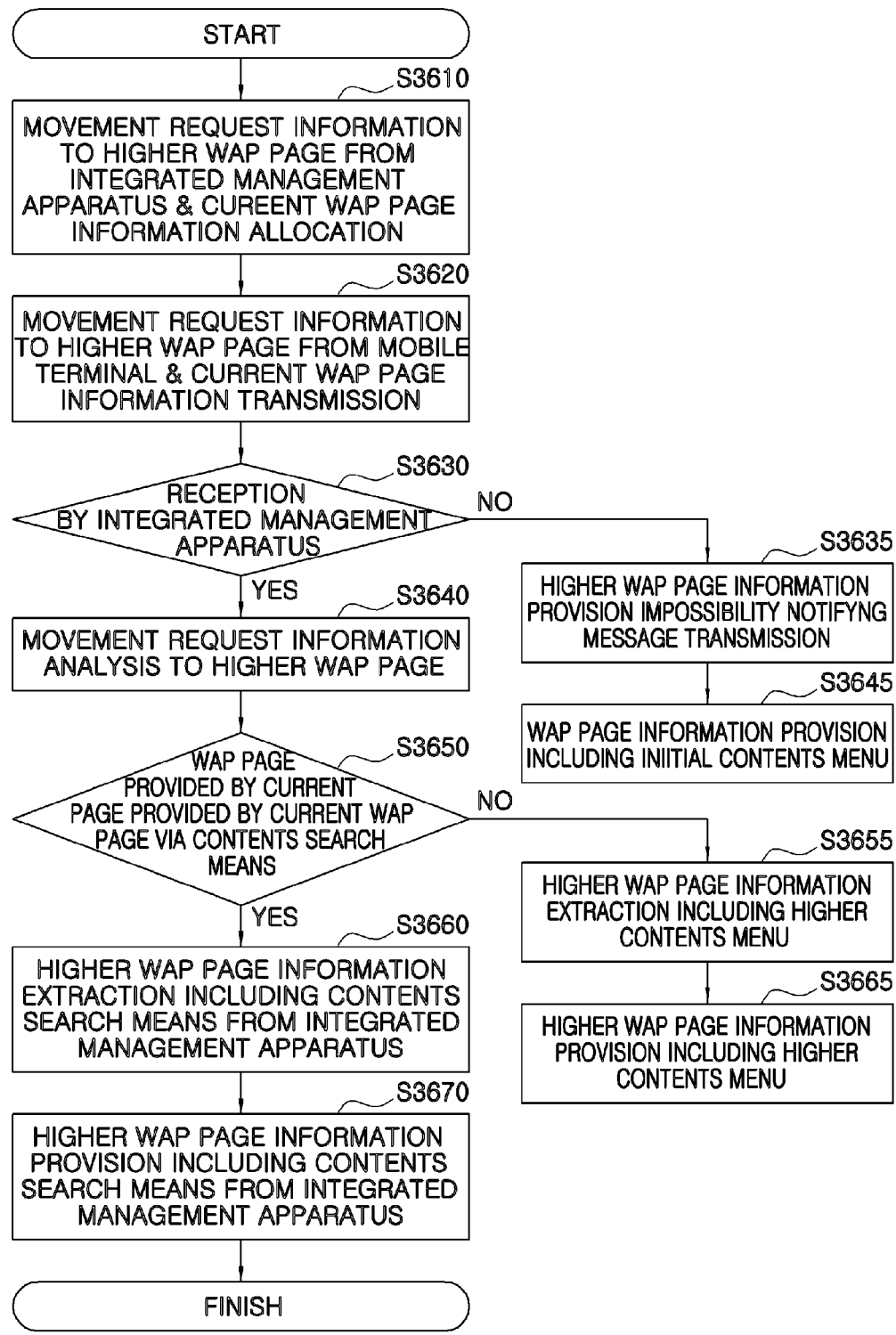
FIG. 36 is a flow chart of a higher WAP page moving method of a mobile communication terminal according to still further embodiment of the present invention.

FIG. 35 is a flow chart of a higher WAP page moving method of a mobile communication terminal according to still further embodiment of the present invention, and FIG. 36 is a flow chart of a higher WAP page moving method of a mobile communication terminal according to still further embodiment of the present invention.

Now referring to FIGS. 35 and 36, the integrate management apparatus (200) transmits to the mobile communication terminal (100) the movement request information to the higher WAP page and the current WAP page information provided to the mobile communication terminal (100) (S3520). In other words, the moment a subscriber presses an upper button including the current WAP page of the mobile communication terminal (100), the movement request information to the higher WAP page and the current WAP page information are transmitted to the integrated management apparatus (200).

Meanwhile, the movement request information to the higher WAP page and the current WAP page information are values priorly allocated by the integrated management apparatus (200) such that the integrated management apparatus (200) allocates the movement request information to the higher WAP page and the current WAP page information before the implementation of S3520 (S3610). Successively, the integrated management apparatus (200) discriminates whether the movement request information to the higher WAP page and the current WAP page information have been received (S3630). If the integrated management apparatus (200) has received the movement request information to the higher WAP page and the current WAP page information, the integrated management apparatus (200) interprets the movement request information to the higher WAP page. In other words, the current WAP page provided to the mobile communication terminal (100) is discriminated as a WAP page provided via the contents search means (S3650). If the UNF is included in the movement request information to the higher WAP page, the integrated management apparatus (200) discriminates that the current WAP page is the WAP page provided through the contents search means. Furthermore, the integrated management apparatus (200) checks the UNF value to discriminate through what contents search means the WAP page has been provided. Then, the integrated management apparatus (200) extracts the higher WAP page including the contents search means thus discriminated (S3560). Successively, the integrated management apparatus (200) provides to the mobile communication terminal the higher WAP page information including the contents search means corresponding to the information thus extracted (S3580).

Meanwhile, as a result of result of the analysis on the movement request information to the higher WAP page thus received, if it is discriminated that the current WAP page is not the WAP page provided through the contents search means, i.e., that there is no UNF, a higher WAP page information including the higher contents menu relative to the contents menu included with the current WAP page is extracted (S3655). Generally, this case is the one where the tree-structured contents directory is sequentially moved from the upper menu to search the contents, such that the integrated management apparatus (200) can extract information relative to the higher contents menu relative to the contents menu currently provided through the current WAP page information thus received. Successively, the integrated management apparatus (200) provides to the mobile communication terminal (100) the higher WAP page information including the higher contents menu corresponding to the information thus extracted (S3665).

Meanwhile, if the integrated management apparatus (200) has not received the movement request information to the higher WAP page and the current WAP page information at S3630, the integrated management apparatus (200) provides to the mobile communication terminal (100) that a higher WAP page information provision impossibility notifying message should be notified that higher WAP page information corresponding to the movement request information to the higher WAP page cannot be provided (S3635). And, instead of providing the higher WAP page information, WAP page information including an initial contents menu relative to the currently provided contents menu is provided to the mobile communication terminal (100) (S3645).

Meanwhile, the movement request information to the higher WAP page further includes a segment information, description of which is omitted as it has been already given in the erstwhile explanation. Accordingly, the integrated management apparatus (20) can effectively search the contents menu to be provided to the mobile communication terminal (100) via the segment information.

Meanwhile, the mobile communication terminal (100) further transmits subscriber information to the integrated management apparatus (200) at S3520. Accordingly, when the integrated management apparatus (200) provides to the mobile communication terminal the higher WAP page information corresponding to the movement request information to the higher WAP page, the integrated management apparatus (200) can provide optimized information conforming to the specification of the mobile communication terminal. In other words, the integrated management apparatus (200) optimizes the higher WAP page information via the user information in conformity with the specification of the mobile communication terminal. Furthermore, the optimized higher WAP page information is supplied to the mobile communication terminal.

Figure 37:
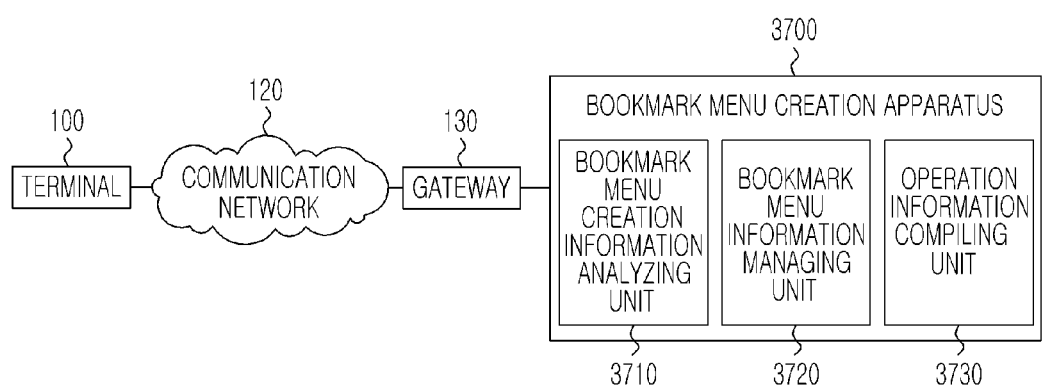
FIG. 37 is a structural drawing of a bookmark menu creating apparatus according to still further embodiment of the present invention.

FIG. 37 is a structural drawing of a bookmark menu creating apparatus according to still further embodiment of the present invention.

Referring to FIG. 37, a bookmark creating apparatus (3700) according to still further embodiment of the present invention includes an operation information compiling unit (3730), a bookmark menu creating information analyzing unit (3710) and a bookmark menu information management unit (3720), and is connected to the terminal via the communication network.

Preferably, the bookmark menu creating apparatus (3700), although not shown in the drawing, further includes a language converting unit for converting the bookmark menu creating information to prescribed information per language.

Although not shown in FIG. 37, preferably, the bookmark menu creating apparatus (3700), in cooperation with the contents providing apparatus, provides contents corresponding to the bookmark menu to the mobile communication terminal via the contents providing apparatus.

Meanwhile, referring to FIG. 37, the bookmark menu creating apparatus (370) according to still further embodiment of the present invention may be embodied by the integrated management apparatus (200), and is connected to the mobile communication terminal via the communication network connected to the gateway (130), and can create a bookmark menu, in cooperation with the external server (170) and the contents providing apparatus (150), and provide contents to the mobile communication terminal (100).

The operation information compiling unit (3730) is a means for compiling the information necessary for bookmark menu creation as the information useful for bookmark menu creation, and whenever the mobile communication terminal transmits the contents provision request information to the integrated management apparatus (200) and receives contents corresponding to the contents provision request, the operation information compiling unit (3730) receives the operation information recorded at the gateway (130) or the contents providing apparatus and compiles it as information for bookmark menu creation.

The operation information includes information relative to the mobile communication terminal and contents access information, where the information relative to the mobile communication terminal which is a designated number of the mobile communication terminal. If the mobile communication terminal is a mobile telephone handset, an ID of the mobile communication terminal is a telephone number allocated to the mobile telephone handset and is called as a Mobile Identifying Number (hereinafter referred to as "MIN"). Furthermore, the contents access information is information for providing actual contents by way of the contents providing apparatus (150), and includes URL information provided by contents, contents ID information and contents menu information.

The URL information provided by the contents denotes actual contents position information stored in the contents providing apparatus. The contents ID is a number provided for identifying various respective contents, and can be arbitrarily allocated according to the convenience of the integrated management apparatus (200) or the contents providing apparatus.

Furthermore, the contents menu information is higher information including the contents, and the contents may be comprised of several menu information which include a lower menu which can promptly provide the contents and a higher menu for managing the lower menu.

Meanwhile, preferably, the operation information further includes contents providing time information for illustrating when contents have been provided.

The contents access information is managed by the integrated management apparatus (200). The integrated management apparatus (200) relative to the contents requested by the mobile communication terminal searches contents access point corresponding to the contents and provides the contents through the URL information provided by the contents and via the contents providing apparatus.

The bookmark menu creation information analyzing unit (3710) is a means for periodically analyzing the menu creation information which is operation information compiled via the operation information compiling unit (3730), and establishing a provision frequency priority of the contents provided to the mobile communication terminal per contents, and preferably, the menu creation information analysis is implemented by a prescribed analysis program such as hit analyzer or the like.

Meanwhile, preferably, in the preferred embodiment of the mobile communication system, the bookmark menu creation information analysis process is conducted by the transmission apparatus (330).

The bookmark menu information management unit (3720) is a means for using the priority information relative to the contents provision frequency established by the bookmark menu creation information analyzing unit (3710), and creating and managing the bookmark menu information of the mobile communication terminal. Preferably, the process thereof is conducted by the central management apparatus (300) in the preferred embodiment of the mobile communication system.

Figure 38:
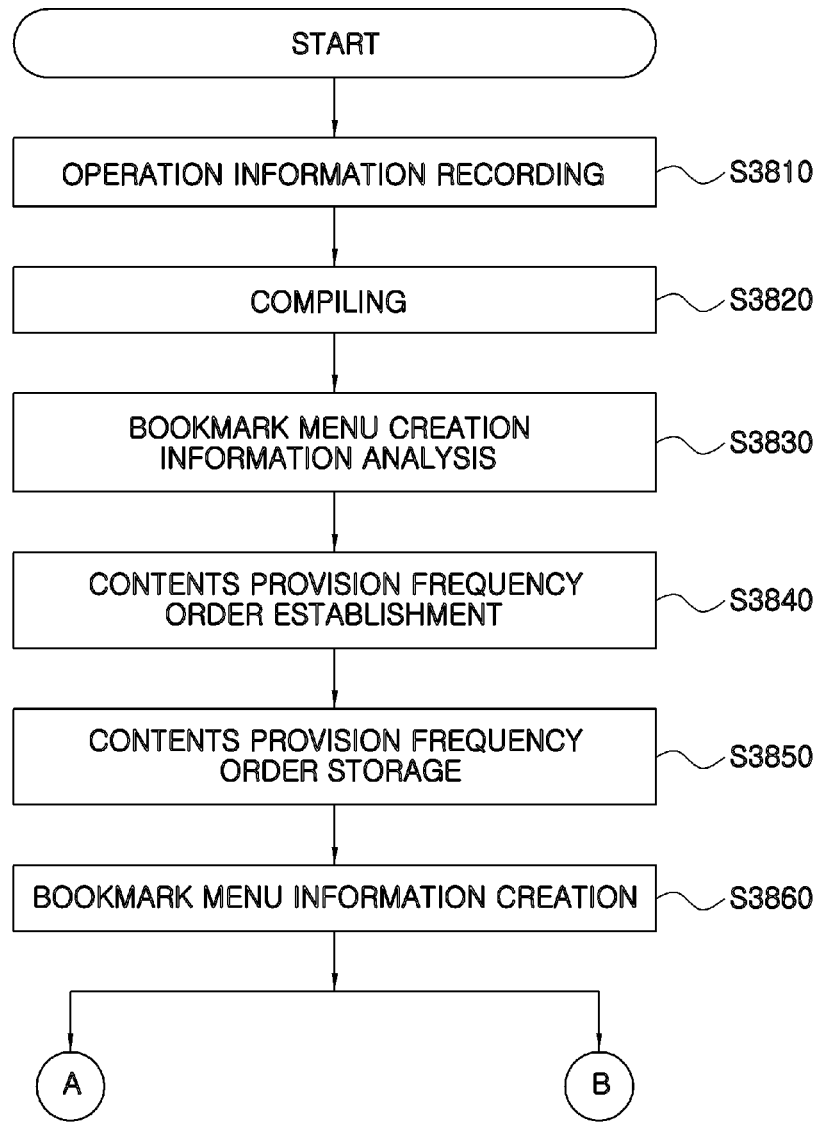
FIG. 38 is a flow chart of a bookmark menu creating method according to still further embodiment of the present invention.
Figure 39:
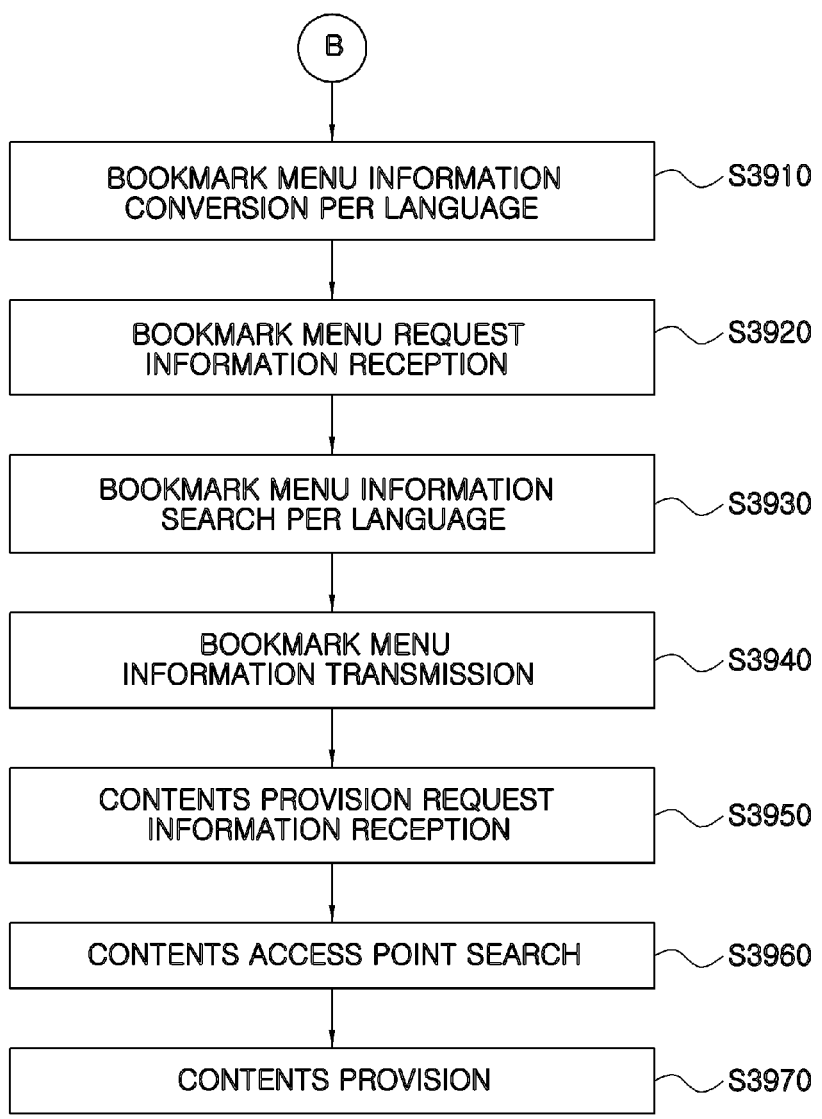
FIG. 39 is a flow chart of a contents providing method following bookmark menu creation according to still further embodiment of the present invention.
Figure 40:
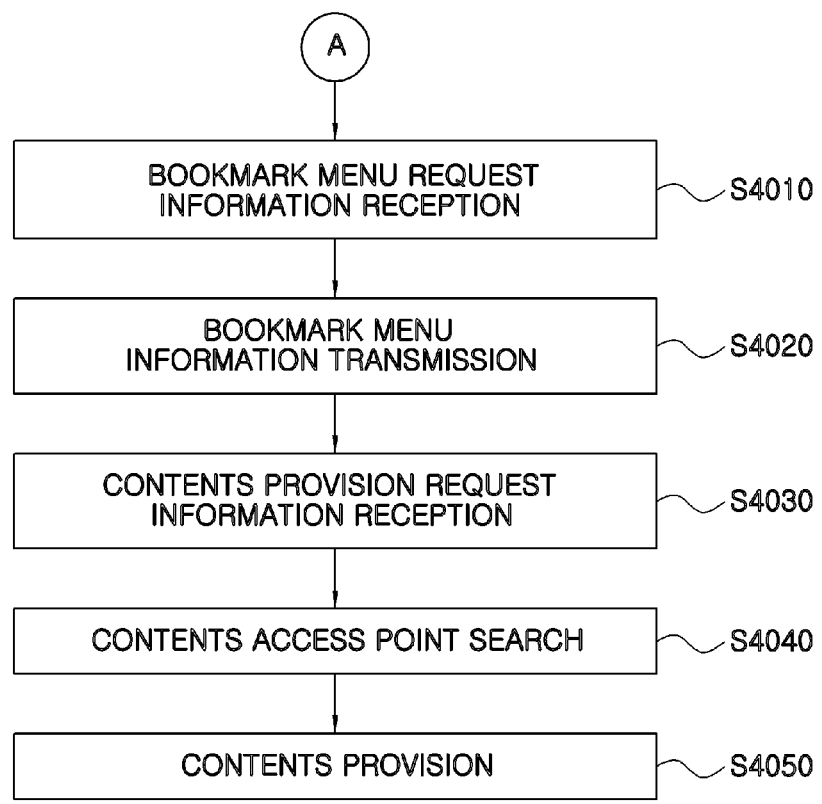
FIG. 40 is a flow chart of a contents providing method following bookmark menu creation according to still further embodiment of the present invention.

FIG. 38 is a flow chart of a bookmark menu creating method according to still further embodiment of the present invention, FIG. 39 is a flow chart of a contents providing method following bookmark menu creation according to still further embodiment of the present invention and FIG. 40 is a flow chart of a contents providing method following bookmark menu creation according to still further embodiment of the present invention.

First of all, referring to FIG. 38, whenever the mobile communication terminal (100) transmits contents provision request information to the integrated management apparatus (200) and receives contents corresponding to the contents provision request, operation information is recorded with the gateway (130) or the contents providing apparatus (150) (S3810). The operation information, as mentioned earlier in the description of the bookmark menu creation apparatus (3700), includes "MIN" and the contents access point information, where the contents access point includes the URL information provided by the contents, contents ID and contents menu information, and further includes a contents provision time for illustrating when contents has been provided to the mobile communication terminal (100). Successively, the integrated management apparatus (200) receives the operation information and compiles as useful information for creating a bookmark menu (S3820).

Meanwhile, preferably, the compiling process is carried out via an interface apparatus of the integrated management apparatus (200).

Successively, the integrated management apparatus (200) periodically analyzes the bookmark menu creation information thus compiled (S3830), and establishes a priority relative to the provision frequency of the contents provided to the mobile communication terminal (100) per contents (S3840). This is because whenever the integrated management apparatus (200) at S3810 provides contents to the mobile communication terminal (100), the operation information comprised of "MIN number" and contents access point information is created. Preferably, the number of operation information created per contents is analyzed to determine the priority relative to the contents provision frequency, or contents provision time recorded in the operation information is analyzed to determine the priority relative to the contents provision frequency.

The analyzing method is not limited to the aforementioned, and preferably, the transmission apparatus (330) of the integrated management apparatus (200) selects an effective analyzing method for analysis via a prescribed analysis program.

Successively, the priority relative to the contents provision frequency is stored at the first database of the integrated management apparatus (200) (S 1650), and bookmark menu information of the mobile communication terminal (100) is created by the priority information stored in the first database of the integrated management apparatus (200) (S3860). Preferably, the bookmark menu information is also stored in the first database.

Furthermore, the bookmark menu information is modified by the periodic analysis process and in addition to that, preferably, the integrated management apparatus (200) arbitrarily activates or deactivates the information to modify the information relative to the bookmark menu displayed on the screen of the mobile communication terminal. For example, if a user of the mobile communication terminal (100) wants to download a song named "Yesterday of the Beatles" via the mobile communication terminal (100), the bookmark menu provided on the screen of the mobile communication terminal (100) is such that a lower menu of "Beatles' Yesterday" is positioned as a first priority on an upper end of the mobile communication terminal (100). Therefore, even the mobile communication terminal (100) omits the process of searching the contents of "Beatles' Yesterday", contents of "Beatles' Yesterday" can be selected to download the contents of "Beatles' Yesterday".

Now, a providing method of contents to the mobile communication terminal (100) via the bookmark menu information following the creation of the bookmark menu information via the integrated management apparatus (200) will be described in detail.

FIG. 39 is a flow chart of a contents providing method following bookmark menu creation according to still further embodiment of the present invention, and FIG. 40 is a flow chart of a contents providing method following bookmark menu creation according to still further embodiment of the present invention.

Referring to FIG. 39, when the mobile communication terminal (100) requests the integrated management (200) of the bookmark menu information, the integrated management apparatus (200) receives the bookmark menu request information from the mobile communication terminal (100) (S3920) and the integrated management apparatus (200) transmits the bookmark menu request information to the mobile communication terminal (100) (S3940).

Preferably, provision of the bookmark menu information is carried out by the central management apparatus (300), and more preferably, by the service management apparatus (400).

Successively, when the mobile communication terminal (100) selects wanted contents via the bookmark menu information, the integrated management apparatus (200) concurrently receives the contents provision request information (S3950), and searches the contents access point of the contents (S3960), and transmits the URL information relative to the contents to the contents providing apparatus (150) to provide the contents (S3970).

For example, when a user selects a menu of "Beatles' Yesterday" provided via the bookmark menu, the integrated management apparatus (200) receives the contents request information of "Beatles' Yesterday" to search the contents access point relative to contents named "Beatles' Yesterday". As a result of the search, the integrated management apparatus (200) is connected to the contents providing apparatus (150) for providing contents of the "Beatles' Yesterday" via the contents URL information relative to the contents named the "Beatles' Yesterday" and provides the contents of the "Beatles' Yesterday" to the mobile communication terminal (100). In other words, the mobile communication terminal (100) can provide the contents even by omitting the process of requesting the provision of contents named "Beatles' Yesterday" from the integrated management apparatus (200) in the process of requesting the provision of contents of "Beatles'

Yesterday" from the integrated management apparatus (200). For example, in order for the mobile communication terminal (100) to receive the "Beatles' Yesterday" without recourse to the bookmark menu information, a user of the mobile communication terminal (100) should select a music menu out of the first upper menu classified into music, movies, pop songs and games, and select a pop song menu out of the second upper menu classified into classic music, Korean songs, pop songs and children's songs, and should implement a process of requesting the contents of "Beatles' Yesterday" via contents search process including search per singer or search per name. However, the first upper menu, the second upper menu and contents search process via the bookmark menu information can be omitted.

Meanwhile, referring to FIG. 40, the integrated management apparatus (200) creates the bookmark menu information, and following the step of S3860, the bookmark menu information is converted to each prescribed language (S3910), which is for providing the bookmark menu information to a language supported by the mobile communication terminal (100) per country. Accordingly, after the integrated management apparatus (200) receives the bookmark menu request information from the mobile communication terminal (100), a search per language of bookmark menu information is conducted (S3930). In other words, the bookmark menu information managed by languages supportable by the mobile communication terminal (100) is searched and the bookmark menu information is provided to the mobile communication terminal (100) (S3940).

Meanwhile, preferably, the bookmark menu information converted to each prescribed language is stored and managed in the second database of the integrated management apparatus (200). The subsequent processes are the same as those of FIG. 39 such that they are omitted in further description. Referring to FIG. 1, a bookmark service system according to still further embodiment of the present invention will be described.

Bookmark creation request information relative to contents registerable at the bookmark is received from the mobile communication terminal (100), and contents address information corresponding to the bookmark creation request information, contents name and subscriber information are searched and stored, and a bookmark in which contents name is registered based on the stored information is created. Preferably, the contents address information, contents name and/or subscriber information are used by receiving information recorded at the gateway whenever contents are provided from the integrated management apparatus (200). Furthermore, the integrated management apparatus (200) manages the contents name corresponding to contents and contents address information.

Meanwhile, the contents is a general concept of various information of various characters, codes, sounds, images, and the like digitally manufactured, processed and circulated or contents thereof, and preferably, the contents name which is information for discriminating the contents is managed by contents ID. Accordingly, the contents address information may be URL information for providing the contents, and the contents ID may be intrinsic code number provided for distinguishing contents provided via the contents address information.

Figure 41:
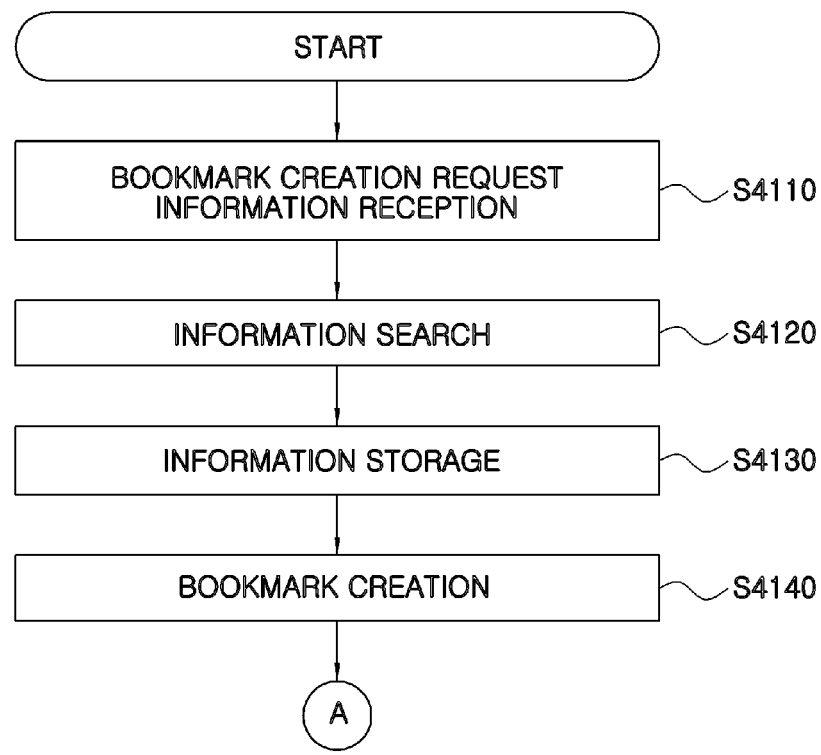
FIG. 41 is a flow chart of a bookmark service providing method according to still further embodiment of the present invention.
Figure 42:
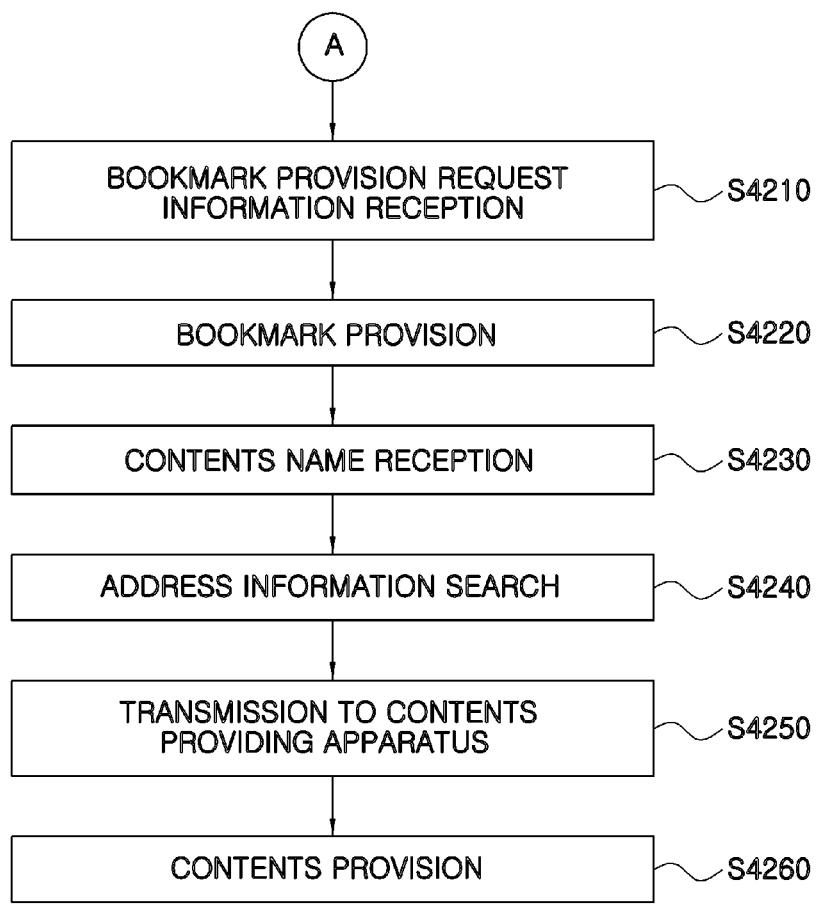
FIG. 42 is a flow chart of a bookmark service providing method according to still further embodiment of the present invention.
Figure 43:
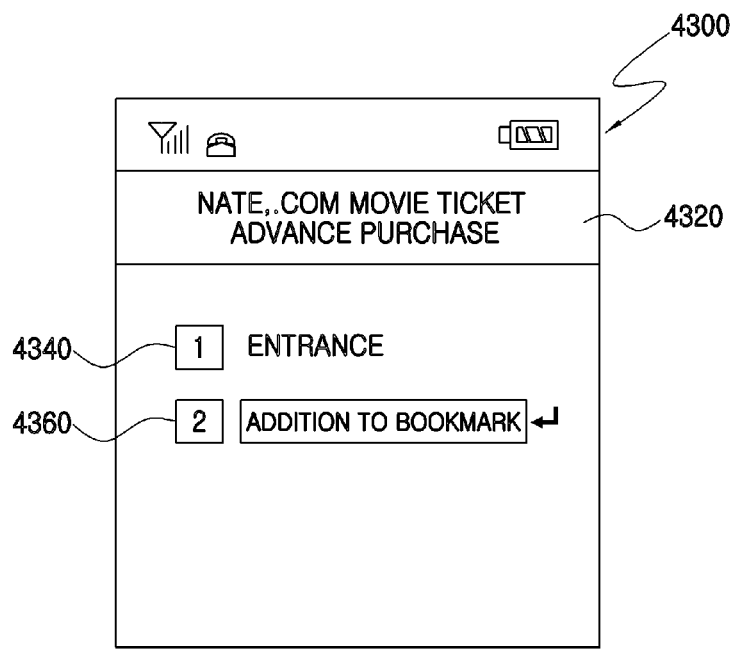
FIG. 43 is a schematic drawing for showing a screen of a terminal in the course of providing a bookmark service according to still further embodiment of the present invention.
Figure 44:
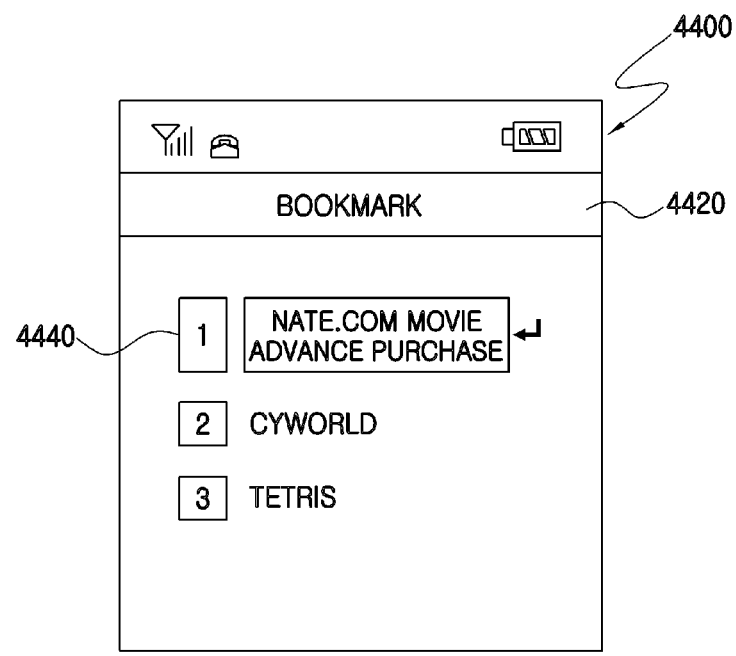
FIG. 44 is a schematic drawing for showing a screen of a terminal in the course of providing a bookmark service according to still further embodiment of the present invention.

FIG. 41 is a flow chart of a bookmark service providing method according to still further embodiment of the present invention, FIG. 42 is a flow chart of a bookmark service providing method according to still further embodiment of the present invention, FIG. 43 is a schematic drawing for showing a screen of a terminal in the course of providing a bookmark service according to still further embodiment of the present invention, and FIG. 44 is a schematic drawing for showing a screen of a terminal in the course of providing a bookmark service according to still further embodiment of the present invention.

First of all, referring to FIG. 41, the integrated management apparatus (200) receives bookmark creation request information relative to contents registerable at the bookmark from the mobile communication terminal (100) (S4110). In other words, referring to FIG. 43, the integrated management apparatus (200) or the contents providing apparatus (150) provides to a terminal screen (4300) contents including bookmark registration icon (4360) for adding the contents name (4320) to the bookmark. If a user of the mobile communication terminal (100) wants to be provided with contents to be added to a bookmark and to be conveniently used at a later date, and because contents corresponding to the contents name (4320) are frequently used, a registration icon (4360) of "Addition to Bookmark" is selected.

By the method thus described, the integrated management apparatus (200) receives bookmark creation request information relative to contents corresponding to the contents name. Actually, preferably, a process is conducted where the mobile communication terminal (100) selects the registration icon (4360) of "addition to Bookmark" and at the same time, a program such as "add_favorite.jsp" is called from the integrated management apparatus (200) and the contents name (4320) is registered with the bookmark. Successively, the integrated management apparatus (200) searches contents address information corresponding to the bookmark creation request information, contents name and subscriber name (S4120).

The subscriber information includes a Mobile Identification Number (MIN) intrinsically provided for identifying the terminal and the like, and preferably, the subscriber information is added with different information for convenience sake. Furthermore, the contents address information may be URL information, and preferably, the subscriber information and/or contents address information is information managed by the integrated management apparatus (200). Successively, the integrated management apparatus (200) stores the contents address information, contents name and subscriber information (S4130). Contents name relative to contents having received registration request from the mobile communication terminal (100) based on the stored information is listed up to create a bookmark (S4140).

In the method thus described, following the creation of bookmark of the mobile communication terminal (100), the user can be effectively provided with the contents corresponding to contents name registered with bookmark via the bookmark. The method thereof will be described in detail in the following.

First of all, when the integrated management apparatus (200) receives from the mobile communication terminal (100) bookmark provision request information for requesting a list registered with the bookmark to be provided to the mobile communication terminal (100) (S4210), the integrated management apparatus (200) searches bookmark corresponding to the mobile communication terminal (100) and provides the bookmark to the mobile communication terminal (100) (S4220). At this time, a screen just like the one illustrated in FIG. 44 is provided to the mobile communication terminal (100). A table of contents including "Nate.com movie ticket advance purchase", "Cyworld" and "Tetris" are the contents name in which a user of the mobile communication terminal has requested a registration with the bookmark. If the user selects a contents name of "Nate.com movie ticket advance purchase", the mobile communication terminal (100) is connected to contents providing apparatus for providing contents corresponding to the contents name of "Nate-.com movie ticket advance purchase" and the user can be provided with the wanted contents. In other words, following the implementation of S4220, the mobile communication terminal (100) transmits contents name to the integrated management apparatus (200) via bookmark (S4230). Successively, the integrated management apparatus (200) searches contents address information corresponding to the contents name (S4240) and transmits the searched address information to the contents providing apparatus (150) (S4250). Then, the contents providing apparatus (150) provides to the mobile communication terminal (100) contents corresponding to the contents name via the contents address information (S4260).

Meanwhile, although not illustrated in the drawing, preferably, contents name listed up in bookmark can be changed according to the user of the terminal.

The integrated management apparatus (200) receives information change request information for changing the contents name registered with the bookmark from the mobile communication terminal (100). Successively, the integrated management apparatus (200) changes the contents name corresponding to the information change request information and re-establishes it on the bookmark.

Figure 45:
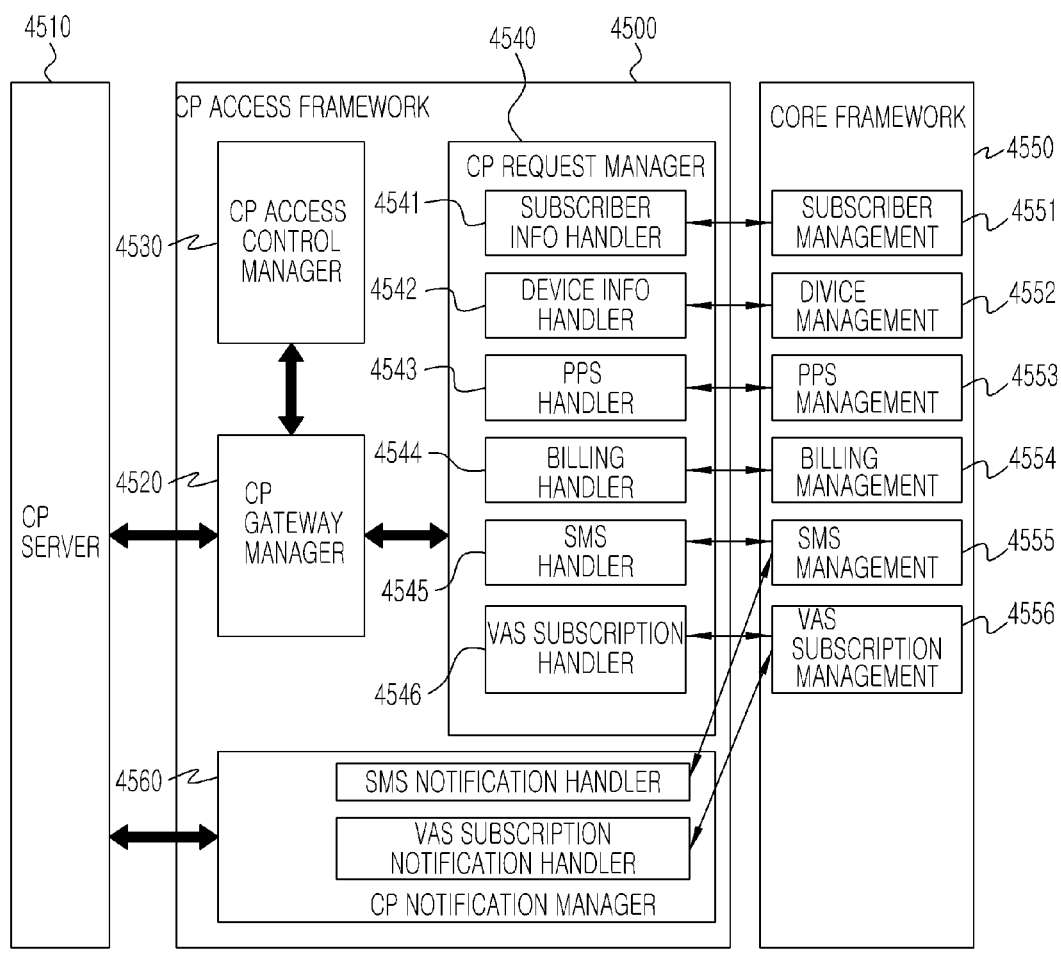
FIG. 45 is a schematic drawing of an access system for contents providers according to still further embodiment of the present invention.

FIG. 45 is a schematic drawing of an access system for contents providers according to still further embodiment of the present invention.

Referring to FIG. 45, an access system for the contents providers includes a CP Server (4510) for outputting request packet in response to the request of a user of the mobile communication terminal, a CP gateway manager (4520) for receiving the request packet from the contents provider server (4510) to inspect and output syntax errors, a CP control manager (4530) for discriminating and outputting a prescribe condition from the inspected request packet, a CP request manager (4540) for requesting various information corresponding to the outputted packet, and a core framework (4550) for receiving various requested information from the legacy system and providing the same.

Here, a CP notification manager (4560) notifies to the CP server (4510) particular information needed to be notified to the CP server (4510), and receives a response corresponding thereto. At this time, the particular information is information of process result relative to the SMS request of the CP server and information on value added service (VAS) of the user. Furthermore, the CP gateway manager (4520), the CP access control manager (4530), the CP request manager (4540) and the CP notification manager (4560) are so constructed as to be contained in the CP access framework (4500).

Operation of access system for CP according to still further embodiment of the present invention thus constructed will be explained with reference to FIG. 45.

First of all, a user of a web browser usable mobile communication terminal requests the CP server (4510) of a prescribed service. At this time, the service denotes various added services (for example, drawing friend service of SK Telecommunication) requested by the user from the mobile communication terminal. Thereafter, the CP server (4510) receives the service request of the mobile communication terminal and outputs a request packet in response to the service request to the CP access framework (4500). At this time, the request packet is loaded with various information such as a user mobile communication terminal ID, number thereof and the like. Furthermore, the kind of the request packet may include packets including a simple information inquiry, particular function execution (SMS transmission request, pre-paid service amount deduction and the like) and particular information advice (subscriber notifying subscription to added service of the CP).

The simple information includes subscriber-related information showing whether a particular subscriber has subscribed to the wireless Internet, a terminal hardware and software specification, information relative to a particular terminal showing whether there is a support to a terminal relative to a particular service, an inquiry to prepaid subscriber subscription, information relative to the prepaid service showing service charge deduction amount and balance inquiry, SMS transmission and cancellation request.

Thereafter, the CP gateway manager (4520) of the CP access framework (4500) inspects syntax errors, i.e., whether words in an inquiry contained in the request packet are correct grammar-wise, and re-outputs the inspected request packet to the CP access control manager (4530). The CP access control manager (4530) discriminates a prescribed condition relative to the request packet. In other words, the discrimination is implemented through the inquiry contained in the request packet, and the discrimination includes whether there exists a CP ID (intrinsic ID provided from the wireless portal platform) of the CP server (4510), whether the CP ID is mapped to the CP server IP allocated to the CP thereof and whether the CP server (4510) is authorized to use the inquiry.

The reason the aforementioned discriminating process should be passed through is that the CP server (4510) should know customers information wanting to use the service and it is feared that the customers information may be exposed and misused by the CP server who is comparatively easy to access to the wireless Internet portal platform. Accordingly, a strict authentication of the CP server can help provide customized information to the customers.

Thereafter, the CP request manager (4540) requests the core framework (4550) of various information corresponding to the request packet thus discriminated. At this time, the request to various information is implemented by prescribed apparatuses according to the kinds thereof, and further explanation to the prescribed apparatuses will be given as below.

First of all, a subscriber information subscription handler (4541) takes charge of subscriber related information, i.e., whether a particular subscriber has subscribed to the wireless Internet, and to a particular service and the other information. A device information handler (4542) takes charge of information relative to a particular handset, i.e., hardware and software specification of a terminal, and support to particular service and the like. A prepaid service handler (4543) takes charge of prepaid service related operation, i.e., whether subscribed to a prepaid service, balance referral, service charge deduction and the like. A billing handler (4544) takes charge of billing related information, i.e., a function of notifying the completion of transmission when usage log which is a basic data of billing is collected and transmitted to the wireless portal platform. A short message service handler (4545) takes charge of SMA related information, i.e., all the functions related to SMPP regulations including SMS transmission request, SMS transmission cancellation request and the like. A value added service subscription handler (4546) implements the functions of value added service subscription related information, i.e., advising that a prescribed user has subscribed to/cancelled a value added service of CP, and inquiring whether subscribed to value added service.

Then, the core framework (4550) functions to receive from the legacy system various information requested from the respective apparatuses and to provide the information.

The subscriber management, device management, prepaid service management, billing management, short message service management and the value added service subscription management of the core framework correspond to each apparatus of the CP request manager (4540), and implement functions distributed to the various information thus requested. In addition, a CP notification manager (4560) implements functions other than those of the CP gateway manager, the CP access control manager, and the CP request manager.

Any special information that is supposed to be advised to the CP server (4510) is advised to the CP server (4510), and a response thereto is received. As mentioned earlier, the particular information includes a process result relative to the SMS request of the CP server (all the notice related information involving SMPP regulation such as SMS transmission result) and value added service (VAS) subscription related information (notice of a certain user having subscribed to/cancelled the value added service of the CP).

FIGS. 45 to 55 are schematic drawings of a mobile network operator right (or authority) providing method of wireless portal platform according to still further embodiment of the present invention.

Figure 47:
FIG. 47 is a schematic drawing for illustrating a website account providing (or changing) process relative to a mobile network operator according to still further embodiment of the present invention.

FIGS. 46 to 48 are schematic drawings of a website page illustrating a right providing method relative to mobile network operators according to still further embodiment of the present invention.

FIG. 46 is a schematic drawing of a website page illustrating detailed information process relative to a mobile network operator according to still further embodiment of the present invention.

As illustrated in FIG. 46, detailed information relative to each mobile network operator is shown. As mentioned earlier, the mobile network operators include a root mobile network operator in which authority thereof is set during the system installation and sub-mobile network operators whose authority can be changed and deleted by the root mobile network operator. Furthermore, prescribed information of the mobile network operators includes a name of the mobile network operator, a password, a home address, mobile telephone number and the like, and further detailed information of relevant mobile network operators can be referred to by clicking a prescribed button (see detail) of detailed information. At this time, when the prescribed button is clicked, information relative to real name of the mobile network operator, email address and current mobile network operation right provided status is displayed via the website page in addition to the above-mentioned information.

The mobile network operator related information is not limited to the above examples, and particular requests by the root mobile network operator and sub-mobile network operators can be variably and limitlessly embodied during the system installation.

FIG. 47 is a schematic drawing for illustrating a website account providing (or changing) process relative to a mobile network operator according to still further embodiment of the present invention, wherein the illustrated information (ID, password, mobile network operator name, home address, mobile number, email address or currently provided right status) can be changed (or deleted) by the root mobile network operator and sub-mobile network operators having rights of the mobile network operations.

FIG. 48 is a schematic drawing of a website page for explaining a process of right providing to mobile network operator according to still further embodiment of the present invention. As illustrated in FIG. 48, the particular mobile network operator provided with the account can be provided with mobile network rights (inquiry, registration, change, deletion, temporary approval, approval after temporary approval, direct approval, suspend) per menu (administrator management, contents management, menu management, OA&M, portal application management, subscriber management, device management).

The menu and mobile network operator rights are only parts of the examples, and it is apparent that various menus and mobile network operation rights can be added during initial installation of system of the portal platform. At this time, the temporary approval, approval after the temporary approval, direct approval and suspension denote right providing approval process relative to the contents providers and terminal manufacturers. In other words, they mean the temporary approval, approval after the temporary approval, direct approval authorities and suspension of the mobile network operators when the contents providers register contents with the portal system, or when the terminal manufacturers register terminal related information, or when the contents providers and terminal manufacturers correct their information and register the corrected information (for example, ID change, account change and the like).

Furthermore, the mobile network operators authority (inquiry, registration, modification, deletion, temporary approval, approval after the temporary approval, direct approval and suspension) can be individually modified per menu, but may be collectively provided via an option at the lowermost part (Change of all the authorities at a time). Even at this time, the authority providing can be implemented by the root mobile network operator or sub-mobile network operators having the authority regarding the mobile network operation.

Furthermore, the mobile network operation authorities may be collectively provided per prescribed level, and as illustrated, in the present embodiment, the authority providing is classified to seven steps of levels. To elaborate, a first step is an authority for inquiry, a second step is for inquiry, registration and change, a third step is for inquiry, registration and deletion, a fourth step is for inquiry, registration, modification, deletion and suspension, a fifth step is for inquiry, registration, modification, deletion and temporary approval, a sixth step is for inquiry, registration, modification, deletion and approval after the temporary approval and a seventh step is for authorities for all the mobile network operation and direct approval.

Although it is not explained in the seventh step, it is apparent that mobile network operation authorities for various levels during the initial system installation of the portal platform can be differently arranged.

Figure 49:
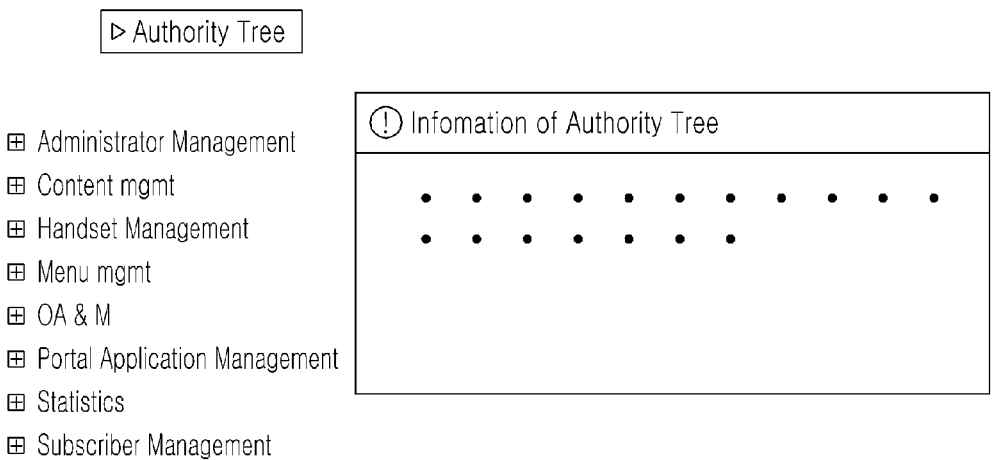

FIG. 49 and FIG. 50 are schematic drawings of website pages illustrating an authority providing state of mobile network operators per menu according to still further embodiment of the present invention.

Referring to FIGS. 49 and 50, these drawings show authority providing status of a prescribed mobile network operator relative to the contents management. It should be apparent that authority providing status for the other menus (administrator management, menu management, OA&M, portal application management, subscriber management) except for the prescribed menu can be displayed and illustration thereto is omitted FIGS. 51 to 55 are schematic drawings for illustrating website pages showing a process of grouping prescribed mobile network operators into one group according to still further embodiment of the present invention.

Figure 51:
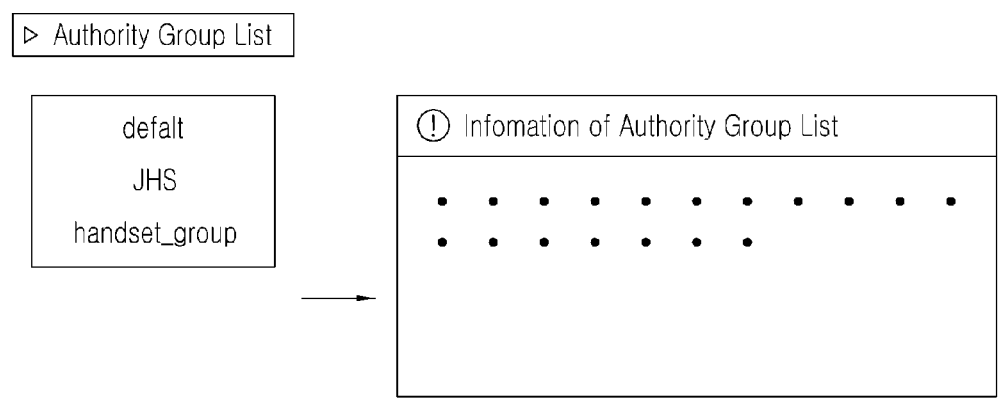
Figure 52:
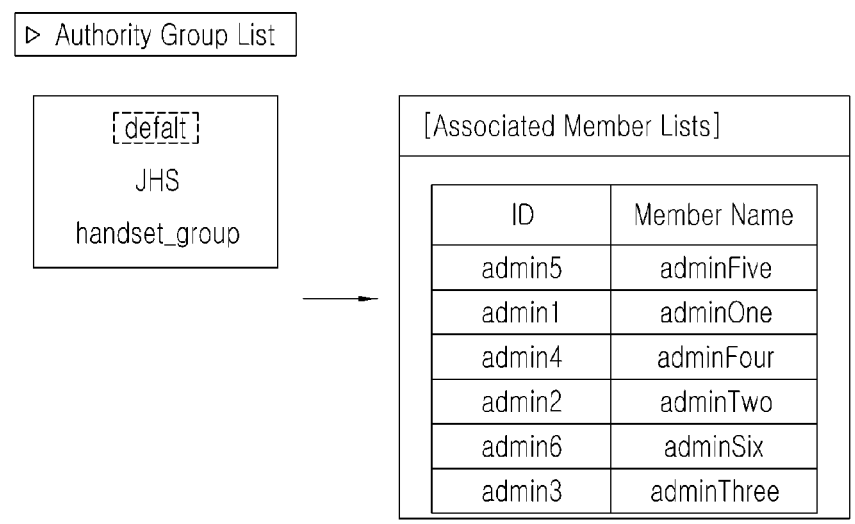

First of all, FIG. 51 is a schematic drawing of a website page for illustrating an initial establishing process for grouping of the mobile network operators, and FIG. 52 is a drawing of a website page for illustrating prescribed mobile network operators included in one group, and the prescribed mobile network authority providing group contains a plurality of mobile network operators.

Figure 53:
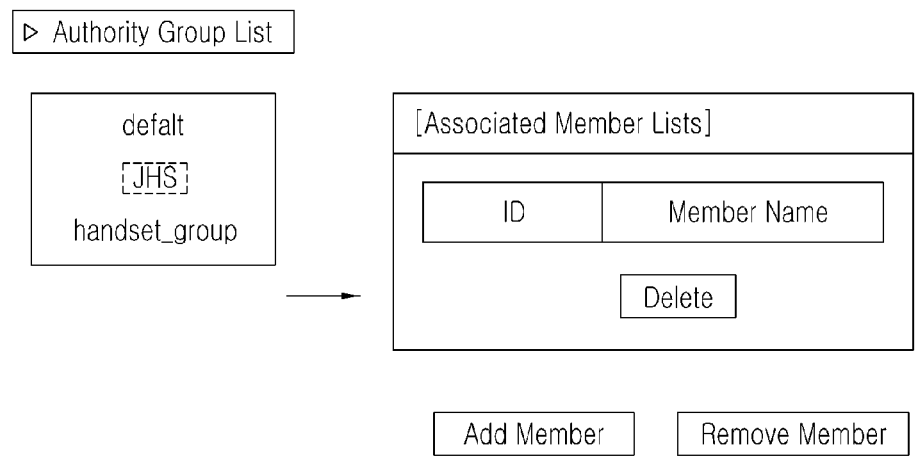
Figure 54:
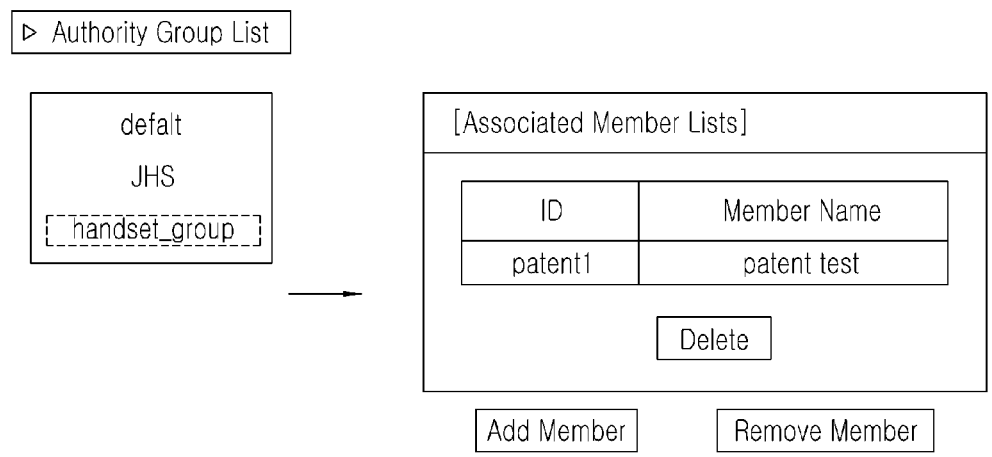

Likewise, FIGS. 53 and 54 are prescribed mobile network operators contained in a prescribed mobile network operation authority providing group named "JHS" and "handset group". FIG. 55 is a drawing of a website page for illustrating a process of grouping the prescribed mobile network operators into one group.

As illustrated in the drawings, the group can have a group ID, and is provided with mobile network operation authority. When the mobile network operation authority of the group is collectively changed to a prescribed level, all the authorities of the mobile network operators included in the group can be changed to the prescribed levels. Accordingly, mobile network operators having similar natures are grouped into a group to thereby enable to facilitate the mobile network operations.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

[Industrial Applicability]

The present invention provides a user with a content in accordance with an efficiency of a mobile terminal in a mobile communication providing a wireless internet service.

The invention claimed is:

1. A managing method for contents providing services, the method comprising the steps of:
   (A-1) providing a website server account of a Contents Provider (CP) based on information of the CP provided via a contents providing apparatus;
   (A-2) registering a contents connection point which is contents position information for connecting to contents to be provided to a mobile communication terminal via a wireless Internet;
   (A-3) generating CP connection menus and a directory menu which is a menu provided via the mobile communication terminal and connecting the contents connection point to the CP connection menus; and
   (A-4) forming a segment for providing the contents to the mobile communication terminal according to a prescribed regulation and selectively connecting the directory menu and the CP connection menus to the segment.

2. The method as defined in claim 1, wherein the step of (A-1) further comprises the steps of:
   (A-11) registering the information of the CP including a CP ID via the contents providing apparatus;
   (A-12) providing a website page to the CP; and
   (A-13) registering a language supported by the mobile communication terminal and a kind of the terminal in which the contents can be displayed.

3. The method as defined in claim 2, wherein the step of (A-1) further comprises the step of discriminating whether requested subscriber information is provided to the contents providing apparatus in response to (A-14) reception of an information request relative to a subscriber who can be provided with the contents from the contents providing apparatus.

4. The method as defined in claim 3, wherein a main menu provided to the terminal is differently formed in response to a segment per contents service.

5. The method as defined in claim 4, wherein the step of (A-2) further comprises the step of:
   (A-2a) providing a directory per nature of the contents for the CP to register the contents connection point per nature of the contents; and
   (A-2b) registering contents-embodiable mobile terminal information at the same time when the contents connection point is registered with the directory.

6. The method as defined in any one claim of 1 to 5, wherein the method further comprises the step of:
   (A-5) when one of the CP connection menus is selected by the mobile communication terminal, transmitting the contents corresponding to the contents connection point connected to the selected CP connection menu to the mobile communication terminal, and wherein the contents connection point is URL information of a prescribed server stored in the contents.

* * * * *